(12) United States Patent
Haverty

(10) Patent No.: US 8,755,770 B2
(45) Date of Patent: Jun. 17, 2014

(54) METHODS FOR IDENTIFYING WIRELESS DEVICES CONNECTED TO POTENTIALLY THREATENING DEVICES

(75) Inventor: James D Haverty, Boxborough, MA (US)

(73) Assignee: L-3 Communications Corporation, New York, NY (US)

(*) Notice: Subject to any disclaimer, the term of this patent is extended or adjusted under 35 U.S.C. 154(b) by 805 days.

(21) Appl. No.: 12/538,662

(22) Filed: Aug. 10, 2009

(65) Prior Publication Data

US 2010/0304706 A1 Dec. 2, 2010

Related U.S. Application Data

(63) Continuation-in-part of application No. PCT/US2006/030159, filed on Aug. 1, 2006, and a continuation-in-part of application No. PCT/US2007/063493, filed on Mar. 7, 2007.

(60) Provisional application No. 61/087,640, filed on Aug. 9, 2008.

(51) Int. Cl.
*H04M 1/66* (2006.01)

(52) U.S. Cl.
USPC ........ 455/410; 455/423; 455/458; 455/456.2; 455/404.1; 455/515; 455/67; 455/461; 455/418; 455/574; 726/16; 726/26; 726/22; 726/6; 340/539.1; 340/539.13; 370/310; 370/328; 370/346; 370/449; 370/268; 89/1.13; 102/215; 342/16; 88/50

(58) Field of Classification Search
USPC ........ 455/423, 458, 237.1, 456.2, 515, 67.14, 455/461, 434, 435.1, 404.1, 404.2, 455/418–420, 425, 456.1–457, 517, 574; 726/16, 26, 22, 6; 340/539.1, 539.13; 370/310, 328, 338, 346, 352, 449, 901, 370/908, 236, 264, 268, 269, 526; 89/1.13; 102/215; 342/16; 86/50

See application file for complete search history.

(56) References Cited

U.S. PATENT DOCUMENTS

| | | | |
|---|---|---|---|
| 3,805,242 A | 4/1974 | Matsumoto et al. | |
| 4,498,193 A | 2/1985 | Richardson | |

(Continued)

FOREIGN PATENT DOCUMENTS

| | | |
|---|---|---|
| WO | 2007016641 | 2/2007 |
| WO | 2007027699 | 3/2007 |

(Continued)

OTHER PUBLICATIONS

International Search Report dated Apr. 30, 2007, issued in corresponding International Application No. PCT/US06/33738.

(Continued)

*Primary Examiner* — Charles Appiah
*Assistant Examiner* — Edward Zhang
(74) *Attorney, Agent, or Firm* — Onello & Mello, LLP

(57) ABSTRACT

Techniques for determining whether a cellular device is suspect, i.e., perhaps serving as an activator for a device such as a bomb. One way of doing this with cellular telephones that are in the idle state is to use a baiting beacon to bait and automatically call all the cellular telephones in an area that are in the idle state. If the call to a given cellular telephone is not answered by a human voice, the cellular telephone is suspect. Another way of doing this with cellular telephones that are in the traffic state is to use surgical analysis to examine the DTX pattern for the telephone. If it indicates persistent silence, the cellular telephone is suspect. The surgical analysis may also be used to trace the DTX pattern back to another telephone that is controlling the suspect cellular device.

15 Claims, 31 Drawing Sheets

(56) References Cited

U.S. PATENT DOCUMENTS

| | | | |
|---|---|---|---|
| 5,001,771 A | 3/1991 | New | |
| 5,142,574 A | 8/1992 | West, Jr. et al. | |
| 5,239,557 A * | 8/1993 | Dent | 370/342 |
| 5,278,908 A | 1/1994 | Parikh et al. | |
| 5,293,375 A | 3/1994 | Moorwood et al. | |
| 5,517,675 A * | 5/1996 | O'Connor et al. | 455/437 |
| 5,706,333 A * | 1/1998 | Grenning et al. | 455/423 |
| 5,892,477 A | 4/1999 | Wehling | |
| 6,052,577 A | 4/2000 | Taguchi | |
| 6,087,506 A | 7/2000 | Knell et al. | |
| 6,195,529 B1 | 2/2001 | Linz et al. | |
| 6,266,347 B1 | 7/2001 | Amrany et al. | |
| 6,476,755 B1 | 11/2002 | Senio et al. | |
| 6,496,703 B1 | 12/2002 | da Silva | |
| 6,654,589 B1 | 11/2003 | Haumont | |
| 6,928,289 B1 * | 8/2005 | Cho et al. | 455/452.2 |
| 6,937,610 B1 | 8/2005 | Grabelsky et al. | |
| 7,047,050 B1 * | 5/2006 | Khawand et al. | 455/574 |
| 7,068,631 B2 | 6/2006 | Eriksson et al. | |
| 7,069,025 B2 | 6/2006 | Goren et al. | |
| 7,099,476 B2 | 8/2006 | Chen et al. | |
| 7,126,979 B2 | 10/2006 | Karlsson | |
| 7,142,108 B2 | 11/2006 | Diener et al. | |
| 7,313,358 B1 | 12/2007 | Ricci | |
| 7,352,770 B1 | 4/2008 | Yonge, III et al. | |
| 7,363,008 B2 | 4/2008 | Hassan et al. | |
| 7,437,128 B1 | 10/2008 | Fessler et al. | |
| 7,606,524 B1 | 10/2009 | Frank | |
| 7,742,265 B2 | 6/2010 | Rice | |
| 7,920,696 B2 * | 4/2011 | Chew | 379/388.02 |
| 8,140,001 B2 | 3/2012 | Haverty | |
| 2001/0036821 A1 | 11/2001 | Gainsboro et al. | |
| 2001/0039580 A1 | 11/2001 | Walker et al. | |
| 2002/0102968 A1 | 8/2002 | Arend et al. | |
| 2003/0021418 A1 | 1/2003 | Arakawa et al. | |
| 2003/0086412 A1 * | 5/2003 | Jeong et al. | 370/352 |
| 2003/0143943 A1 | 7/2003 | Kline | |
| 2004/0063427 A1 * | 4/2004 | Narasimha et al. | 455/434 |
| 2004/0077339 A1 | 4/2004 | Martens | |
| 2004/0179488 A1 | 9/2004 | Kim et al. | |
| 2004/0203911 A1 | 10/2004 | Masuda et al. | |
| 2004/0213231 A1 | 10/2004 | Cho et al. | |
| 2004/0242149 A1 | 12/2004 | Luneau | |
| 2005/0052995 A1 | 3/2005 | Gu et al. | |
| 2005/0058117 A1 | 3/2005 | Morioka et al. | |
| 2005/0089001 A1 | 4/2005 | Nishikawa | |
| 2005/0138433 A1 | 6/2005 | Linetsky | |
| 2005/0149949 A1 | 7/2005 | Tipton et al. | |
| 2005/0190784 A1 | 9/2005 | Stine | |
| 2005/0249149 A1 * | 11/2005 | Kasturi et al. | 370/328 |
| 2006/0018446 A1 * | 1/2006 | Schmandt et al. | 379/88.17 |
| 2006/0036859 A1 | 2/2006 | Adams et al. | |
| 2006/0109811 A1 * | 5/2006 | Schotten et al. | 370/328 |
| 2006/0165073 A1 | 7/2006 | Gopinath et al. | |
| 2006/0193274 A1 | 8/2006 | Yamagata | |
| 2006/0264168 A1 | 11/2006 | Corbett et al. | |
| 2007/0025386 A1 | 2/2007 | Riedel et al. | |
| 2007/0087767 A1 * | 4/2007 | Pareek et al. | 455/502 |
| 2007/0127421 A1 | 6/2007 | D'Amico et al. | |
| 2007/0230389 A1 | 10/2007 | Amann et al. | |
| 2007/0263672 A1 * | 11/2007 | Ojala et al. | 370/516 |
| 2007/0270127 A1 * | 11/2007 | Santoro et al. | 455/411 |
| 2008/0004045 A1 * | 1/2008 | Srey et al. | 455/458 |
| 2008/0020749 A1 | 1/2008 | Delaveau et al. | |
| 2008/0119130 A1 | 5/2008 | Sinha | |
| 2008/0160995 A1 | 7/2008 | Thiebaut et al. | |
| 2009/0209196 A1 | 8/2009 | Haverty | |
| 2009/0311963 A1 | 12/2009 | Haverty | |
| 2010/0068988 A1 | 3/2010 | Valentine et al. | |
| 2010/0226308 A1 | 9/2010 | Haverty | |
| 2010/0302956 A1 | 12/2010 | Haverty | |
| 2010/0309884 A1 | 12/2010 | Haverty | |
| 2011/0059689 A1 | 3/2011 | Haverty | |

FOREIGN PATENT DOCUMENTS

| | | |
|---|---|---|
| WO | 2007106694 | 9/2007 |
| WO | 2008022175 | 2/2008 |

OTHER PUBLICATIONS

International Search Report dated Apr. 11, 2008, issued in corresponding International Application No. PCT/US07/75972.

Borgonovo, Flaminio, et al., RR-ALOHA, a Reliable R-ALOHA broadcast channel for ad-hoc inter-vehicle communication networks, 2002, pp. 1-5.

International Search Report dated Aug. 17, 2007, issued in corresponding International Application No. PCT/US06/30159.

International Search Report dated Aug. 26, 2008, issued in corresponding International Application No. PCT/US07/63493.

"Enhanced Methods of Cellular Environment Detection When Interoperating With Timed Interfers" Specification, Drawings, Claims and Prosecution History of U.S. Appl. No. 12/538,604, filed Aug. 10, 2009 by James D. Haverty, which is stored in the United States Patent and Trademark Office (USPTO).

"Methods of Suppressing GSM Wireless Device Threats in Dynamic or Wide Area Static Environments Using Minimal Power Consumption and Collateral Interference" Specification, Drawings, Claims and Prosecution History of U.S. Appl. No. 13/424,153, filed Mar. 19, 2012 by James D. Haverty, which is stored in the United States Patent and Trademark Office (USPTO).

"Node-Arbitrated Media Access Control Protocol for Ad Hoc Broadcast Networks Carrying Ephemeral Information" Specification, Drawings, Claims and Prosecution History of U.S. Appl. No. 12/377,583, filed Feb. 13, 2009 by James D. Haverty, which is stored in the United States Patent and Trademark Office (USPTO).

"Methods for Surreptitious Manipulation of CDMA 2000 Wireless Devices" Specification, Drawings, Claims and Prosecution History of U.S. Appl. No. 12/846,633, filed Jul. 29, 2010 by James D. Haverty, which is stored in the United States Patent and Trademark Office (USPTO).

"Using Code Channel Overrides to Suppress CDMA Wireless Devices" Specification, Drawings, Claims and Prosecution History of U.S. Appl. No. 12/877,064, filed Sep. 7, 2010 by James D. Haverty, which is stored in the United States Patent and Trademark Office (USPTO).

* cited by examiner

Call Setup on Dedicated Channel

FIG. 13b

METHODS FOR IDENTIFYING WIRELESS DEVICES CONNECTED TO POTENTIALLY THREATENING DEVICES

CROSS-REFERENCE TO RELATED APPLICATIONS

The present patent application claims priority from U.S. provisional patent application 61/087,640, James D. Haverty, Methods for identifying wireless devices connected to potentially threatening wireless devices, filed Aug. 9, 2008. This patent application will be a CIP of the U.S. national stages of PCT patent application PCT/US2006/030159, James D. Haverty, Methods of Remotely Identifying, Suppressing and/or Disabling Wireless Devices of Interest, which claims priority from U.S. provisional patent application 60/704,808, James D. Haverty, Methods of Remotely Identifying, Suppressing and/or Disabling Wireless Devices of Interest. The U.S. national stage of PCT/US2006/030519 is U.S. patent application Ser. No. 12/065,225, filed Feb. 28, 2008, and PCT patent application PCT/US2007/063493, James D. Haverty, Methods of Suppressing GSM Wireless Device Threats in Dynamic or Wide Area Static Environments having Minimal Power Consumption and Collateral Interference, which claims priority from U.S. provisional patent application 60/780,006, James D. Haverty, Methods of Suppressing GSM Wireless Device Threats in Dynamic or Wide Area Static Environments having Minimal Power Consumption and Collateral Interference. The U.S. national stage of PCT/US2007/063493 is U.S. patent application Ser. No. 12/280,716, filed Aug. 26, 2008.

All of the above provisional patent applications and PCT patent applications are hereby incorporated by reference into the present patent application for all permitted purposes.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The techniques described herein are concerned with identifying specific wireless devices that are being used as triggers for weapons and distinguishing them from those being used by ordinary users for their intended purpose. The techniques interfere minimally with ordinary users and permit countermeasures for the weapons to be focused on neutralizing the wireless devices that are being used as triggers.

2. Description of Related Art

Wireless devices may be used as triggering devices for weapons such as explosive devices. A wireless device that is being used in this fashion may be in an idle mode awaiting an incoming call or be in a traffic (voice) mode awaiting signaling from another wireless device or land line phone that has placed a call to the triggering device. In the former case, a circuit that is connected to the triggering wireless device's audible ringer circuitry triggers the weapon when the triggering wireless device rings. In the latter case, the wireless device has a headset jack and is set to auto-answer a call; the audible output from the headset jack is connected to a DTMF (touchtone) detector that is sensitive to a sequence of digits akin to a personal identification number (or PIN)—where all but the last digit is used to arm the device and the last digit is the trigger. The method which uses the PIN is preferred for moving targets such as convoys or motorcades, because it affords much more precise timing and therefore targeting.

The prior art has many techniques for inventorying or engaging wireless devices in some operational area. These typically involve the creation of a false beacon, often termed herein a baiting beacon, that entices a wireless device to register with it and once the baiting beacon has gained control of the wireless device it may proceed to use any number of methods to identify and/or disable the wireless device. A fundamental limitation of these techniques is that they cannot determine from the interrogation alone whether a wireless device that is being interrogated is in fact a potential threat. Because this is the case, countermeasures against a possible threat generally require that all wireless phones in the operational area be disabled. Further, because potential threats cannot be determined from interrogation, there is no ability to engage a specific threatening wireless device in a timely fashion.

Another fundamental limitation is that prior art techniques for engaging wireless devices cannot deal with wireless devices that are in traffic state rather than idle state. Once the wireless device has entered the traffic state, it is no longer susceptible to interrogation other than by jamming the device outright to force it to drop the call and then interrogating it—in which case, the limitations on interrogation described above remain. The traffic state problem is further complicated by the fact that the signals of wireless devices that are in traffic mode are generally encrypted and comingled across some swath of spectrum, making simple energy detection techniques ineffective for distinguishing between threatening and nonthreatening wireless devices.

The techniques described herein provide solutions to the foregoing and other problems of the prior art and thereby make it possible to rapidly distinguish between ordinary wireless devices and potentially threatening wireless devices and to neutralize the potentially threatening wireless devices without significantly affecting wireless devices that are being used for their ordinary purposes.

SUMMARY OF THE INVENTION

One aspect of the inventive techniques is a method of determining whether a cellular telephone which is in an idle state is a suspect cellular telephone, i.e., a cellular telephone which can respond to a telephone call but has been disabled from transmitting voice signals. The method includes the steps of:

establishing a baiting beacon with which the phone will register.

when the cellular telephone registers with the baiting beacon, automatically performing the steps of placing a telephone call to the cellular telephone and if the telephone call is answered and the cellular telephone transmits voice signals, determining therefrom that the cellular telephone is not suspect; and the telephone call is answered and the cellular telephone does not transmit voice signals, determining therefrom that the cellular telephone is suspect.

Further details of the technique include making the determination whether the telephone is suspect after a period of time that is without transmission of voice signals by the cellular telephone or making the determination when the telephone call remains connected longer than would be expected for a non-suspect telephone. Another aspect is responding when the telephone call is answered with a pre-recording apology. The determination is made after responding with the pre-recorded apology.

Another aspect of the inventive techniques is a method of determining whether a cellular telephone which is in a traffic state of a call in a cellular telephone system is a suspect system. The method is performed in a signal analyzer and includes the steps of:

observing the DTX signaling state of the cellular telephone's uplink traffic channel;

if the uplink traffic channel is in a persistent DTX signaling state, determining that the cellular telephone is a suspect cellular telephone.

A further detail of the technique includes providing a warning indication regarding the call. The warning link increases in intensity as a duration of the persistent DTX signaling state increases. Other details include attacking the suspect cellular telephone on the downlink channel to cause silence and observing whether the silence is followed by non-DTX activity on the uplink channel. The attack is done in a fashion such that the attack does not cause the call to drop. Still others include analyzing traffic channels of calls to find another cellular telephone whose downlink channel has a persistent DTX signaling state in which the signals making up the persistent DTX signaling state correspond to the signals making up the persistent DTX state on the uplink channel. The DTX signaling state may be obtained from air paths exchanged between a base station of the cellular telephone system and the cellular system and/or from signals exchanged via an internal path of the cellular telephone system. In further details, there are versions of the method for GSM and CDMA.

A further aspect of the techniques is a method for determining whether a call in a cellular telephone system between a cellular telephone and another telephone is a call involving a suspect cellular telephone. The steps of the method are performed in a signal analyzer and include the steps of observing the DTX signaling state of the uplink traffic channel of the cellular telephone and of the downlink traffic channel for the other telephone and if the observed traffic channels have corresponding persistent DTX signaling states, determining that the call involves a suspect cellular telephone and the suspect cellular telephone's controlling telephone.

Details of the technique are as set forth above.

A still further aspect of the techniques is using the surgical analysis techniques with a mobile receiver to determine a position of an individual identify signals whose source is an individual wireless device. The method include applying surgical analysis techniques to the cellular environment to identify signals whose source is the individual wireless device, noting a rise and fall in energy levels of the identified signals, and based on the noted rise and fall, note a position of the mobile receiver at which the mobile receiver was in closest proximity to the individual wireless device.

Yet another aspect of the invention is a method of interacting with a suspect wireless device comprising the steps performed using surgical techniques of:

in the alternative, if the suspect wireless device is idle, engaging the suspect wireless device; or the suspect wireless device has a call in progress, overriding the signaling of the call in progress; and inserting DTMF tones into the downlink of the suspect wireless device.

BRIEF DESCRIPTION OF THE SEVERAL VIEWS OF THE DRAWINGS

FIG. 13b shows how failure to detect a member of the hopping sequence can be used to narrow the number of possibilities for the hopping sequence;

Figure 1:
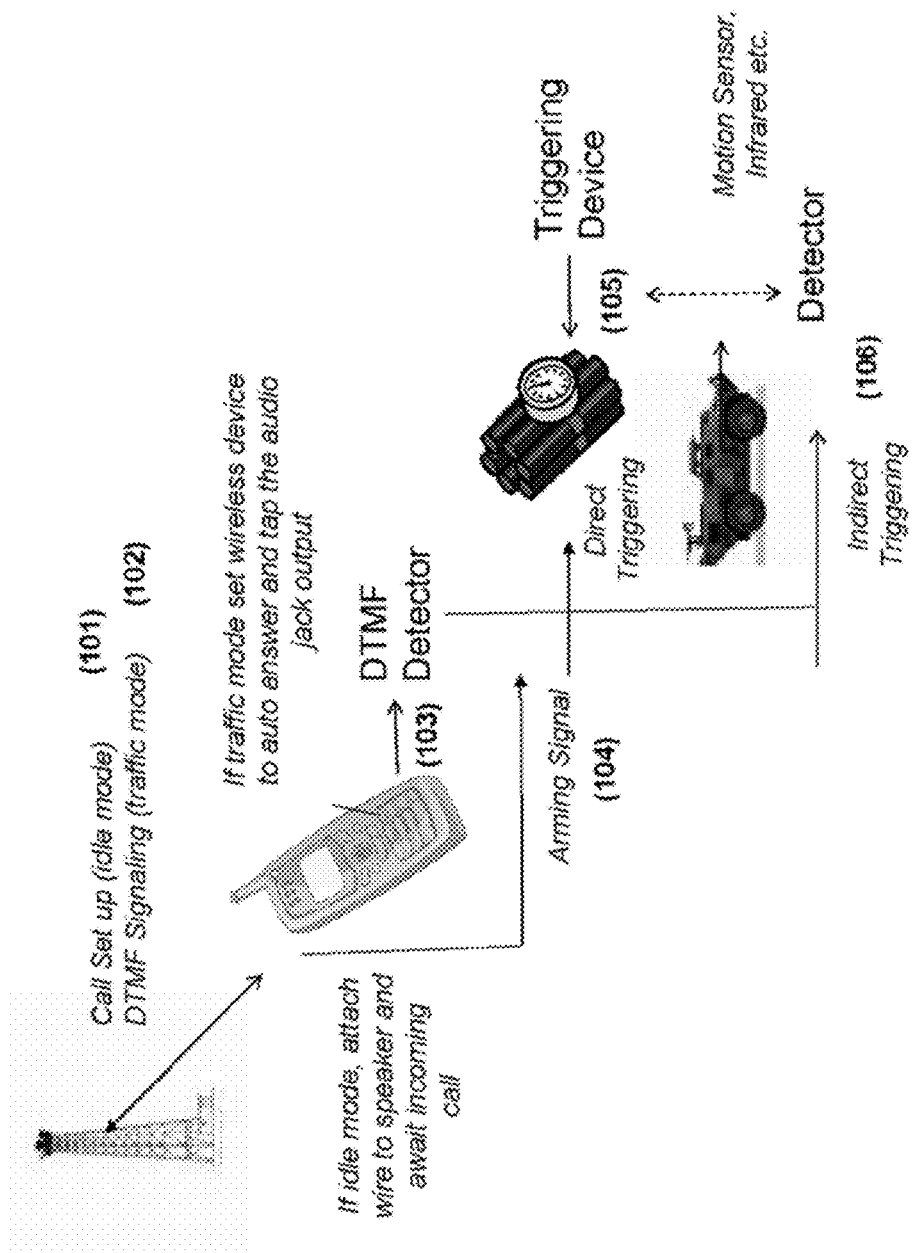
FIG. 1 provides an overview of how a wireless device may be used to trigger an explosive device.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION OF THE INVENTION

The following Detailed Description contains the complete Detailed Description of PCT/US2007/063493, James D. Haverty, Methods of Suppressing GSM Wireless Device Threats in Dynamic or Wide Area Static Environments having Minimal Power Consumption and Collateral Interference, of which the present patent application is a CIP. The new material in the present Detailed Description begins with the section Using the DTX mode behavior of a wireless device to determine whether a wireless device is a suspect wireless device. FIGS. 1-22 are from PCT/US2007/063493; FIGS. 23-28 belong to the new material. Reference numbers have two parts: the rightmost two digits are numbers within a figure; the remaining digits are the number of the figure in which the reference number first appears.

Certain Definitions

Cellular—Wireless communication in any of the generally accepted bands allocated for individual subscriber based voice or data communications.

DTMF—Dual Tone Multi-frequency (touch tone). Pairs of audible tones that are used in phone signaling to represent digits pressed on a wireless device keypad.

DTX—Discontinuous Transmission—the process by which either side of the terminus in a wireless network will stop normal transmission when it detects that there is no voice activity. The purpose of DTX is to conserve power.

PCS—Personal Communications Systems (synonymous with 'cellular') for purposes of this discussion Mobile Wireless device—A mobile device used by a subscriber for voice communication.

Wireless Device—general term for any wireless device, including but not limited to a mobile phone, a portable data assistant, or pager.

Standards—The governing technical standards describing the operation of certain cellular or other wireless systems.

CDMA (CDMA 2000)—Code Division Multiplexed Access as governed by the TIA IS-95 and IS-2000 standards.

GSM—Global System for Mobile Communications—ETSI standard describing a second generation system for mobile wireless communications.

Collateral Wireless Devices—Any wireless device that is not of interest operating either inside or outside of the operational area.

Beacon—A generic term used for the signal broadcast by a cell tower that continuously provides cell tower and system level information as well as timing so as to aid a wireless device in gaining access to a wireless network.

Operational Area—A predefined area in which all wireless devices will be affected by the surgical neutralizing system.

IMSI—International Mobile Standard Identifier—A unique identifier that is either associated with a specific subscriber or a wireless device used thereby.

TMSI—Temporary Mobile Standard Identifier—A temporary identification number used for local shorthand while the wireless device is operational in a system.

UMTS—Universal Mobile Telephone System—ETSI standard describing a third generation system for mobile wireless communications.

CRC—Cyclic Redundancy Check—A collection of bits that is appended to a packet of data which is used to detect if one or more bits in said packet was erroneously received.

Forward Channel—transmission in the direction from the beacon to the wireless device—also known as the Downlink Channel.

Reverse Channel—transmission in the direction from the wireless device to the beacon—also known as the Uplink Channel.

TCH—GSM designator for a traffic channel

SDCCH—GSM designator for a Stand-Alone Dedicated Control Channel

SACCH—GSM designator for a Slow Associated Control Channel

FACCH—GSM designator for a Fast Associated Control Channel

BCCH—GSM designator for the Broadcast Control Channel

SCH—GSM designator for the Synchronization Channel

FCCH—GSM designator for the Frequency Correction Channel

CCCH—GSM designator for Common Control Channel—umbrella designator for a collection of channels that carry either PCH or AGCH PCH—GSM designator for Paging Channel AGCH—GSM designator for Access Grant Channel Overview of the Surgical Neutralizing System The techniques for attacking, suppressing, or baiting wireless devices and apparatus for their implementation are collectively described as a surgical neutralizing system. The surgical neutralizing system employs the techniques for surgical signal generation described herein to reduce the power consumption required for suppressing wireless devices by factors of 1000 or more. The reduced power consumption makes the surgical neutralizing system usable either in ground based or air-borne vehicles and even as a portable device that can be carried by a soldier. The surgical neutralizing system is also capable of surgically limiting the attack to only those wireless devices that are deemed to be a potential threat or otherwise minimizing collateral interference in cases where the wireless device-specific surgical operation is not possible.

The surgical neutralizing system employs a receiver paired with a signal generator. The receiver obtains information in real time about beacons and wireless devices in the convoy's operational area. This information may be broadly termed environmental information. The environmental information includes the parameters of the beacons and their timing relative to a timing signal provided by the surgical neutralization system. It also includes what wireless devices are present in the operational area and the hopping sequences of the wireless devices. Finally, it includes the current position of the surgical neutralizing system when the environmental information is obtained. The receiver provides the environmental information to the signal generator, which generates jamming signals, that is, waveforms which surgically neutralize wireless devices which pose threats in the convoy's operational area. The surgical neutralizing system further saves the environmental information for future reference. When the convoy returns to a location, the saved environmental information for the location can be recovered and used to accelerate determining the current environmental information for the location.

The surgical neutralizing system is also capable of cloning a beacon by passing the beacon's parameters in the environmental information to the signal generator. The signal generator employs the parameters to clone the beacon on another frequency channel. The clone beacon is termed in the following an artificial beacon, while the beacons belonging to the service providers are often termed live beacons. In a preferred embodiment, artificial beacons are used in three ways:

As a source of timing information about the live beacons.

As a baiting beacon. A baiting beacon is an artificial beacon which is set up in such a fashion that the wireless devices in an operational area monitor the baiting beacon instead of a live beacon.

As a communications medium between different instances of the surgical neutralizing system in an operational area.

When used as a source of timing information or as a communications medium, the artificial beacon is modified so that beacons and wireless devices in the environment will not respond to it. In a preferred embodiment, this is done by setting the mobile country code or mobile network to some values that will not entice the wireless device such a 0, 0 or inverting the CRC of one of the artificial beacon's compulsory system messages.

When an artificial beacon is used for timing, the receiver listens for the artificial beacon and determines the timings of the live beacons which it is monitoring relative to the artificial beacon. It then provides the timing difference information to the signal generator for use in generating waveforms to attack wireless devices that are interoperating with or using the timing of the beacons.

When the artificial beacon is set up as a baiting beacon, all of the wireless devices in the operational area are enticed to monitor the baiting beacon and are thereby prevented from interacting with the live network. That in turn prevents the wireless devices from receiving incoming calls that act to either indirectly arm or directly trigger explosive devices. The use of artificial beacons as baiting beacons is completely independent of their use to determine the timing information for the live beacons. Like live beacons, a baiting beacon must broadcast continually. An artificial beacon that the receiver is using for timing information will not be set up to entice wireless devices; moreover, the timing information for live beacons is very stable, so the generator need transmit an artificial beacon that is being used for timing only at intervals of several minutes to permit the receiver to refresh the timing information it provides to the generator. It should be finally be pointed out that while it is convenient to use an artificial beacon to determine timing information, any signal that is regularly provided by the generator can be used for that purpose.

The receiver paired with a generator is also capable of engaging a wireless device by setting up a baiting beacon to entice the wireless device and then acting as the baiting beacon's base station. As such, the surgical neutralizing system can disable the wireless device using various techniques described herein.

Characteristics of GSM which Render it Attackable by the Surgical Neutralizing System The techniques of attacking the cellular signal are predicated on a number of characteristics of GSM. These include but are not limited to:

a) GSM uses highly-structured digital modulation that requires extremely precise timing as established by the network. Therefore any surgical attack requires that the interferer synchronize to the timing on the network of interest.

All digital standards have specific waveform vulnerabilities that can be exploited if the timing is known to a high degree of precision. This also makes it possible to limit transmission to only a small percentage of the time as well as limit the required signal bandwidth. This reduces the average required power by several orders of magnitude over conventional techniques that use nonspecific targeting of the signal. For example, even if the peak power required to interfere with a signal may be significant, it is only on for a very small fraction of the time making the power consumption averaged over time very low.

Having a high degree of synchronization to the network of interest also makes it possible to hijack a signal by overriding it with a higher signal level. It further makes it possible for the interference to hide within legitimate waveforms by crafting a waveform with the same frequency and modulation characteristics. This coupled with pseudo-random transmit times makes it extremely difficult to detect and subsequently locate and/or counter the source of the interference.

b) All communication in wireless telephony systems is necessarily full duplex. If either direction in the communication link is severed then the network will necessarily end the connection. It is therefore not necessary to attack both sides of the communications link simultaneously.

c) The GSM standard makes use of expressly reserved synchronizing sequences and parity checking (e.g., cyclic redundancy checks—CRCs) that respectively enable a receiver to unambiguously synchronize to a transmitter and to detect and discard information that is received in error. Therefore the interfering signal needs only to be sustained to the degree necessary to force either a synchronization or a parity error in the receiver. Consequently, only a small number of symbols within packetized information need be corrupted in order to have the intended effect. Furthermore parity failures and in many cases synchronization failures are insensitive as to which bits in the transmission are received in error, which makes it possible to randomize the transmission time so as to thwart either detection or subsequent location of the source of interference.

d) Duplex operation—fine timing makes it possible to both listen to and interfere with the same signal without the interference affecting (e.g., blinding) the reception.

Application of the Surgical Neutralizing System to Other Wireless Telephony Standards The general principals of identifying wireless device beacons, synchronizing to them and in turn using this timing to drive signal generators to surgically corrupt vulnerable parts of the signaling waveforms between wireless devices and associated beacons, so as to cause parity or synchronization errors, are not limited in their application to the GSM standard. Other standards including but not limited to CDMA, CDMA 2000 and/or UMTS also use protocols that have precise timing and that have vulnerabilities that can be exploited by taking advantage of the precise timing to surgically attack specific parts of the signaling waveform and thereby to corrupt messages belonging to the standard in a fashion which prevents the wireless device from performing the action that arms, triggers, or otherwise causes a hostile device to detonate or otherwise become active. Therefore, while the particular techniques described herein are specific to the GSM standards, it will immediately be understood by those skilled in the relevant technologies that the surgical neutralizing system as applied to GSM is a particular example of a general methodology that can be applied to wireless devices that operate according to any digital wireless standard.

Idle Versus Active Wireless Devices and Triggering Methods—FIG. 1.

A wireless device will be in either an idle mode (101) or traffic mode (102). The wireless device can be used to trigger an explosive device in either mode. In idle mode, the wireless device is waiting for an incoming call. When an incoming call to the wireless device arrives in the tower, a call setup must take place, and the call set up activity can trigger the explosive device. For example, part of the call set up activity is the alert message sent from the tower to the wireless device. The alert message causes the wireless device's audible ringer to sound (105). The current needed to make the ringer sound can also be used to detonate the explosive device. Another way of using the wireless device when it is in inactive mode is to place a call to the wireless device in advance to arm some other primary triggering mechanism, for example a motion sensor, in order to thwart jamming of the wireless device when the convoy comes within close proximity to the device (106).

For a perpetrator, a potential drawback of calling a wireless to effect direct detonation is that the timing of the call is likely to be imprecise (due to the vagaries of the call setup timing, the network loading etc.) meaning, the device could easily detonate prematurely or well after the intended target is out of range. This limitation suggests that a perpetrator may attempt to operate in traffic mode (102). Here, the call has already been established in advance and the perpetrator is waiting for the right time to perhaps hit a key or otherwise send a signal to the phone. An example (103) would be to set up the wireless device in auto-answer mode and connect the headset audio output to a readily available DTMF detector. The perpetrator then keys in a series of DTMF digits (akin to a personal identification number—a.k.a. PIN) but refrains from keying in the last digit until precisely the right moment. In this case, the suppression techniques must necessarily deal with problem of frequency hopping and discontinuous transmission (DTX) employed in the GSM standard. More specifically wireless devices employ discontinuous transmission to improve battery life by only transmitting when the subscriber is talking. In the absence of speech, the device will only transmit relatively infrequently-primarily to keep the communications link open. This will be the expected case when the wireless device is connected to an explosive device. While the exact timing of these transmit bursts is precisely dictated by the network timing and therefore known by the receiver described herein, the transmit bursts will hop from frequency to frequency according to a sequence (the hopping sequence) over a potentially wide swath of spectrum. The hopping sequence is determined at call set up and will not be known to the surgical neutralizing system in advance. Methods for dealing with these conditions are described herein.

Modes of Operation

Figure 2:
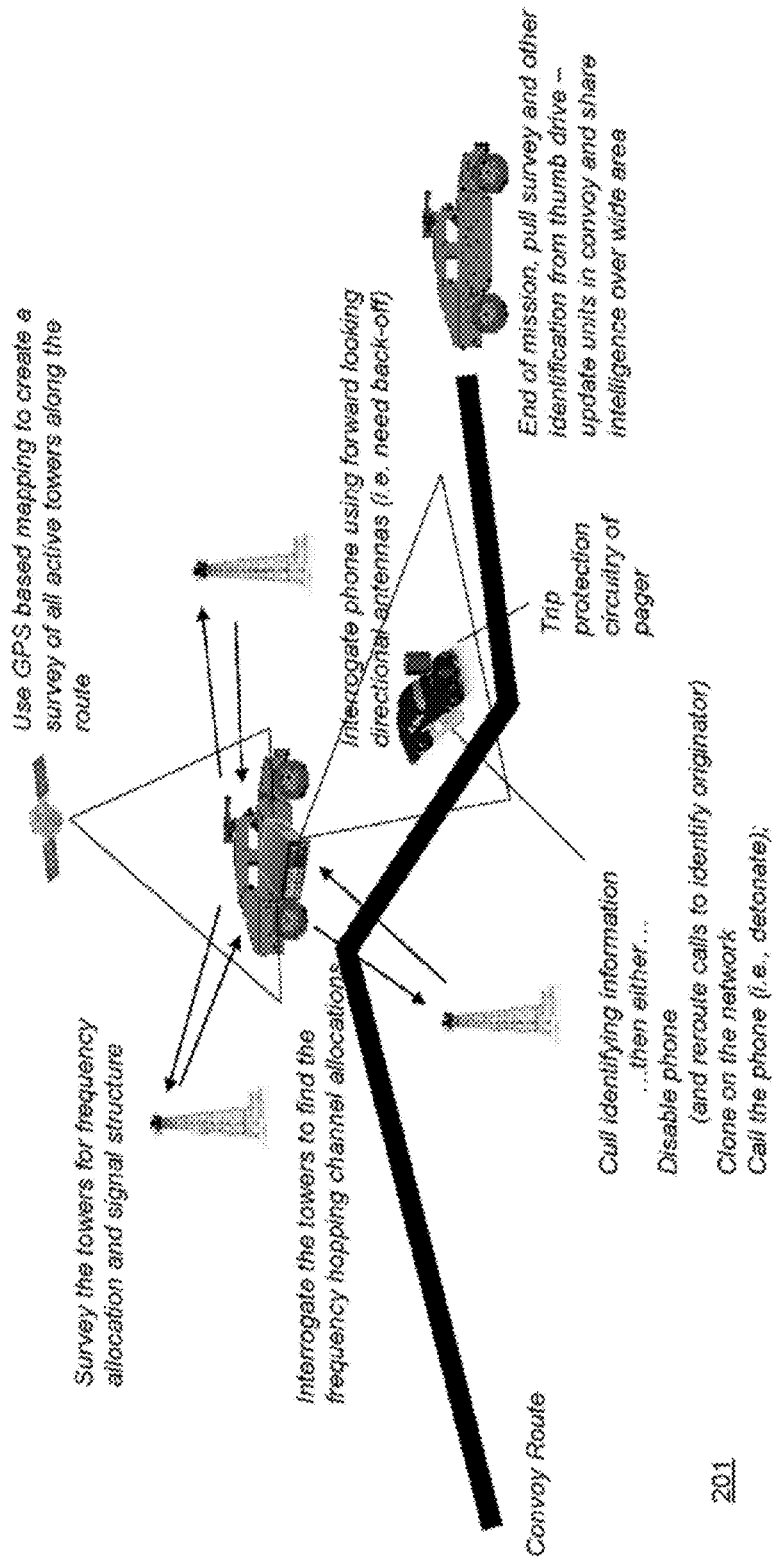
FIG. 2 shows the scout mode of operation of the surgical neutralizing system.
Figure 3:
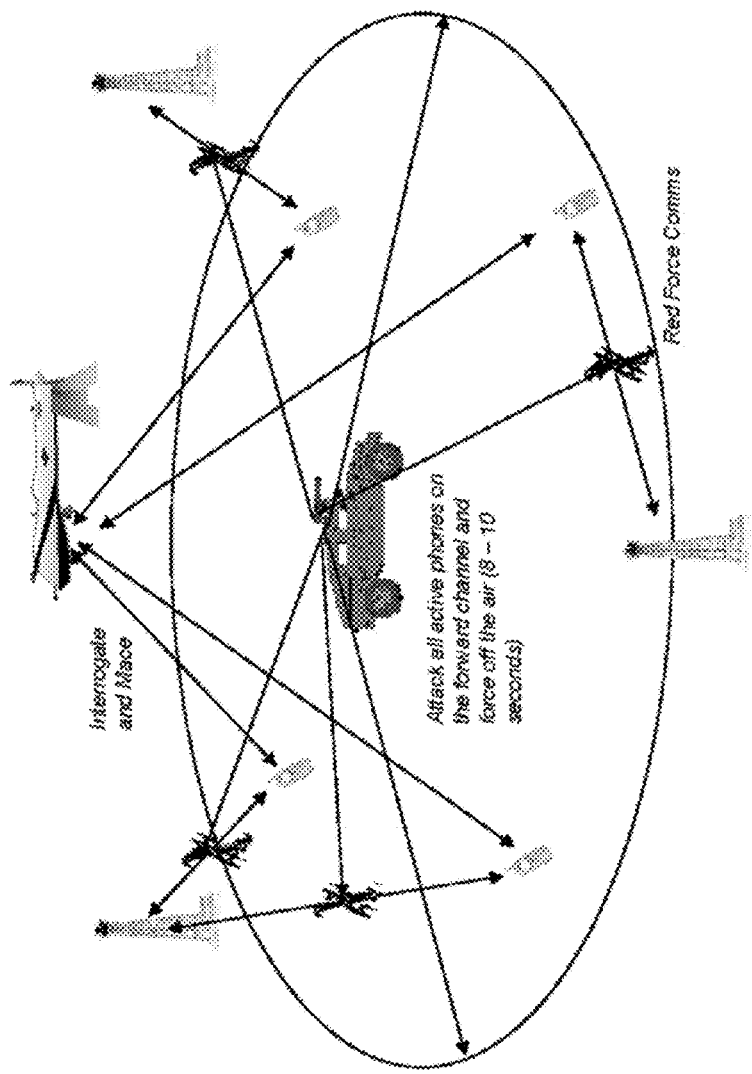
FIG. 3 shows the static mode of operation of the surgical neutralizing system.
Figure 4:
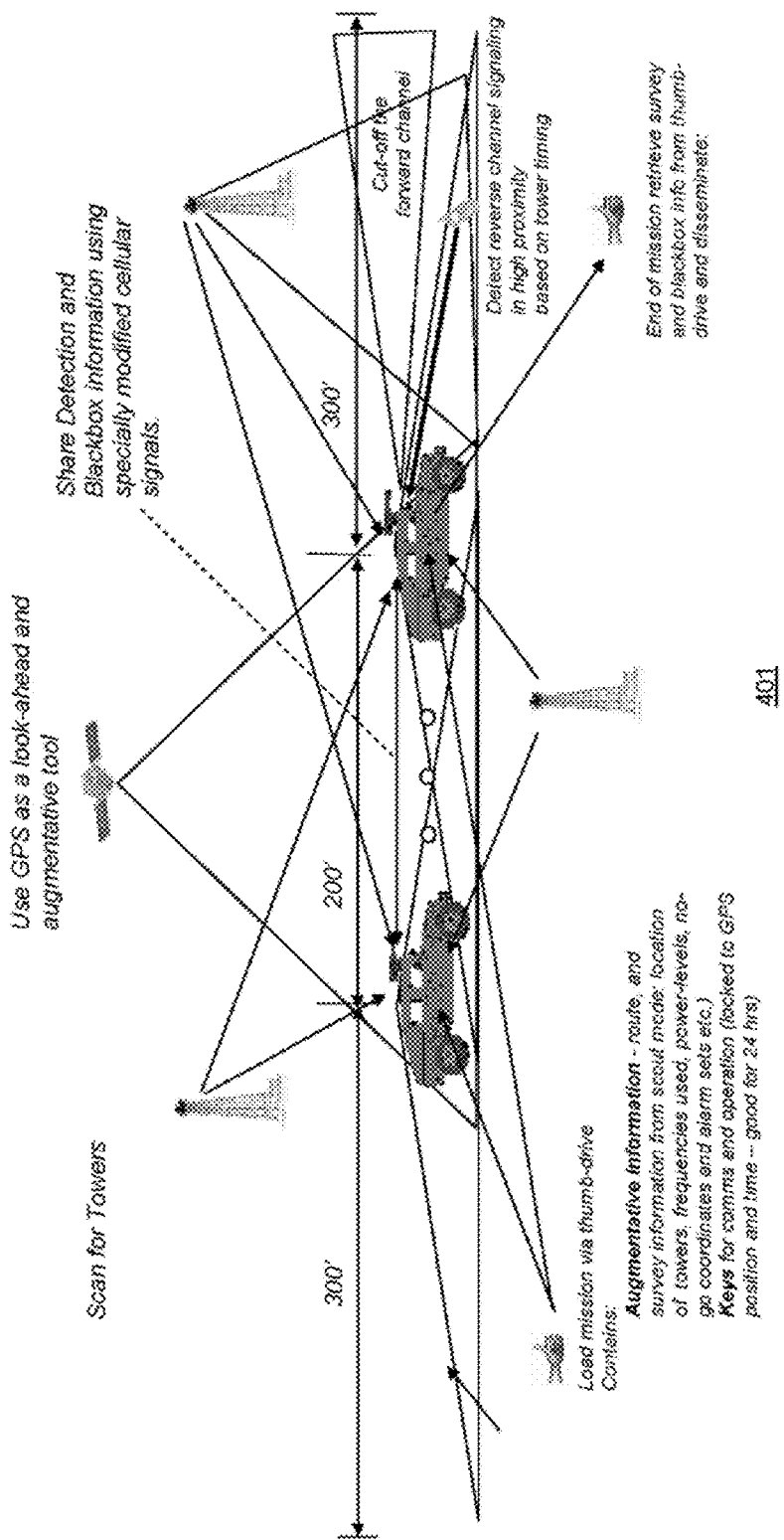
FIG. 4 shows the convoy mode of operation of the surgical neutralizing system.

The surgical neutralizing system has three modes of operation: scout, static and convoy as shown in FIGS. 2, 3 and 4 respectively. In scout mode (201), the surgical neutralizing system finds cell phones that are in idle mode and on either side of the roadway in advance of a convoy. Once a cell phone is detected, a number of techniques which are described herein can be used to neutralize or otherwise obtain intelligence from the wireless device. Scout mode (201) can also take the proactive step of monitoring any beacon in a location area(s) in which a convoy will be operating in order to inventory all wireless devices that are active and then send detach messages en masse to the network for the inventoried wireless phones that indicate to the network that the wireless devices are now powering down. Because the network believes that the wireless devices are powered down, it will not forward incoming calls to the wireless devices. This technique is described under the heading of General Attack Strategies.

In static mode (301), a mission is being performed in either well defined localized area or the convoy has stopped moving for an appreciable period of time. Here the surgical neutralizing system is concerned with preventing access to the system for purposes of suppressing hostile communication. For example, the surgical neutralizing system needs only to force existing subscribers that are in traffic mode off the air (attack for several seconds) and then begin either a highly surgical attack or enter a baiting mode which keeps all wireless devices in the operational area from gaining or regaining access to the live network. Given sufficient time, the surgical neutralizing system can take the added step of interrogating and subsequently disabling any or all phones either temporarily or semi-permanently within the operational area. This not only provides added protection, but also provides a basis for estimating the number of people that are present in the operational area.

In convoy mode (401), suppression has to be provided dynamically because the convoy is on the move. Here the surgical neutralizing system is concerned with suppressing wireless devices that are in close proximity to the convoy and are actively signaling. All that is necessary in convoy mode is to suppress communications between the beacons and the wireless devices until the convoy has passed. There is no need to force the wireless telephone system to drop the call. In many cases the ability to neutralize a call without forcing it to drop is a welcome feature, as only a very tiny fraction of wireless devices will be employed as detonators. One method of suppressing communications without causing the call to drop is to refrain from attacking the slow associated control channel (SACCH) which is primarily used to manage the communications link but does not carry any signaling information that can effect triggering of some device. This method is described under the heading of Specific Attack Techniques.

Which mode of operation is required at a given moment can be determined either from GPS or from accelerometers built into the hardware. Furthermore none of the techniques or apparatus described herein is limited to a particular platform. Surgical neutralization systems may be constructed which have size, weight, and power requirements such that they may be carried in ground or air vehicles or even by individuals.

Preferred Embodiment

Figure 5:
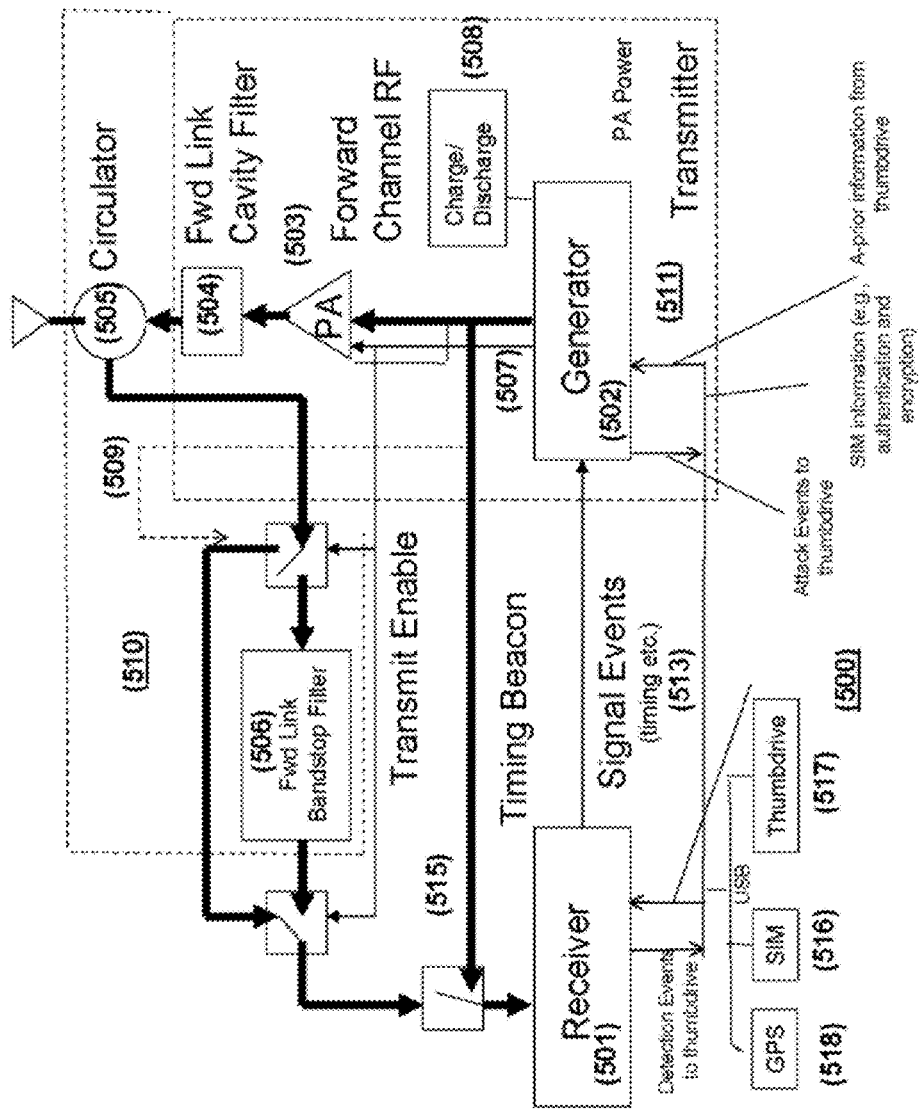
FIG. 5 is a functional block diagram of a preferred embodiment of the surgical neutralizing system.
Figure 6:
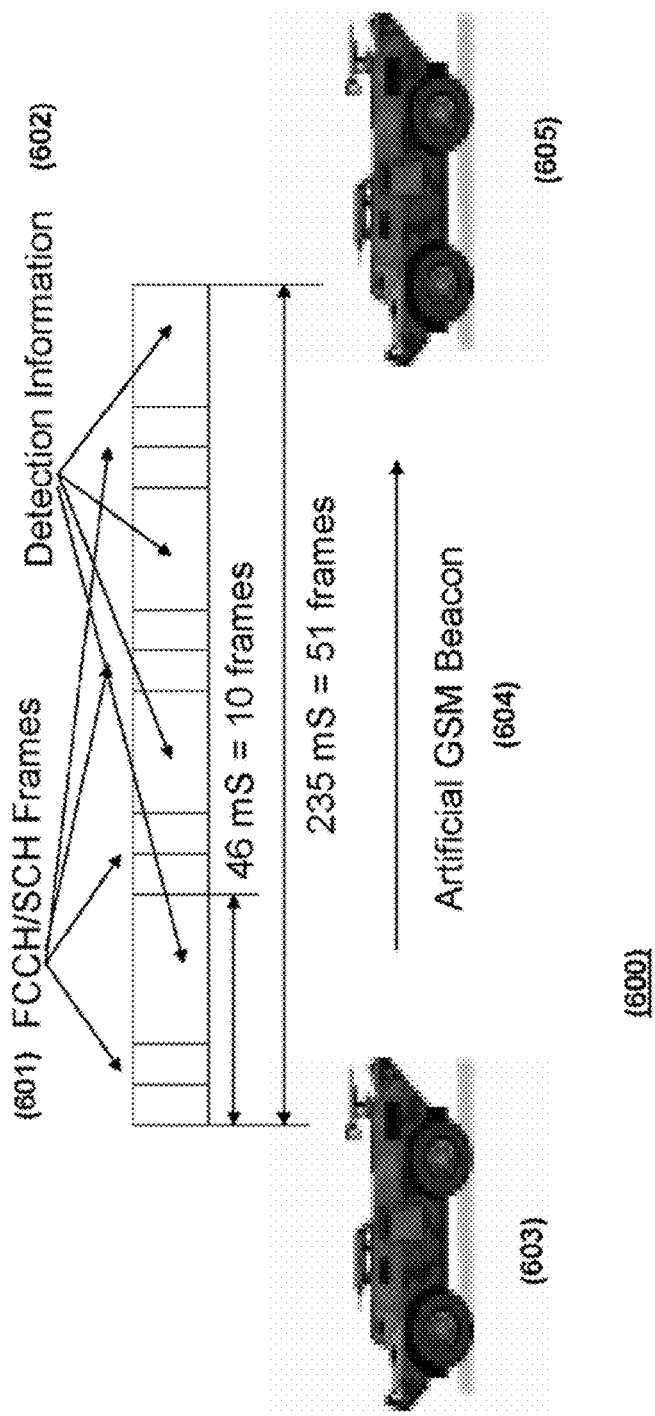
FIG. 6 shows how the artificial beacon produced by the surgical neutralizing system can be used to communicate information among instances of the surgical neutralizing system.

FIG. 5 shows a preferred embodiment of surgical neutralizing system 500. It consists of a receiver 501 and a transmitter (511). Transmitter (511) includes a generator (502) and an RF assembly 510. The purpose of the receiver (501) is to a) dynamically detect GSM beacons as the convoy moves and extract relevant timing and channel assignment information and b) detect when a wireless device is actively signaling in close proximity. The purpose of generator (502) is to generate some number of signals that are expressly timed to any or all of the beacons in the local area to within less than a microsecond. This highly precise timing enables highly surgical signal attacks on the wireless devices which appear to be threats. Furthermore, generator (502) is also capable of simulating the operation of a GSM beacon or wireless device and is therefore able to bait, interrogate, and/or neutralize beacons or wireless devices. These capabilities of generator (502) find their primary use in scouting mode (201). The generator and receiver can exchange information using any number of communication paths depending on a particular implementation. This can include but is not limited to shared memory, USB, a common back plane or perhaps Ethernet.

RF assembly (510) provides the final power amplification (PA) (503) as well as combining, distribution and switching circuitry that enable the system to operate in full duplex mode. It shows a cavity filter, a circulator and a stop band filter (504, 505, 506), the combination of which vastly diminishes the transmit energy that loops back into the receiver path to prevent the receiver from being damaged while transmitting. In other embodiments, separate transmit and receive paths including separate antennas may be employed in place of the circulator coupling of the transmit and receive paths. The separate antennas may be strategically placed or otherwise designed to provide additional spatial isolation. Because very little transmitted energy loops back into the receiver path, the receiver (501) can constantly monitor the wireless device's reverse link without regard to the transmit state and to be blanked from monitoring the wireless device's forward link only when transmitter 511 is on. Not shown is additional sub-band filtering in the receiver.

An important aspect of this embodiment is that PA (503) is surgically enabled to only be active when needed (507) as controlled by generator (502). Since PAs are notoriously power inefficient (typically 35%), the ability of the surgical neutralizing system to surgically enable and disable them at will achieves a significant average power consumption reduction. The techniques described herein do not require any particular amplification level; what the amplification level provided by the PA determines is the potential operational area over which the surgical neutralizing system will have influence. Also shown in FIG. 5 is a charge/discharge circuit (508) that is used to provide large power levels for short durations. This serves the purpose of averaging the power consumption over time and thereby makes it possible to power the surgical neutralizing system from very modest sources such as a cigarette lighter in a vehicle. The specific nature of the charge/discharge is not material to the design and can use various technologies such as capacitors or gel cells depending on the anticipated level and duration of extra power draw.

The preferred methodology of synchronizing the generator to live wireless networks is to generate an artificial beacon (509) and then have receiver (501) compute the timing difference between the artificial beacon and the live beacons belonging to the wireless networks and pass this information back to generator (502) so that it can correct the timing of any subsequent attacks (513). However this embodiment also makes provision for an internal loopback (515) to prevent potential countermeasures from jamming the artificial beacon (509) and thus thwarting the operation of signal (512).

The preferred embodiment can also emulate a GSM wireless device that can make live calls to the network. The purpose is to discover the frequency hopping sets employed by a particular tower when in scouting mode. A particular difficulty in dealing with wireless devices that are already in the traffic state is that they are hopping using an unknown sequence over a potentially wide swath of spectrum. This causes a delay in the time it takes to detect their presence when they are signaling in high proximity. The potential number of hopping sequences is large (several thousand). Furthermore, a threatening wireless device is likely to be in DTX mode and consequently only rarely emitting an active burst. The combination of the large number of hopping sequences and the paucity of active bursts makes it challenging to discover the threatening wireless device's hopping sequence in a timely fashion. However it is well understood in the art that because of radio frequency planning constraints, the pool of sequences used by a tower (or sector thereof) is only a very small fraction of the total possible. Therefore, by making a test call to the tower it is possible to identify the complete set of channels over which the phone will hop and whittle the number of sequences the tower uses down to a very small set. Doing so gives the surgical neutralizing system an enormous head start in discovering which hopping sequence is being used in any subsequent attack. A specific methodology for discovering the actual hopping sequence is described under the Active Mode subheading of General Attack Strategies.

A transceiver that can easily be augmented to implement the surgical neutralizing system is the ComHouse Wireless Network Subscriber Test (NST), which may be purchased from ComHouse Wireless LP, 221 Chelmsford St., Chelmsford, Mass. 01824. The unit is a software defined radio capable of testing both wireless devices and base stations using the GSM and CDMA standards. NST can interrogate wireless devices by acting as a beacon and can scan cellular environments so as to identify and analyze beacons, and can generate multiple simultaneous signals which can be used as interference signals. The interference signals may be customized to surgically attack or manipulate cellular signals with sub-microsecond precision. The unit can also make and receive outgoing and incoming phone calls. The NST provides the receiver and generator subsystems (501) and (502), with the remaining circuitry shown in FIG. 5 being added to perform the functions of boosting the generated signal to levels necessary to neutralize live signals, the receiver protection circuitry being designed to keep the transmitter from damaging the receiver and the artificial beacon loopback circuitry being used to provide generator timing to the receiver.

Full Duplex Principal and Look Through/Jam Through

In convoy mode (401), only wireless devices that are in close proximity to the convoy pose a threat. Thus, in convoy mode, surgical neutralizing system (500) works by having receivers listen on the reverse link for close proximity signaling and when such signaling is discovered, having the transmitters surgically attack the paired forward link. This capability of listening and then jamming known in the art as a look through/jam through capability. This capability is advantageous for the reasons enumerated below:

Minimization of Receiver Complexity—The receiver complexity is dramatically reduced as it is only necessary to perform energy detection on the reverse link channels (as opposed to for example demodulation that might be required if attempting to detect specific signaling in other possible modes of operation). This is a direct consequence of acquiring, in advance, the timing of the signal from the forward link.

Minimization of False Alarms, Collateral Interference and Power Consumption—Only high proximity wireless devices cause a response from the surgical neutralizing system. This diminishes the false alarm rate and subsequently attacks by the surgical neutralizing system on the high proximity devices are limited in scope and duration, which in turn reduces power consumption and collateral damage.

Continuous Full duplex operation—This enables the surgical neutralizing system to continuously listen on the reverse link without being blinded by the forward link attack or to otherwise have to schedule access to the reverse link signal. This makes it possible to immediately detect a close proximity wireless device and eliminates the control complexities associated with scheduling. It also makes it possible to unambiguously determine when to end an attack based on whether the signaling from the wireless device under attack drops below some threshold or ends altogether.

Forward channel attack—Attacking a wireless device's forward channel attack is superior to attacking its reverse channel for the following reasons Detonation signaling comes down on the forward link.

Minimization of collateral interference—this is achieved by controlling the transmitted power. A reverse channel attack is likely to affect all subscribers, regardless of how the power levels are controlled. The reverse channel attack will also alert the network to the presence of the interference.

Any attack on the reverse channel is likely to precipitate a handover to another beacon via the presumably still viable forward channel. An attack on the forward channel cuts off this avenue.

The geometry is not always favorable for an attack on the reverse channel because it may be the case that a tower can "see" the wireless device and not the attack signal (e.g., due to sectoring) or possibly fading.

It can take 15 seconds or more for either side of the link to drop a call when the link is attacked. Attacking only the reverse channel will leave the forward link viable and still capable of effecting detonation for this period of time.

Beacon Timing, Surgical Attacks, and Scheduling

The surgical neutralizing system mounts surgical attacks on close-proximity wireless devices by recovering the timing of any and all beacons with which the wireless device could conceivably be communicating. The receiver continuously scans the forward link spectrum (in parallel to any reverse channel energy detection) searching for beacons. When a beacon is detected it recovers the relative timing to within a microsecond. This timing must in turn be provided to the generator. The technique used to do this in the preferred embodiment (509, 510, 511) is to use an artificial beacon that gets looped back (509) from the generator to the receiver. The receiver then reports the timing of any legitimate beacon relative to this artificial beacon to the generator so that the generator can correct the timing of the artificial beacon. The loopback can either be internal to the unit using RF switching or be done directly over the air. This technique dramatically simplifies the problem of generator timing because it eliminates the need to expressly synchronize the generator and receiver (including accounting for any subsystem timing vagaries and/or calibration) and furthermore establishes the timing as it is seen "in the air" as opposed to the time established post receiver signal detection (which invariably has some number of delays that may be difficult to characterize and therefore calibrate). It also completely decouples the receiver and generator so that changes in design or manufacture of one do not affect the other. The surgical neutralizer makes provisions for one or more USB interfaces to accommodate a subscriber identity module (SIM) (516) and/or a mass storage device such as "thumbdrive" (517) and or a global positioning system (GPS) (518). The purpose of SIM (516) is to enable the neutralizing system to make legitimate phone calls to the network, most notably to discover the hopping sequence number (HSN) employed by a beacon (i.e., broadcasting on some sector of some tower), the purpose of thumbdrive (517) is to record information detected in the environment such as which beacons where detected at what position, what was attacked and when, such that it can be used for post mission analysis or used as a-priori information on a subsequent mission (e.g., taking the thumbdrive out of one system and inserting it in another), and the purpose of GPS (518) is to provide the current position of the surgical neutralizing system to receiver 501 to be included in the environmental information.

The surgical neutralizing system further uses the artificial beacon to communicate between several surgical neutralizing systems in a convoy. This is shown at (600) in FIG. 6. Here, artificial beacon (604) is used to propagate information between a vehicle (605) at the head of the convoy and a vehicle (603) at the rear. The information may include information concerning the detection of wireless devices of interest between vehicles. This is useful when one of the vehicles is either significantly delayed in detection of an active wireless device or even blinded by the metal in the convoy vehicles. Artificial beacon (604) can carry this extra information because the only information actually required by the receiver to achieve timing is the FCCH/SCH channel pairs (601). These occur approximately every 46 mS in the 235 mS, 51 multi-frame and last for approximately 10 mS. This leaves a significant amount of unused time in the 51 multi-frame that can be used to convey information between systems (602). The worst case latency for communicating information via artificial beacon (604) between vehicles is 50 mS, which is well within the anticipated reaction time of the surgical neutralizing system.

All that is required to make artificial beacon (604) into a communication channel is to create a new message that always follows the FCCH/SCH pair in the BCCH and identifies beacon (604) as being artificial. The remaining frames of artificial beacon (604) can be utilized to convey communications in a broadcast fashion to other units of the convoy that can receive an artificial beacon (604).

Other techniques may be employed as well for communication between surgical neutralizing systems. Another possibility is to use GSM forward traffic channels employing frequency hopping that is synchronized to GPS. This can serve several purposes, such as hiding within the cellular system so as to thwart detection and/or potential countermeasures that might be employed to attack the modified artificial beacon.

The ability to establish live beacon timing to within a microsecond makes it possible for the surgical neutralizing system to surgically attack vulnerable points in the GSM waveform using methods described herein. The nature of the attacks are described under the heading Specific Attack Techniques. One problem with this strategy is that the receiver and transmitter can collide with respect to gaining access to the forward link. To prevent damage to the receiver circuitry, the receiver signal path for the forward link (which is searching for and or characterizing beacons) must be shut off when the transmitter is active. The surgical neutralizing system deals with this as shown in FIG. 5 (506, 507) where the purpose of the RF switch filter path is to insulate the receiver while the transmitter is active. Switch signal (507) is controlled by the generator and is also used to gate fast-on amplifier (503).

Because the generator is now synchronized to the live beacons, the generator can independently determine when the receiver will scan a beacon and suppress transmission of the artificial beacon and/or attack wave forms for that period. Consequently, the receiver is never starved for information. This is described in detail under the heading Detection Mode. Because the generator can independently determine when the receiver will scan a beacon, the receiver and generator need not expressly coordinate their scheduling. This in turn dramatically simplifies control and further fosters treating the receiver and generator as abstractions.

General Attack Strategies

As described previously the surgical neutralizing system must consider both idle case (101) where the mere act of establishing a call sets off the device and the traffic mode case (102) where the call has already been established and is waiting for some triggering information transmitted on the traffic channel (TCH) or the fast associated control channel (FACCH). The following is a brief description of each case.

Idle Mode 101

In the idle mode, the wireless device is registered (location updated) with the network and monitoring a paging channel of some serving cell (presumably on the closest tower—but not necessarily) awaiting pages from the network. GSM employs the notion of "location areas" where pages intended for some wireless device are simultaneously distributed to all of the towers in the same location area. The premise is that it frees the wireless device from being tethered to some specific tower as it moves. Instead the wireless device can unilaterally choose to monitor any tower that is in the same location area so as to improve roaming fluidity. It is only when the wireless device moves to another location area (as evidenced by the fact that it can detect a more prominent tower in a new location area) that it performs what is termed a "location update" and reregisters with the network on this beacon (tower) presumably in the new location area. An important implication of the fact that a wireless device may choose to monitor any tower in a location area is that it may be necessary in some modes of operation to suppress not just the strongest beacon in an operational area, but all beacons in the operational area.

Figure 7A:
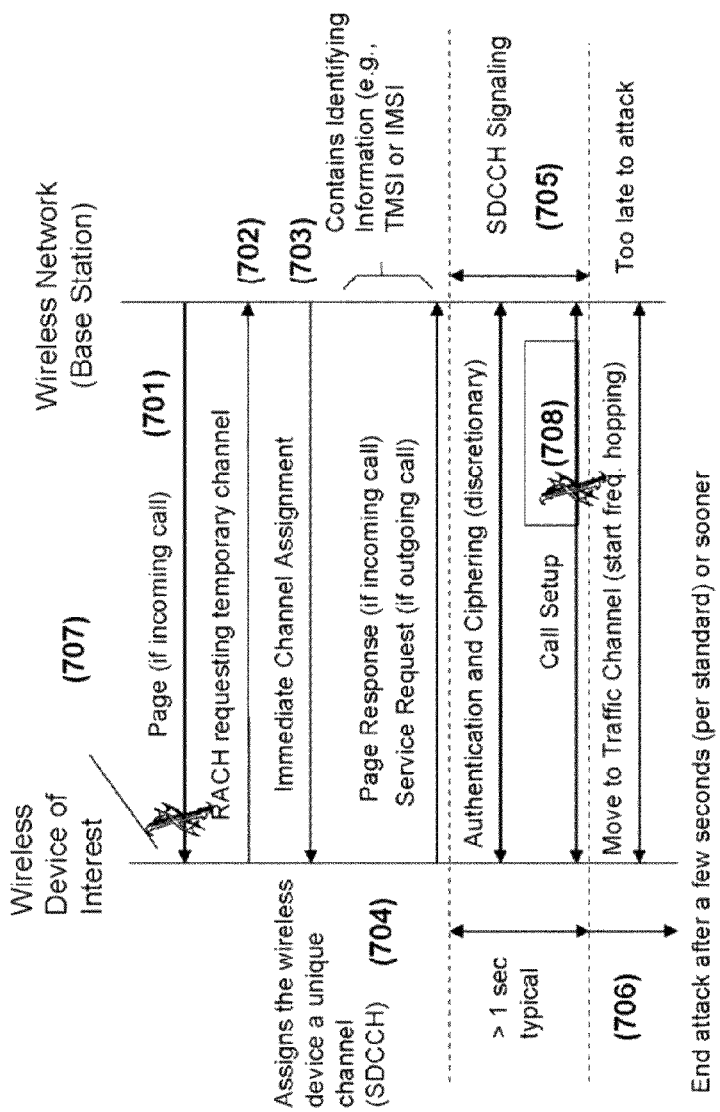
FIG. 7a shows the GSM call set up signaling process.

The GSM call setup signaling process is illustrated at (700) in FIG. 7*a*. When a wireless device detects a page (701) from a beacon that the wireless device is monitoring, the wireless device will send a very short burst back on the Random Access Channel (RACH) to the tower requesting a temporary channel (702). There is no identifying information for the wireless device in the RACH burst). The tower reserves a timeslot, channel, and perhaps a set of channels for frequency hopping for the temporary channel and then responds on either the paging or access grant channels (which one is immaterial in this context) with information indicating the reserved channel, timeslot and so on (703). The reserved channel is the stand-alone dedicated control channel (SDCCH) (704). The wireless device and the tower then communicate back and forth on this SDCCH (705) to among other things establish the identity of the wireless device and set up a traffic channel for the incoming call that caused the page. The communication between the tower and the wireless device on SDCCH (704) is encrypted early on, but as will be explained in detail below, the fact that the communications on the channel arc encrypted does not prevent the surgical neutralizing system from attacking them. Once the call setup control signaling is complete, the tower directs the wireless device to a traffic channel (706) to start voice conversation and issues the aforementioned "alert" message alerting the wireless device that there is an incoming call. This message causes the wireless device to ring and can thus be used to arm or detonate an explosive device that is attached to the wireless device. As can be seen from the foregoing, if an attack on the forward SDDCH link can cause call setup to fail before the wireless device receives the "alert" message, a call to the wireless device will be unable to arm or detonate an explosive device (708).

The surgical neutralizing system uses two strategies to handle the idle mode (i.e., call setup) case: proactive or reactive, with the understanding that nothing precludes combining both strategies. In the proactive case, as soon as a tower is detected, the surgical neutralizing system moves to suppress the paging channels/access grant channels and camp on those channels until the tower is no longer detectable in the operational area (707). Another strategy is to offer a baiting beacon that entices all of the wireless devices to monitor it rather than the live network beacons. In either case, any possibility of consummating an incoming call is cut off. In the reactive mode, the surgical neutralizing system instead camps on the reverse SDCCH channels and looks for close proximity activity by a wireless device. When such activity is detected, the surgical neutralizing system attacks the paired forward SDCCH channel before the alert message can get through (708) to the wireless device. The following compares the two strategies.

Proactive Idle Mode Pros and Cons

The proactive solution does not require fast reaction times. It also removes the need to allocate receiver resources to continually monitor the reverse SDCCH channels. Furthermore, it addresses a theoretical concern that a mere page could set off the explosive device. However, because the wireless device may monitor any beacon belonging to the location area in which the wireless device is located, all paging channels for all of the beacons in the operational area must be suppressed simultaneously. This may require significant signal generation resources and corresponding high power requirements and high costs for the surgical neutralizing system. The need to suppress all paging channels simultaneously also presents significant resource scheduling challenges in areas with a high concentration of viable beacons.

Figure 7B:
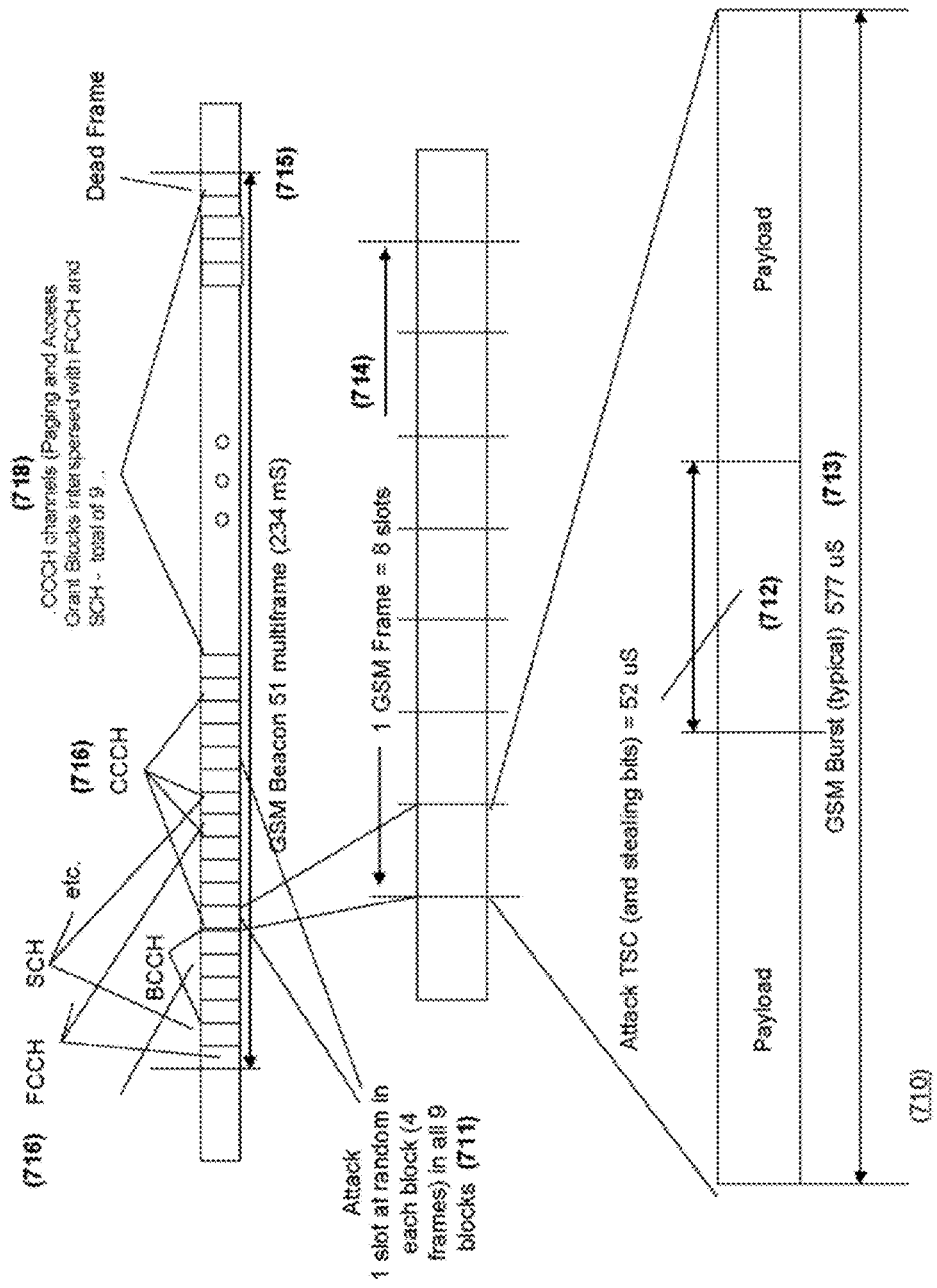
FIG. 7b shows the structure of a GSM 51 multiframe, a GSM frame, and a GSM slot.
Figure 7C:
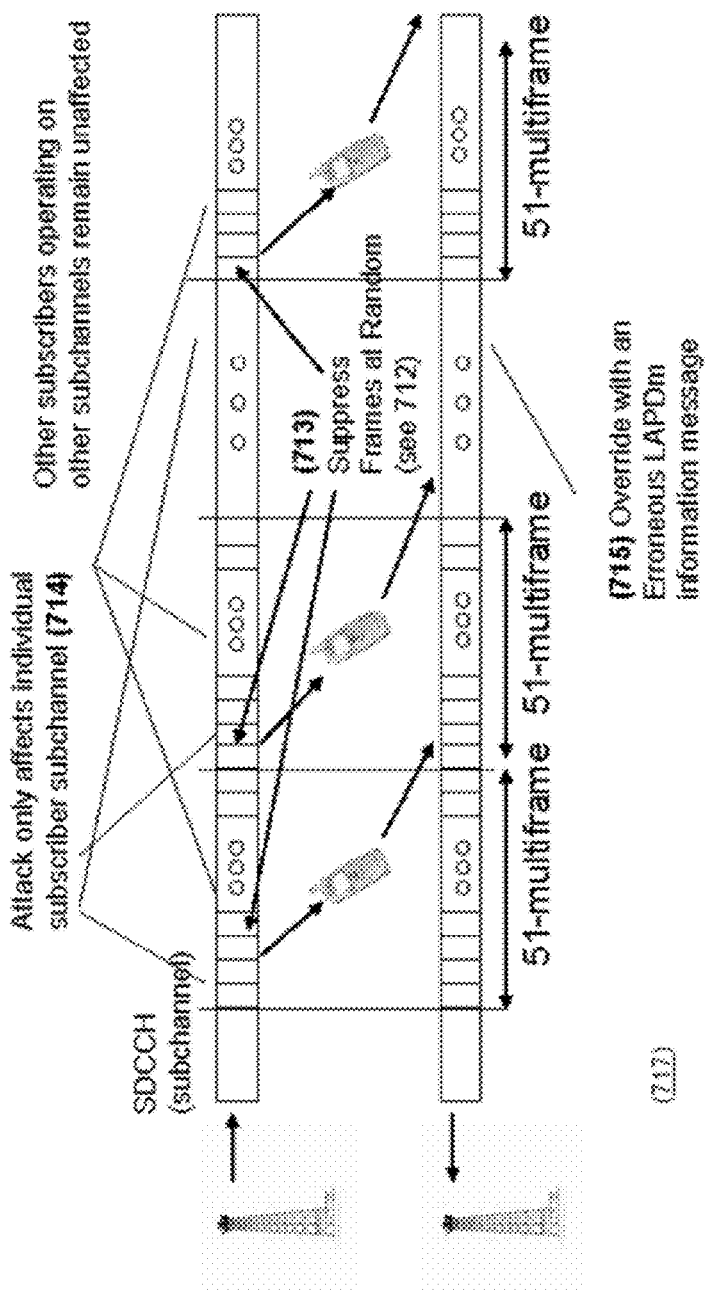
FIG. 7c shows how the frames of an SDCCH subchannel for a specific wireless device may be attacked.
Figure 8:
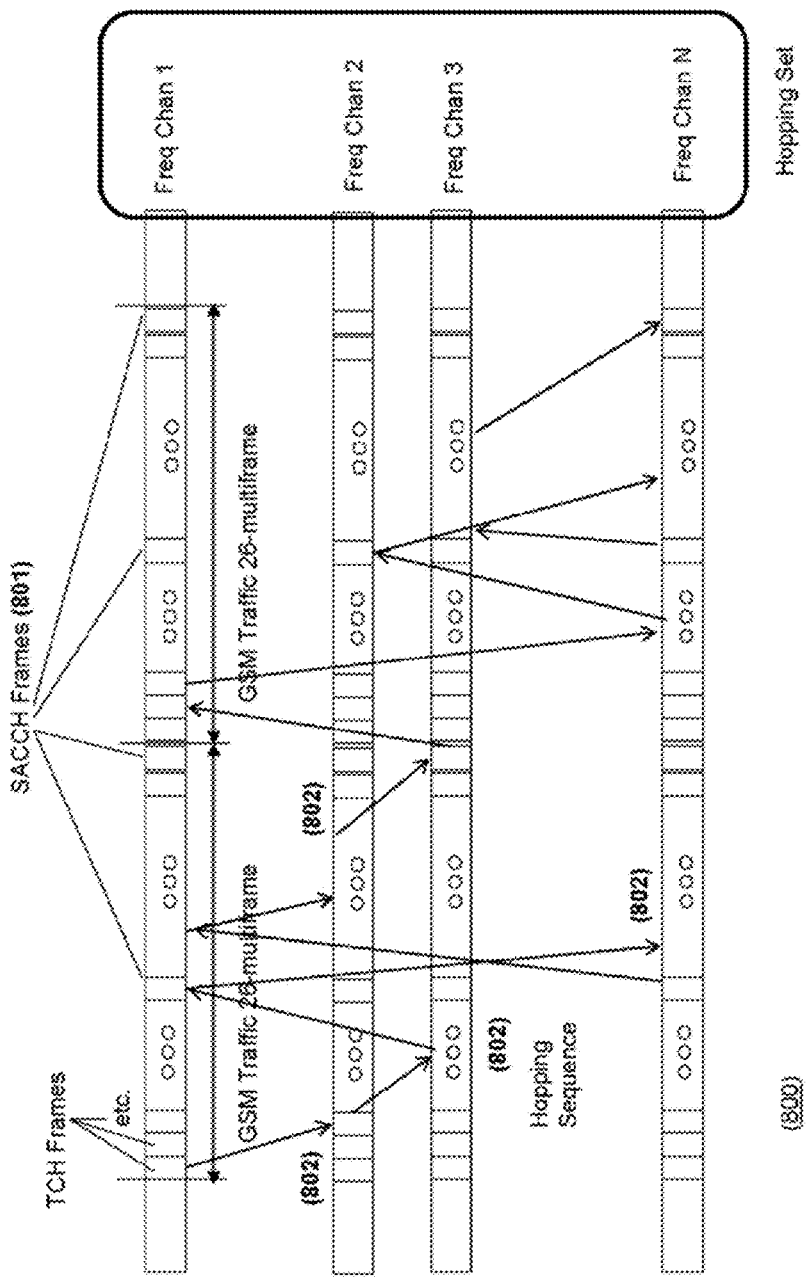
FIG. 8 shows a hopping set, a hopping sequence, and the SACCH frames in the hopping sequence.

FIG. 7*b* shows the signaling structure (710) employed by a GSM beacon and the paging channels contained in the signaling structure. The paging channels are surgically attacked using methods described under the heading of Specific Attack Techniques. One out of every 4 frames in a paging or access channel block in the 51 multi-frame is attacked at random) so as to provoke a CRC error and hence force the wireless device to ignore the message (711). The attack need only be only sustained in 9 frames of the 51 multi-frame and lasts only 50 uS per frame for a total of 9*50 uS=450 uS out of a total 51 multi-frame cycles of 235 mS which equates to a 0.2% duty cycle or a 500-fold reduction in average power consumption over a sustained non-surgical attack (712). Some beacon configurations might require a higher duty cycle (possibly by as much as a factor of 4), but even in this case, the power savings over a non-surgical attack are dramatic.

Another possibility is setting up one or more artificial beacons as baiting beacons. The baiting beacons can be set up so that all of the wireless devices in the operational area are forced to monitor the baiting beacons instead of the live beacons. To ensure that all wireless devices are baited, there must be a baiting beacon for each combination of location area and service provider that is detected in the operational area. The technique can be refined by having one baiting beacon reference another baiting beacon as a neighbor and enticing all wireless devices to a single baiting beacon. The other baiting beacons can then be shut down to conserve power.

The mode that should be used in a given situation is the one that requires the minimum amount of power and/or generation resources. This will in turn be governed by the number of active beacons and their relative power as seen in the operational area. For example, it may be the case that there is a single prominent beacon that all of the wireless devices are monitoring. In that case, the best strategy may be a direct attack on that beacon. Conversely if there are a number of beacons of more or less equal signal strength, setting up a single baiting beacon may prove to be more power efficient than attacking all of the live beacons. Further still, because it may take some time to set up baiting beacons and entice all the wireless devices (10*s* of seconds or more), the direct attack strategy is the preferred method when the convoy is on the move, while the baiting beacon technique is likely to be of more use when operating in a static mode.

Reactive Idle Mode Pros and Cons

The reactive idle mode promises significant power savings because it is surgical and only reacts when a wireless device is signaling on the SDCCH. Such signaling should be very infrequent given a relatively small operational area. It consequently requires far less generation hardware resources than an attack in active mode. This becomes an important consideration when active mode suppression (described under a subsequent heading) is addressed. The reactive idle mode also addresses the case where the surgical neutralizing system is not able to hear the tower on which the wireless device is listening but can see the reverse channel activity. Lastly, it minimizes the potential for scheduling conflicts because the forward channel attack is brief and hence the receiver is always able to do beacon detection.

The minuses include:
  The SDCCH channels are not predefined in the beacon, so they must be detected on the fly by detecting the immediate channel assignment messages on the paging channels.
  The techniques cannot address the theoretical page message detonation scenario.
  The techniques increases the receiver software complexity required for dynamic detection (although not greatly if dynamic detection is treated as an extension to the active mode detection problem).
  The technique requires that the surgical neutralization system be able to react rapidly to signaling on the SDCCH channels (typically within less than ½ second).

The reactive idle mode requires that the surgical neutralizing system have knowledge of the structure of the SDCCH channels. As mentioned previously this requires that the receiver camp on the paging channels of the beacon until at least one immediate channel assignment is detected. This does not present a problem because any high proximity wireless device must receive an immediate channel assignment before it can begin signaling on the SDCCH. This means that the surgical neutralizing system necessarily acquires information about the SDCCH before the tower and the wireless device can use the SDCCH to set up the call and the wireless device can receive the alert message.

Once the SDCCH information is extracted for a particular beacon, the channel(s) and time slots on which the SDCCH are operating are added to a reverse link monitoring list maintained by the surgical neutralizing system. The instant any signaling is detected on this channel and time slot, the receiver immediately alerts the generator, which goes to work by attacking one out of every 4 frames (as described for proactive idle mode) on the SDCCH subchannel specified by the receiver as shown at (717) in FIG. 7c (713). A particular subchannel of the SDDCH is only allocated a single block of 4 frames in the 51 multi-frame. This means for example that the surgical neutralizing system needs only to corrupt 50 uS (e.g., one TSC in one frame) out of the total of 235 mS in the 51 multi-frame. This translates into almost a 5000 fold reduction in power consumption over the equivalent wideband non-surgical sustained attack. The attack is also surgical from a collateral interference perspective because it is only the wireless device detected in high proximity that is attacked. This follows from the fact that all SDCCHs are reserved for specific wireless devices and therefore attacking on a specific SDCCH only affects the wireless device for which the SDCCH is reserved (714).

The SDCCH attack on the forward channel ends when the signaling is no longer detected in the paired reverse SDCCH. One difficulty is that this attack may require generation over a period of some number of seconds before the SDCCH link is dropped by either side or the convoy is out of range. Another approach is to use the waveform override technique described under the heading of Specific Attack Techniques to end the call immediately by generating a supervisory acknowledge message (that is part of the LAPDm protocol that is used on the SDCCH) with numbering that is out of phase from the current expected number (715). The wireless device presumes from the fact that the numbering is out of phase that the beacon and the wireless device are hopelessly out of phase and responds by immediately dropping the link. The surgical neutralizing system may further refine the attack by having the receiver perform spot processing to recover the training sequence of the wireless device under attack and supply this information to the generator so that it can employ several other attack methods such as TSC flipping, described under the heading of Specific Attack Techniques. The use of the TSC may also prove useful for tying together frequency hopping channels for a single subscriber when multiple attacks are under way. These and other methods are described under the heading of Detection Mode.

In the unusual case of the SDCCH employing a frequency hopping channel set, the signal is attacked as is described for active mode below.

Active Mode

Active mode describes the case where the wireless device is already actively signaling while a convoy is driving by or is being used for hostile communication while the convoy is stopped (static operational mode). In either case, it is already too late to attack the control channel signaling required to set up the call, so a direct attack on the forward hopping (traffic) channels is called for. Here the surgical neutralizing system must rely on detecting energy being emitted by the wireless device on the reverse link traffic channel and immediately follow the detection of that energy by an attack on the paired forward channel.

The difficulty with attacking the traffic channel is that the traffic channel hops across some fixed set of channels in a pseudo-random fashion. The hopping sequence for a traffic channel is established during call set up and the information that defines the hopping sequence is encrypted. Further, a wireless device that is intended to detonate an explosive device is most likely operating in the discontinuous transmission (DTX) mode and is therefore only transmitting on a relatively small number of frames per second. The process is shown at 800 in FIG. 8. In this case only the traffic channel's SACCH frames have guaranteed occurrence and timing (801). Also interspersed on the traffic channel (802) will be sporadic silence indicator frames (SID) on the traffic channels (TCH) (802). While the periodicity of these is well established, their occurrence (or equivalently phase in the 26 multiframe) is not. The problem here is determining the traffic channel's hopping sequence in time to surgically disrupt the traffic channel before a message on the traffic channel causes the explosive device to detonate.

In the general case where there is no a priori information regarding the hopping sets or sequences therein (other than the timing derived from the associated beacon), the receiver resorts to forming a histogram that notes on which channel the hopping has been detected. The receiver refines this histogram technique by noting specifically on which time slot the hopping is occurring as well as spot checking the TSC through simple correlative techniques. This allows the receiver to distinguish multiple wireless devices. The transmitter can then attack each device individually.

Upon the first detection, the receiver begins to periodically report the current histogram to the generator. Since the frequency hopping sequence is such that it visits a channel with a uniform probability distribution, the histogram will rapidly begin to develop a picture of which channels are being employed. An example of the specific methodology is presented under the heading of Example Implementation. The technique may be further refined by using the surgical neutralization system to place a call to the beacon and obtain information from the beacon about the beacon's hopping set and hopping sequences.

Figure 9:
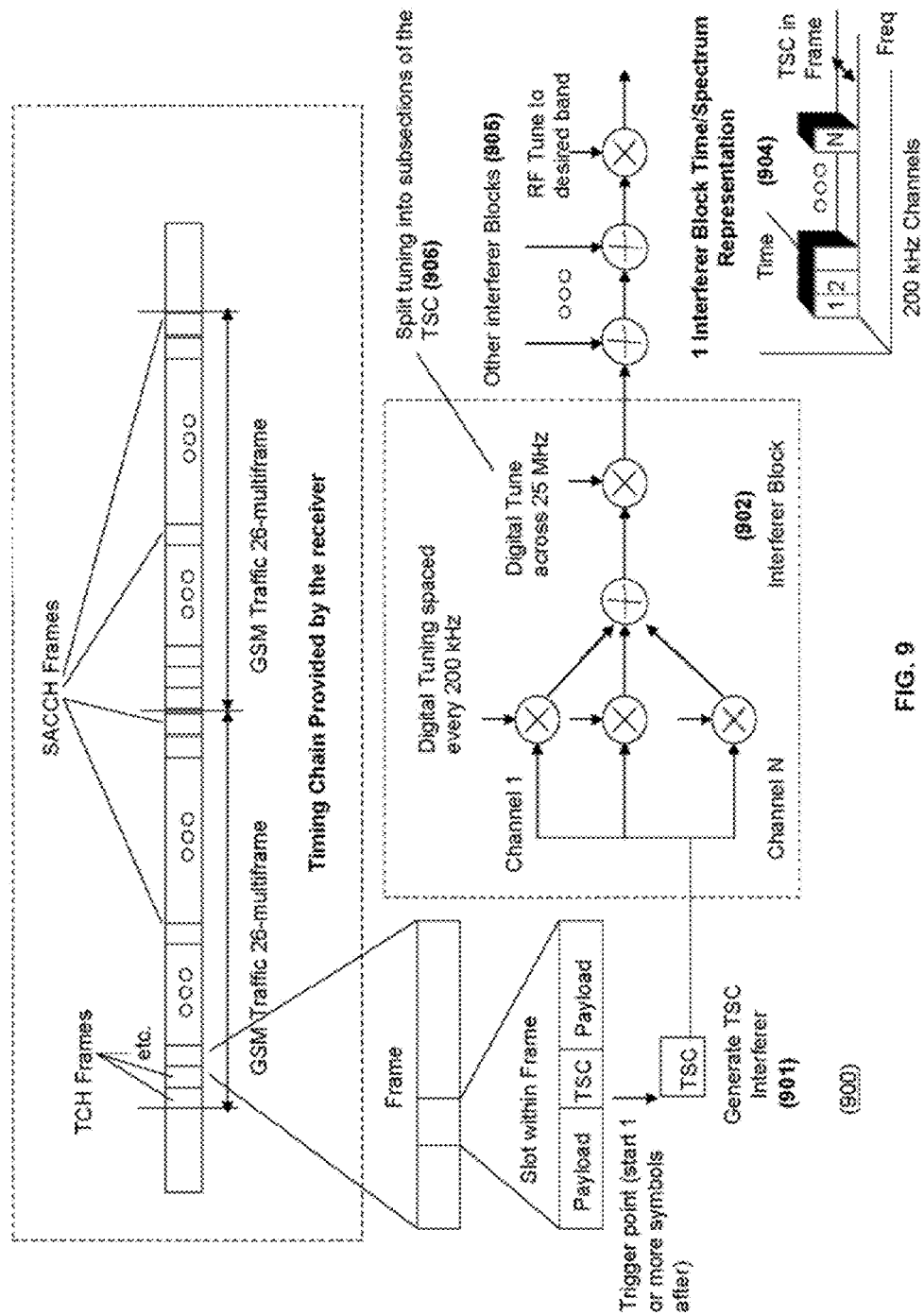
FIG. 9 shows a wideband TSC attack.

One method of attack, shown at (900) in FIG. 9 uses a wideband signal such as a multi-channel interfering waveform to hop at random across the channels identified in the histogram. The purpose is to take out as many channels as possible on any given hop and in the aggregate suppress enough frames to either defeat the vocoder such that the link is rendered unintelligible or force a CRC error in any fast associated control channel (FACCH) messages embedded in the traffic channel's signaling or both. In this example the generator creates a waveform snippet (of any type described under the heading of Specific Attack Techniques.) (901) having a maximum of a 200 kHz bandwidth that is synchronized to and interferes with the TSC in the slot of interest on a frame by frame basis. This waveform is then distributed to N tuners (902) where the tuners are spaced 200 kHz apart thus the waveform is spread across N channels simultaneously. The collection of N channels is termed an interferer block. The interferer block has the time-spectrum representation shown in (904).

This interferer block is either swept or hopped at random across parts of the spectrum where the histogram shows there to be hopping occurring. The attack is not limited to a single interferer block, as other blocks can also be added as shown in (905). The purpose of adding interferer blocks is to bring enough resources to bear that a sufficient percentage of frames are corrupted to render the link unintelligible. Possible refinements to this technique are t to attack only a fraction (e.g., ½) of the entire TSC and then time duplex the interferer block to cover additional spectrum (e.g., cover twice the spectrum simultaneously) or to use the convolutional coding attacks described below to attack different parts of the payload of the burst (apart from just the TSC) and thereby increase further still the amount of spectrum a single interferer can cover by hopping the interfering block more times in every frame (905).

For example a FACCH is at least 8 frames long and consequently makes at least 8 hops. If at least ⅓ of the channels in the wireless device's hopping sequence are being interfered with by the generator's interferers, then the interferers have an effective bandwidth that is ⅓ the effective bandwidth of the wireless device. There is thus a ⅓ probability on any given hop 1 in the hopping sequence that the hop will be interfered with by an interferer. In that case, the probability that none of the frames of the FACCH are interfered with is $$(1-\tfrac{1}{3})^8 = 0.039 \text{ or less than 4\%}$$

At ½ collision probability, the number drops to about 0.3%.

In the case of vocoded traffic, the primary threat is DTMF getting through to the phone. DTMF requires an "on" period of at least 40 mS for detection. This translates into two vocoder frames (each 20 mS). The vocoded frames themselves consist of 4 GSM frames and therefore a total of 8 GSM frames in a row need to be received unmolested for DTMF to get through to the phone—giving it the same attack statistics as those for FACCH suppression calculated above.

In general, the efficacy of this technique is directly related to the bandwidth of the attacking signal as a fraction of the effective bandwidth of the hopper—where the effective bandwidth is equal to the bandwidth of the channel multiplied by the number of hopping channels (as opposed to the total span between the lowest and highest frequency channels). The surgical neutralizing system can dynamically modify both the channels the interferers are applied to and the number of interferer blocks. For example, the surgical neutralizing system can use multiple interferer blocks to increase the effective bandwidth coverage until the hopping sequence for a given wireless device begins to emerge from the histogram. As the hopping sequence emerges, the number of interfering blocks and possibly their bandwidths (i.e., N) may be diminished until the wireless device's hopping sequence is completely determined. At that point, a single GSM (200 kHz) interferer that is hopping in rhythm with the signal under attack is all that is required to suppress the wireless device.

The advantages of reduced bandwidth hopping are threefold. First significant power savings are achieved by limiting the bandwidth to be a fraction of the effective bandwidth of the signal under attack. Citing the example above, the surgical neutralizing system achieves power savings as the inverse of the fraction of the effective bandwidth that is covered on any given hop. For instance a ⅓ mask affords 3 times the power savings. Second, while the surgical neutralizing system could achieve the same effect by parking the interfering signal on some subset of channels and let the hopping of the wireless device work on behalf of the surgical neutralizing system, introducing hopping combats fading as seen at the wireless device. This translates into additional significant power savings (perhaps a factor of 10 or more), because it eliminates the need to consider the additional power that would be required to overcome the fade and still cause interference. Third, the histogram and subsequent hopping sequence detection algorithms will eventually converge to a solution (typically within a few seconds) in which the energy can now be limited to that required for a single interferer. By limiting the attack to the TSC (as described under the heading of Specific Attack Techniques) the duty cycle is reduced to ⅛ (a single slot)*¹⁄₁₀ (only the TSC)=1.25% or another 80-fold reduction in power over a non-surgical attack.

The technique can be refined further still by attack only the stealing bits that surround the TSC. The purpose of stealing bits is to alert the devices that are receiving the traffic stream that a short message burst, as opposed to vocoder data, has been embedded in the traffic stream. These injected messages constitute what is known in the standard as the fast associated control channel (FACCH), and corrupting these bits will lead the receiver to believe that it has a message as opposed to voice or vice versa. The messages are staggered to occupy 8 frames and in each frame the stealing bit associated with the burst in the slot for that frame is set. In principle therefore only one bit in each of eight frames need be attacked and hence the amount of power reduces to be approximately 1 millionth of that required to achieve the same effect as the equivalent non-surgical broad band attack performed across the entire cellular spectrum.

Stealing bits are, however, unprotected and therefore properly designed receivers may be forgiving of errors in the stealing bits (e.g., by declaring that a portion of the signal that appears to be an FACCH channel is one even though the stealing bits indicate otherwise and subsequently attempting to process it as an FACCH message as long as N of the M stealing bits indicate an FACCH message). Furthermore, any attack only has on average a 50% chance of corrupting a stealing bit and hence it is likely to be necessary to attack virtually all stealing bits in order to achieve the desired effect. However, effective use of either of these techniques would still enjoy many orders of magnitude in average power savings over a blind wideband attack. The TSC attack can be extended to include the stealing bits (as they are contiguous within the burst) and thereby combine the effects of both attacks to further minimize the chances that coded frames get through to the receiver.

While there is no guarantee that the foregoing attacks will not affect an unintended subscriber, the surgical techniques used in the attacks greatly diminish the probability of collateral interference. Collateral interference only occurs if one or more unintended subscribers are signaling on the same set of hopping channels in the same time slot and are in close proximity while a wideband attack is underway. Moreover, once the hopping sequence of a threatening wireless device is discovered, any collateral interference ceases. As it will typically take only a few seconds to lock to the hopping sequence, the most the collateral subscriber will experience is an almost indiscernible gap in speech (not unlike typical dropouts experienced in everyday use). In all likelihood, the collateral interference will not force the call to be dropped, as the GSM signal is robust in the presence of signal drop outs and will typically hold the call for perhaps 10 to 15 seconds without intelligible communication before ending it.

Another refinement to this technique is to forego a TSC or stealing bit attacks in favor of the convolutional encoder attacks as described under the heading of Specific Attack Techniques. GSM employs convolutional encoding and attendant interleaving. If particular sets of bits are attacked that are contiguous after the de-interleaving process, the convolutional decoder can be forced to jump track, garble the frame, and cause the frame to fail the CRC or other error checking. This makes it possible to cover more spectra simultaneously by time multiplexing the attacks across the entire active span. It is not important which sets of bits are attacked in the GSM bursts as long as they meet the post de-interleave contiguity criteria. Therefore a particular set of bits can be attacked in one part of the slot within a frame and the generator can then jump to another portion of the spectrum and attack a different set of bits in the same slot. This technique therefore is not limited to attacking just a small portion of the burst (e.g., the TSC is $\frac{1}{10}^{th}$ of the entire burst), but instead lays the entire burst open to attack. In principal, this makes it possible to cover the entire spectrum of the hopping signal simultaneously while using only a modest wideband signal. The tradeoff is that the signal is likely to have a greater duty cycle than the strictly TSC attack and thereby have greater power consumption. On the other hand, the modest wideband signal lessens the probability of a signal making it through to the wireless device. This duty cycle disadvantage is also somewhat mitigated by the fact that the attack bandwidth (and thereby power consumption) can be lessened as time is essentially traded for bandwidth. Furthermore it allows more energy to be concentrated in a smaller band and hence improves the efficiency of the attack by reducing the required instantaneous power.

The preferred embodiment of the surgical neutralizing system employs both strategies in tandem. Initially, the convolutional encoding attack is employed to cover large swaths of spectrum. This gives the reverse channel receiver time to converge to the hopping sequence where, in addition to the convolutional coding attack, either the TSC or stealing bit attacks can now be employed with maximal effect, as the generator is hopping in rhythm with the signal under attack. This allows the peak power to drop by a factor of 10 to perhaps 100 (depending on several factors including the effective bandwidth of the hopping channel set) over period of a few seconds.

In all cases, the attack on a particular signal ends when the receiver can no longer hear the reverse channel signaling, either because the call was dropped or the convoy has moved out of range.

Specific Attack Techniques

Baiting and Disablement

Figure 10:
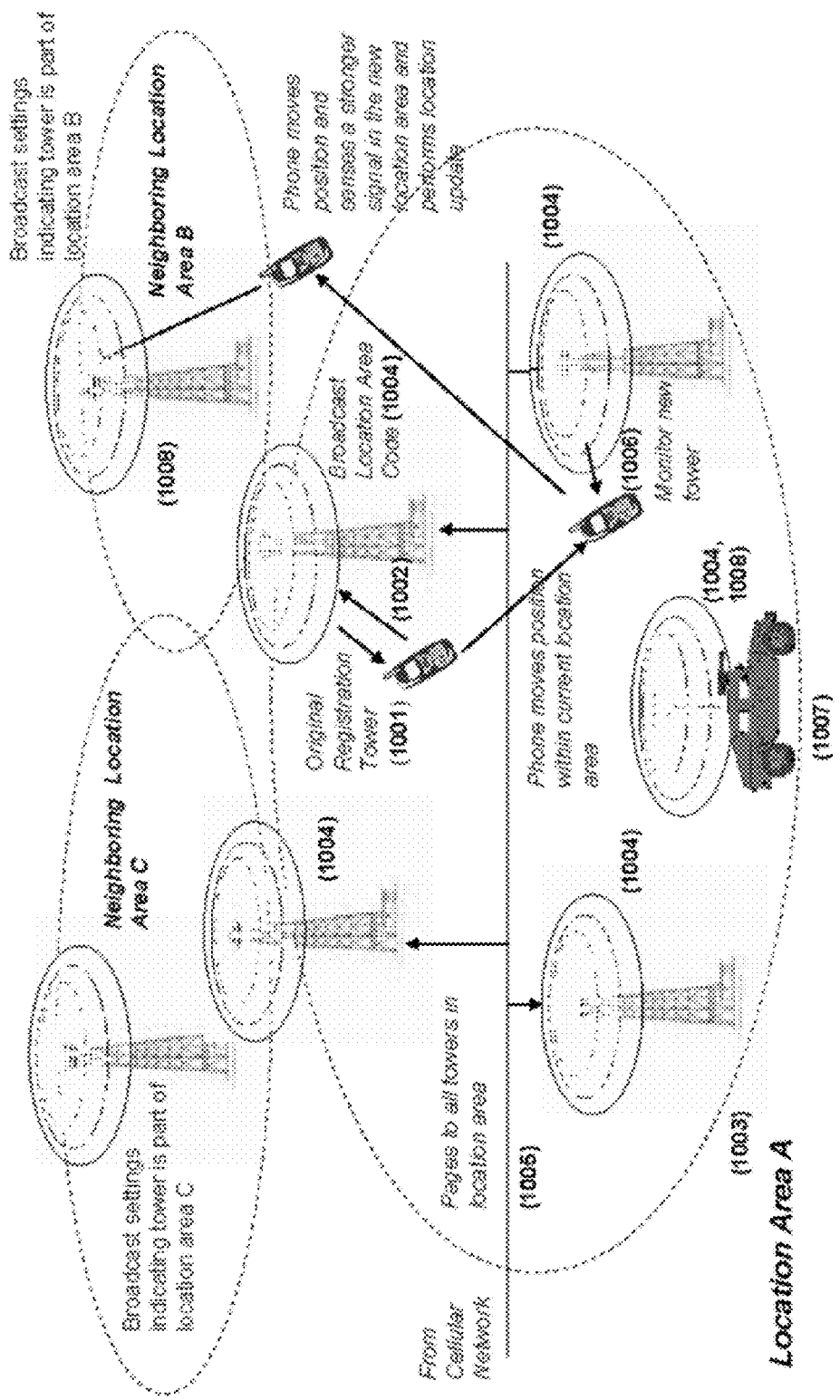
FIG. 10 shows a typical GSM system with beacons and location areas.

The approach to baiting used in the surgical neutralizing system can be best understood from a general description of the typical operation of most wireless devices, as illustrated in FIG. 10. Upon power up, the wireless device scans prescribed bands looking for beacons. If one or more beacons are identified, the wireless device will chose the best beacon (be it for quality, signal strength or compatibility) and attempt a registration or what is known in the standard as a location update (1001). The purpose of a location update is to inform the wireless network that the wireless device is on and therefore able to accept pages. As part of location update, the wireless device identifies a set of neighbor beacons, either by taking its own measurements of the beacons in its environment or from a list broadcast by the live beacons (1002). The wireless device then enters an idle state in which it continues to monitor the beacon on which it registered or one of its neighbors for pages.

FIG. 10 also illustrates the notion of a location area. The location area notion frees a wireless device from being tethered to the original registration (1003) beacon and thereby creates more fluidity for the wireless device to roam. Sets of beacons distributed over some presumably contiguous geographic area are grouped together as a location area collection on the basis of a common identifying code embedded in their signals (the location area code messages are in System Information 3 and 4 messages) (1004). All pages intended for a wireless device are then dispatched simultaneously to all beacons (towers) in the location area in which the wireless device is currently registered (1005). It is thus actually unimportant which beacon a wireless device actually monitors as long as it is one that belongs to the same location area in which the wireless device originally registered (1006). Moreover, it is left entirely up to the wireless device to determine which beacon to monitor within the location area.

When being used to establish a baiting beacon, the surgical neutralizing system scans the cellular environment and identifies all of the viable beacons in some defined operational environment. It then makes a clone of one of the beacons. The clone has a number of important differences from the beacon it was cloned from.

a) The clone uses a frequency channel assignment that is on the neighbor list (preferably all of lists) of all the live beacon(s) and is furthermore not detectable in the operational area; and b) The clone has the same location area code (system information 3 message) as those in the live environment—this is critical as it keeps the wireless device from attempting a location update and ignoring the baiting beacon if the location update fails; and c) The clone system information 4 fields, most notably the cell selection/reselection fields, are set to request minimum power from the wireless device (equivalent to boosting the priority of the beacon). This makes the clone as attractive as possible to the wireless device. This refinement makes it possible to reduce the power of the baiting beacons because the standard requires that a wireless device give more weight in the cell selection process to a beacon that requires less power from the wireless device). See ETSI 45.005 Section 4.1.1 and 45.008 Section 6.4

The effect of these differences is that the baiting beacon will entice all of the wireless devices to monitor it rather than the beacons of the live network (1007, 1004). The radius of the effect is controlled by adjusting a combination of the aforementioned minimum required wireless device power (i.e., its priority) and the actual baiting beacon power. Adjusting either upwards will increase the effective radius in which wireless devices will be baited. The mode of operation of the preferred embodiment is to maximize the baiting beacon priority and then adjust the baiting beacon strength to moderate the radius of influence. This ensures minimal power consumption.

Figure 11:
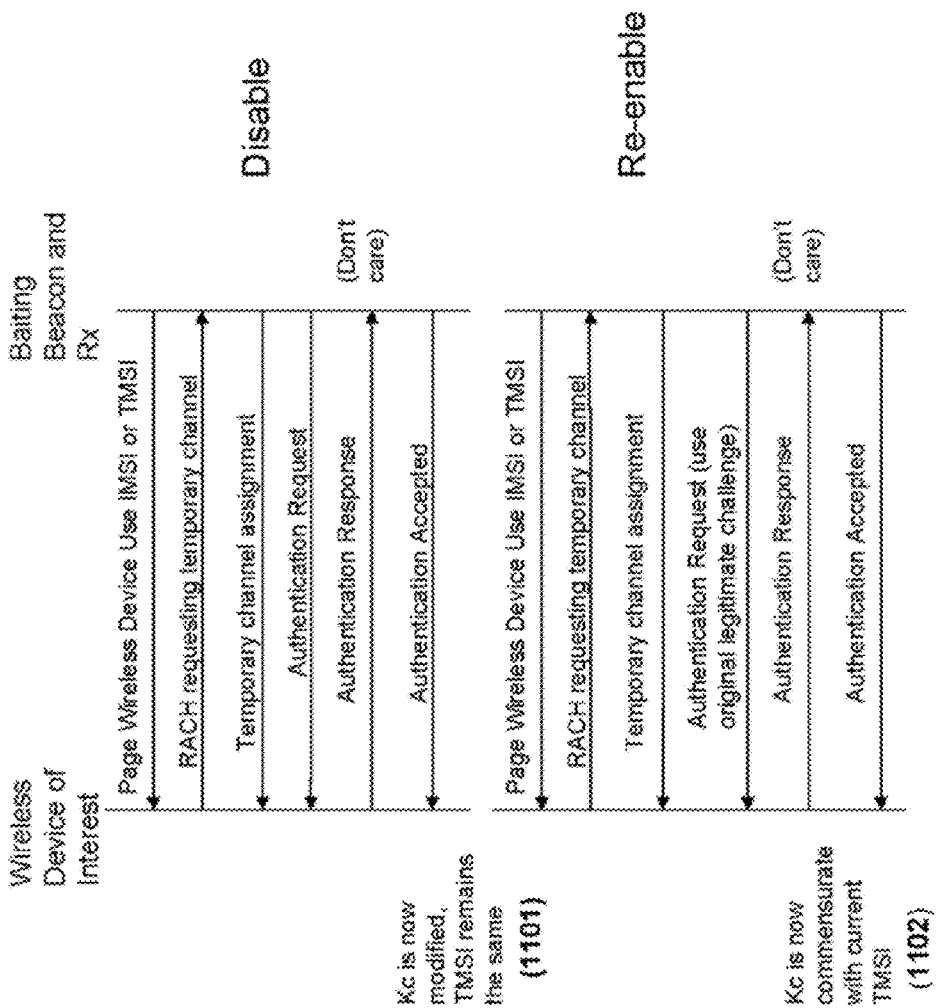
FIG. 11 shows an attack in which a wireless device is disabled by using a baiting beacon to change the wireless device's cipher key.
Figure 12:
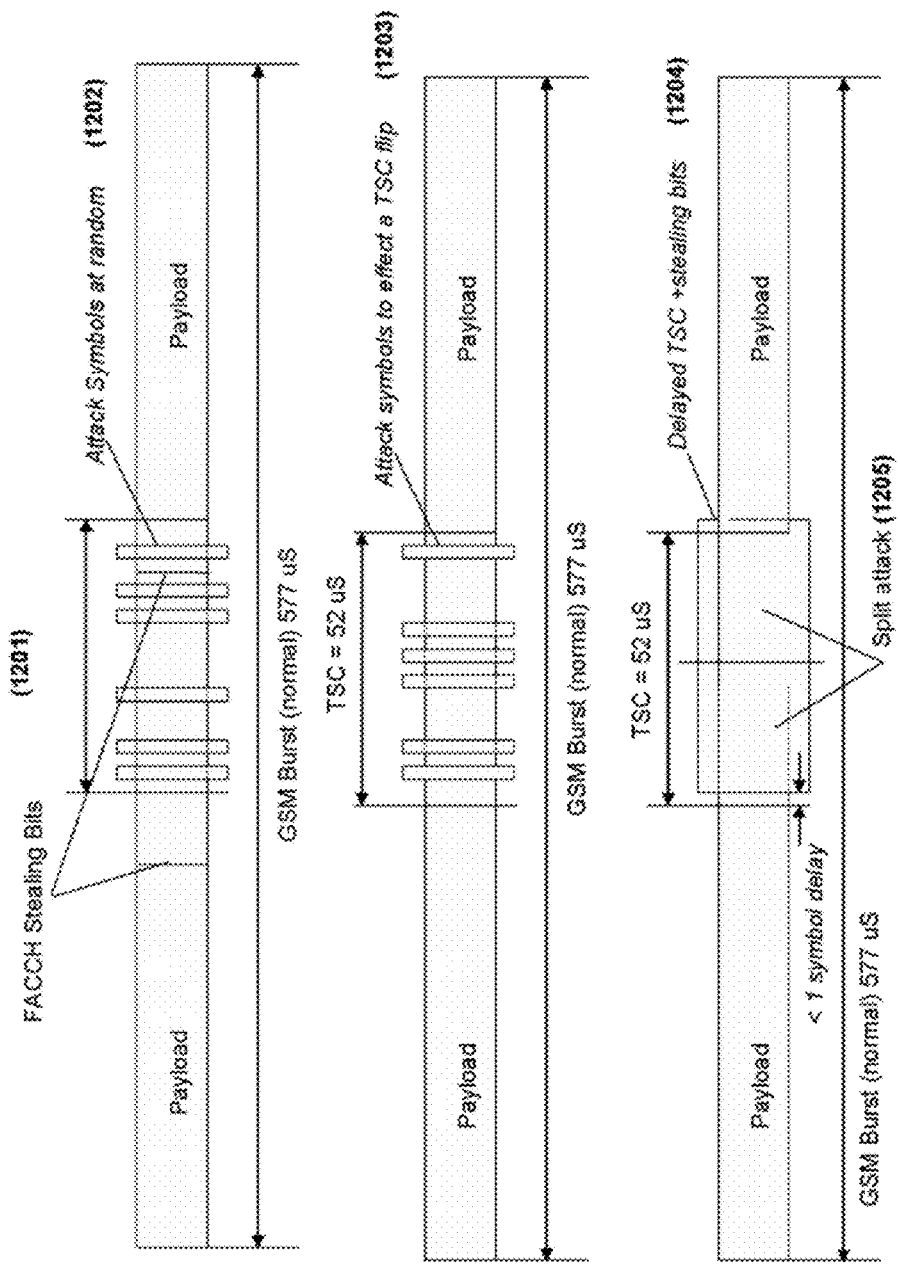
FIG. 12 shows several modes of attacking the TSC.

Given sufficient time, the baiting beacon can be used to perform the added step of disabling any or all phones in the operational area. In this case, the same baiting beacon is used but instead the location area is modified to be different than that of the existing location area (1008). In response to apparently being in a new location area, the wireless device updates its location instead of passively monitoring the beacon for pages. It is at this point that the surgical neutralizing system can gain control of the wireless device through the baiting beacon and apply any of the several techniques enumerated below:

a) issuing an authentication reject that disables the subscriber identity module (SIM) which prevents either incoming or outgoing calls until the wireless device is power cycled; or b) interrogating the phone to determine its IMSI or TMSI and using this information to impersonate the phone to the network and perform a detach procedure which will have the effect of fooling the network into believing the wireless device is no longer on or otherwise unable to accept calls and will therefore likely route the call to either voice mail or another automated message; or c) rekey the encryption key as shown in FIG. 11. Generally, when a GSM beacon responds to a location update from a wireless device, it provides the wireless device with a new TMSI and a new cipher key. The baiting beacon, however, foregoes the TMSI reallocation that is normally part of the location update process. As a result, the TMSI for the wireless device and the wireless device's cipher key are now effectively out of phase. When a wireless device's cipher key is out of phase with its TMSI and the wireless device attempts to initiate a call, the network will generally not re-authenticate the wireless device. Instead the network will presume that because the wireless device's TMSI has not changed, the wireless device is still using the cipher key that it is paired with the TMSI. Because the cipher key the wireless device is using does not match its TMSI, the wireless device will not be able to complete the cipher mode sequence in the call setup (1101). The network responds to the failure to get past the cipher mode sequence by dropping the call. The same sequence of events occurs when an attempt is made to call the wireless device. The wireless device is consequently effectively cut off from the network.

The wireless device will remain cut off from the network until such time as the network chooses to re-authenticate the wireless device. After re-authentication, the TMSI and the cipher key will again be in phase. The period of time during which the TMSI and the cipher key are out of phase depends on the interval between re-authentications which is specified in the network configuration. Typical intervals range from 10 minutes to an hour but in many cases, if the TMSI has not changed, the device will not be reauthenticated and in this case the wireless device can remain disabled indefinitely-perhaps even after it has been power cycled. That is the case because the wireless device retains its TMSI even after the wireless device has been power cycled and cannot be reauthenticated with the network until it has a new TMSI.

If sustained denial of service is desired, the surgical neutralization system can again put the TMSI and the cipher key out of phase each time the network re-authenticates.

Another aspect of this technique is that the wireless device can be restored to the network at any time by putting the TMSI and the cipher key back in phase. This can be done by re-interrogating the wireless device with the random challenge that was used for the legitimate authentication, as this will restore the original key state and therefore put the cipher key back in phase with the currently established TMSI (1102). Another important feature of this technique is that the only effect that the user of the wireless device sees is that he or she is unable to make an outgoing call.

Surgical Waveform Attacks

Wideband Extensions to the TSC and Stealing Flag Attacks

The GSM waveform is described in ETSI 45.002. It is structured as sequence of frames lasting 4.602 mS and is subdivided into 8 time slots as shown in FIG. 7b. Each slot contains a Gaussian Minimum Shift keyed (GMSK) modulated burst having the structure shown at (1201) in FIG. 12. The burst consists of a training sequence (referred to in the standard as the TSC) surrounded on either side by stealing bits and payload data. The standard provides for 8 distinct (orthogonal) TSCs and the TSC persists for approximately 50 uS out of the total 577 uS for the burst. The purpose of the training sequence is to enable the receiving device, be it the wireless device or the base station, to synchronize to and equalize each and every burst so as to demodulate the associated payload data. The TSC thus represents a fundamental weakness in the GSM signaling. If the TSC is sufficiently modified, the receiving device cannot recover the payload data. Ways of attacking the TSC include but are not limited to:

using white noise or a tone to interfere with the portion of the slot containing the TSC (1202);

offering a delayed version of the TSC to give the receiving device false timing, which in turn causes the receiving device to misinterpret the payload data in the slot (1203); or overriding a specific expected TSC pattern with another pattern so that the receiving device ignores the burst altogether (1204). As noted previously the technique also contemplates splitting the attack (1205) such that more than one TSC on a channel can be attacked at a time.

The white noise or tone attacks on the TSC are the most obvious choices. They can be further refined to only attack a smaller subset of the symbols at random in the TSC to further reduce the power consumption. However they are not necessarily robust against a sophisticated receiving device. The remaining two methods are improvements that allow the neutralizer to randomly attack a smaller subset of the TSCs while thwarting sophisticated receivers. Sophisticated receiving devices will attempt to flywheel through garbled TSCs using averaging techniques. Therefore a white noise or tone attack necessitates that a slot of interest in all frames be attacked to prevent such flywheeling (i.e., to prevent the receiving device from forming any averages). The other two methods expressly play to a sophisticated receiving device by proffering either a delayed copy or a different higher powered TSC that overrides the expected TSC. In the former case the receiving device will lock onto the delayed version of the TSC and use this to equalize the payload. The payload will not have this delayed characteristic and the mismatch will cause the receiving device to garble the payload. This technique furthermore requires significantly less power than the white noise or tone attack because the receiving device treats the delayed signal as a multipath component to be equalized and therefore the error adds coherently instead of incoherently as is the case for white noise or tone attacks. In the case of a white noise or tone attack, the receiving device will assume that it has locked on to another signal with a different TSC (perhaps due to pathological propagation) and presumably drop the burst. In either case the number of frames that need be attacked is reduced significantly.

The stealing bits implement the Fast Associated Control Channel (FACCH). When the wireless device enters traffic mode, it is no longer communicating with the beacon but is instead operating on a dedicated traffic channel (TCH). When a stealing bit is set to 1 it indicates that a FACCH message has been inserted (i.e., the TCH frame is being stolen thus interrupting the vocoded traffic with a very short message that is used to convey control information such as a call waiting alert. The duration is such that the pause in traffic is imperceptible to the user. When the bursts carry ordinary traffic, the stealing bits are set to 0. Corrupting the stealing bits will in principle cause the receiver to believe it has a FACCH message when it is in fact ordinary traffic and vice versa. However, either the vocoded traffic or a FACCH message can be used to arm or detonate an explosive device, and it is consequently necessary to prevent both kinds of traffic. Because this is so, corrupting the stealing bit may not be robust enough, particularly since any given stealing bit only has a 50% chance of being corrupted (due to the differential coding employed by GMSK, making it impossible to predict the instantaneous frequency of the carrier of the stealing bit) and consequently how the receiving device will react to the corrupted stealing bit. For example there is a chance that only 4 of perhaps 8 stealing bits are corrupted (or conversely received correctly) but the four correct stealing bits may be enough for the receiving device to attempt to frame the information as a FACCH message and thereby permit the message to get through to the wireless device. Instead, the stealing bit corruption is best used as an extension of the TSC attack: the stealing bits are included in the TSC attack and that adds another layer of protection against signaling of any kind reaching the wireless device.

In situations where the surgical neutralizing system is unable to provide any useful information about the hopping sequence, a wideband TSC attack is employed. In this attack, the TSC attack described above is carried out over multiple contiguous channels as shown at 902 in FIG. 9. It shows the same waveform being generated on multiple frequency contiguous GSM channels. This collective signal is then hopped at random across the hopping set to effect the attack described under Attack Strategies for cases where the hopping set is known but not the sequence. More than one such wideband signal may of course be used in the attack, with corresponding tradeoffs regarding power consumption and generator resources.

Methods for Discovering the Hopping Set

Given a sufficient number of frames, the surgical neutralizing system can definitively determine not just the hopping set but the hopping sequence itself. When the hopping sequence has been determined, the surgical neutralizing system may switch the attack from a probabilistic wideband attack to a deterministic narrow band attack that is in precise frequency hopping rhythm with the wireless device. In the narrow band attack, the surgical neutralizing system attacks a specific slot within each frame on a single channel (or more aptly the active slot therein) and thereby greatly reduces the probability of signaling getting through to the wireless device while dramatically reducing power consumption.

Since adjacent base stations may have overlapping hopping set allocations, different sequences of those frequencies are assigned to wireless devices in order to minimize the likelihood of collisions (i.e. two or more wireless devices transmitting on the same frequency at the same time). The mapping of frame number to frequency is a function of the current frame number, the hopping set, and the HSN and MAIO parameters supplied during the initiation of a call (see ETSI 45.002 6.2.3). Collisions are inevitable, for example, for a particular frequency and frame number, every HSN has exactly one MAIO that will result in the wireless device transmitting on that frame at that frequency. However, since the sequence-generation algorithm avoids long strings of such collisions, only a few observations of where the wireless device is currently transmitting are required to establish the specific sequence in use. Additionally, the knowledge that the wireless device is NOT transmitting at a particular frequency at a particular time further helps constrain the possible sequences. As the number of potential sequences decreases, the number of frequencies the transmitter must attack per frame similarly decreases, ultimately resulting in the transmitter attacking only the specific frequencies/frames on which the wireless device is listening. Furthermore, since a particular sector will typically use one HSN with several MAIOs, if the HSN the sector is using has already been discovered (i.e. by placing a phone call to the sector), only one observation is required to establish the MAIO (and hence the exact sequence) that the wireless device is using.

Figure 13A:
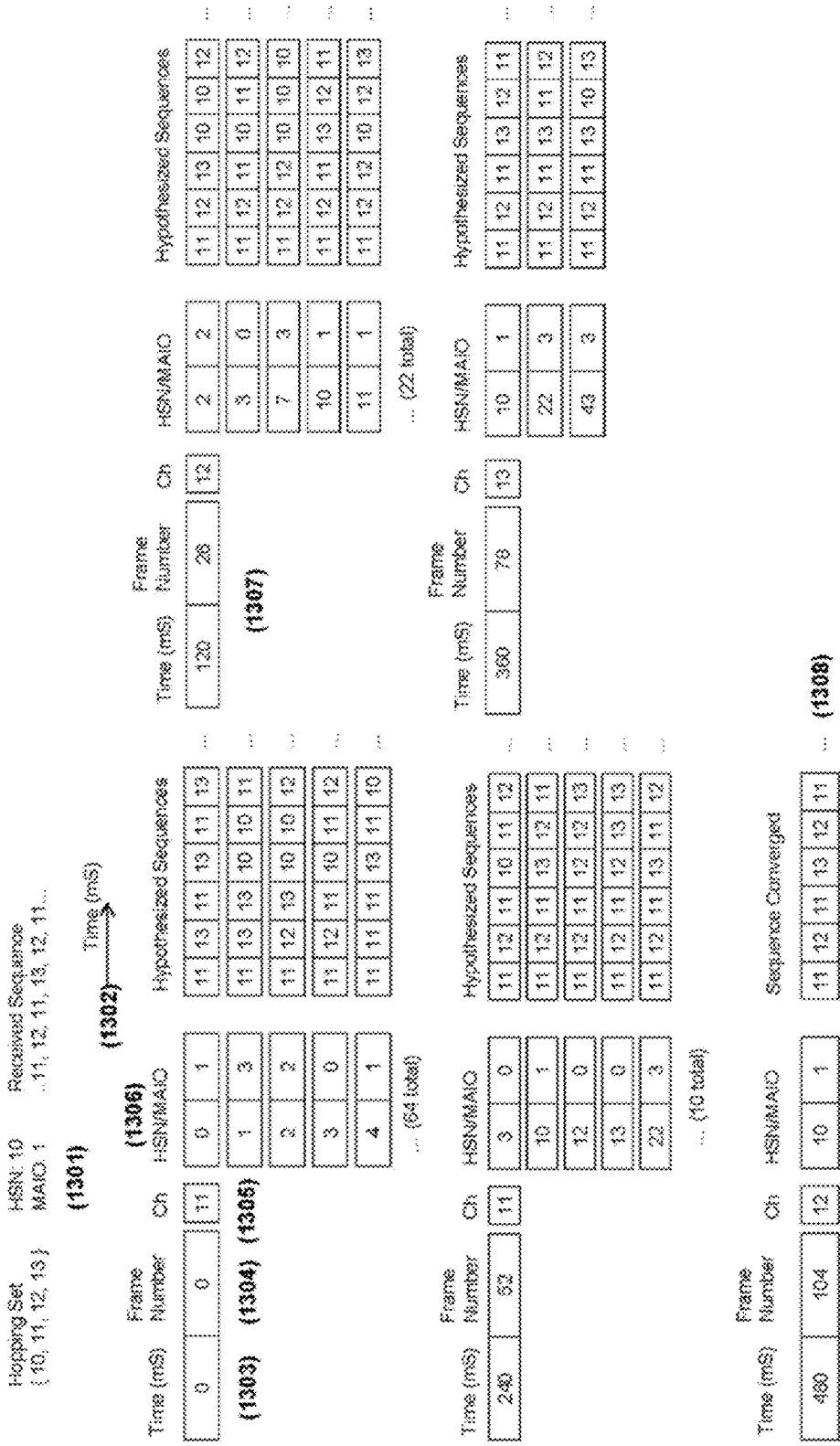
FIG. 13a shows how the hopping sequence for a GSM wireless device may be determined.

FIGS. 13*a* and *b* illustrate the process. FIG. 13*a* is a strictly instructive example showing a hopping set consisting of channels 10, 11, 12 and 13 (known to the receiver—for example as derived from the system information I message broadcast by the beacon) with HSN of 10 an MAIO of 1 (1301) (heretofore unknown to the receiver). The presumption in this diagram is that the receiver is very wideband and can detect all channels in the set simultaneously such that it never misses on which channel the wireless device has hopped. Reading from left to right it shows the receiver looking for SACCH detections approximately every 120 mS the timing of which is definitively established by the network and has therefore been previously derived by the surgical neutralizing system (1302). The first column is the time in mS (1303) and the associated frame number (1304) and the channel on which the wireless device was detected (1305). The next column pair (1306) lists the total possible set of HSNs (64) and which MAIO would be on channel 11 on that particular frame. In this example only there are only 22 possible combinations of HSN/MAIO pairs that meet this criterion. Progressing to the next occurrence of the SACCH burst 120 ms (1307) thereafter, the example shows the receiver detecting the burst on channel 12 and therefore whittles the HSN/MAIO candidates to 10 possible (i.e., only 10 pairs could have hopped on both channels 11 and then 12 on those particular frame numbers). Continuing further we see that in 5 iterations (within less than one second) there is only one solution for both the HSN and MAIO that will uniquely satisfy the received sequence (1308).

Figure 13B:
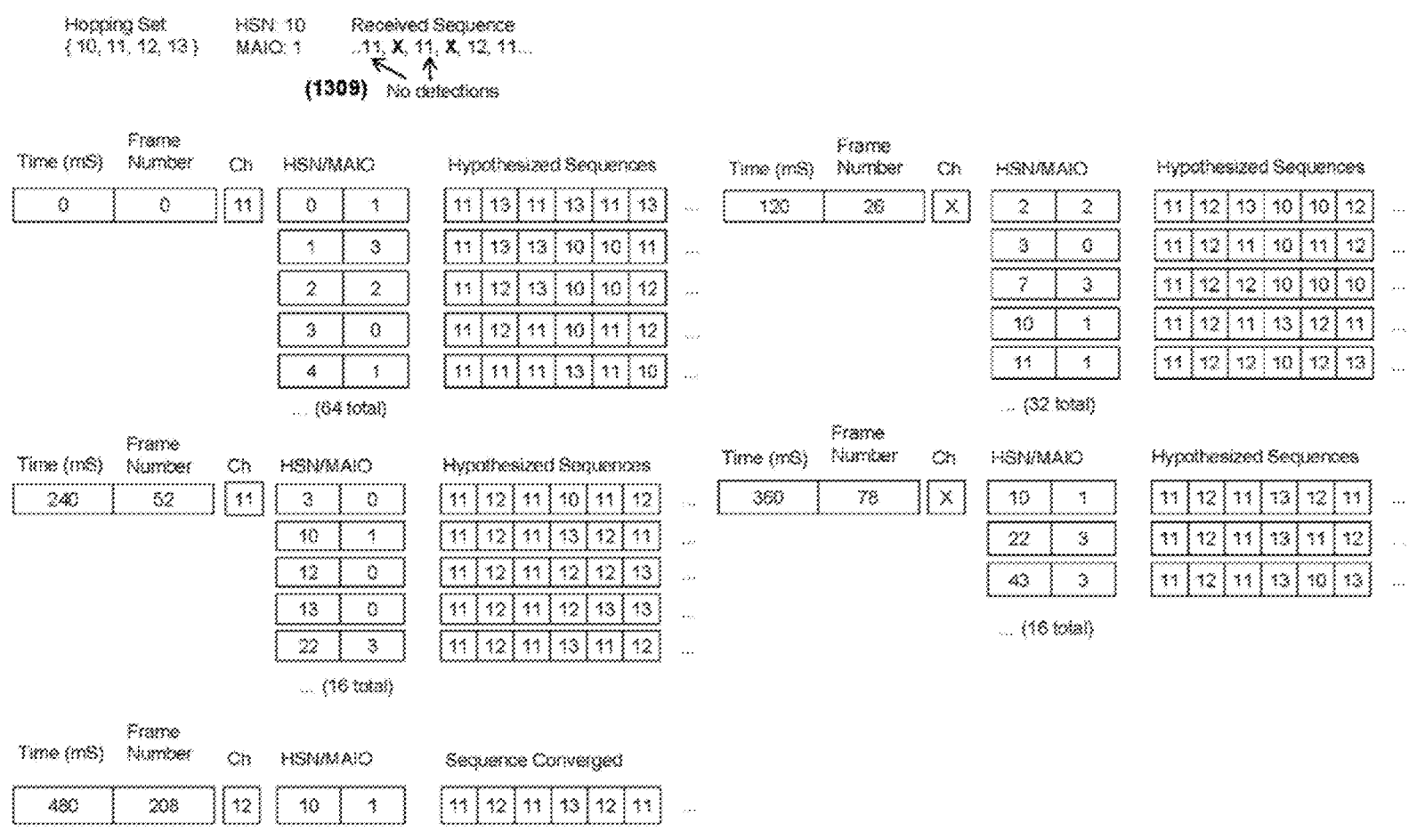

Since the receiver bandwidth of the preferred embodiment of the surgical neutralizing system may not be able to simultaneously cover the entire spectrum spanned by the hopping set, the receiver must rapidly tune around, detecting and/or predicting where the next hop will occur as it does so. The receiver mitigates this problem as illustrated in FIG. 13*b* by using "negative" detection. In negative detection, failure to detect energy in a band can be used to winnow the possible HSN/MAIO combinations (1309). The failure to detect energy is more ambiguous than a positive detection and therefore fewer HSN/MAIO combinations can be discounted on each pass (e.g., every 120 mS). Therefore while the same principles of converging to the hopping sequence apply, it will necessarily take longer with a more modest receiver bandwidth. However, this method of search will in general converge geometrically, particularly after the first definitive detection, as the receiver can now better predict where to look for subsequent energy, which in turn suggests that even with a modest bandwidth receiver, the time to detect is not significantly longer.

The foregoing presumes knowledge of the hopping set but presumes no knowledge of the HSN or MAIO. The problem is greatly simplified if a single phone call is placed to the tower (either previously or perhaps on the fly) allowing the surgical neutralizing system to discover the HSN. As described previously a beacon in a sector will use a single HSN and then dole out different MAIOs and time slots (within a frame) to keep multiple wireless devices from interfering with one another. Any beacons in adjacent sectors are likely to use different HSNs or possibly different sets of MAIOs while reusing the same HSN so as to preclude collisions. When the call is placed, the surgical neutralizing system can immediately determine both the HSN and the hopping set (if it has not already been gleaned from system information 1) being employed by that sector. In this case it only requires a single detection to uniquely identify the MAIO and hence the complete sequence. This is possible due to the uniqueness criteria established above which dictates that different MAIOs of the same hopping sequence do not collide and hence there is only one possible solution for the MAIO given the HSN, hopping set and the frame number.

Convolutional Encoding Attack

Figure 14:
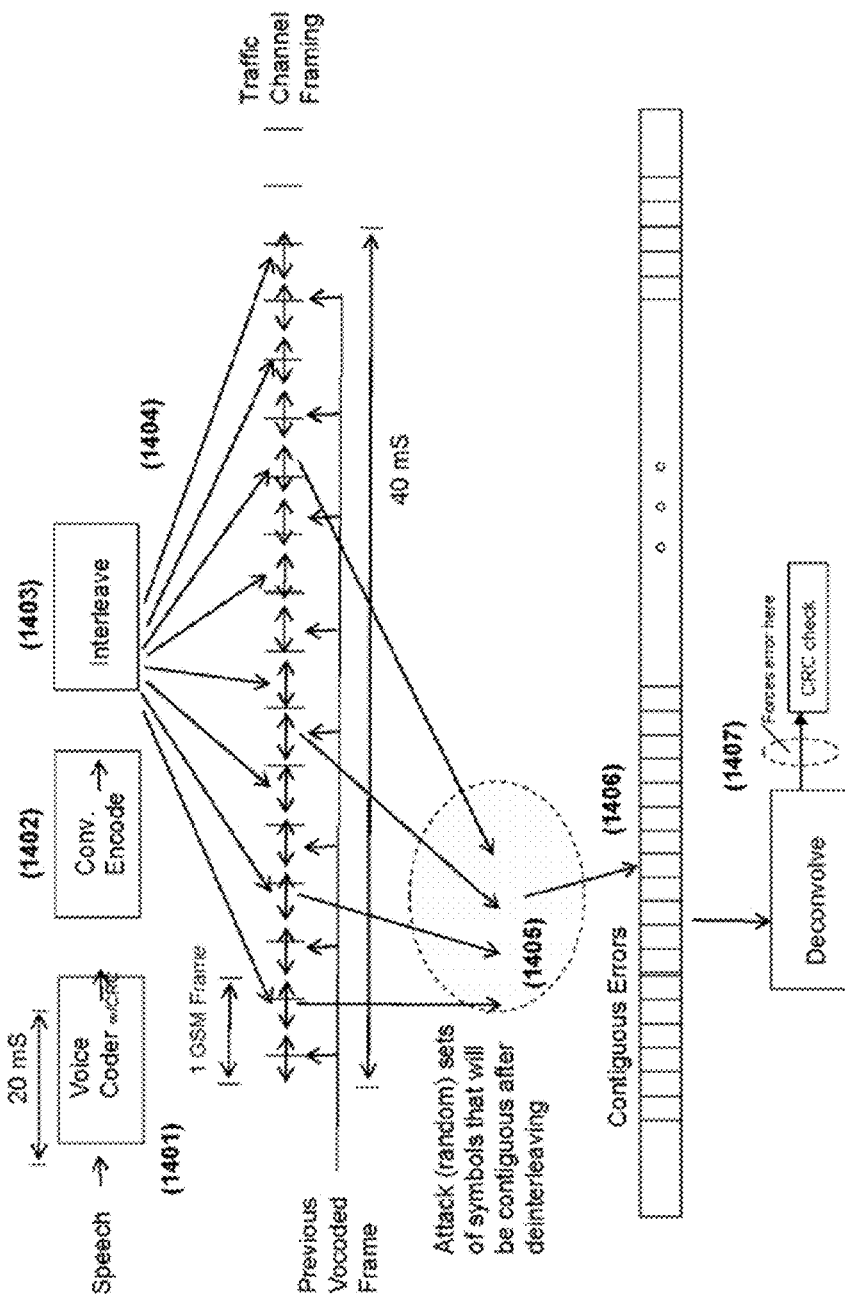
FIG. 14 shows a method of corrupting convoluted and interleaved payload.

Another possible attack, shown in FIG. 14, is to recognize that all framed messages or vocoded frames use cyclic redundancy checks (CRCs) and convolutional encoding (1401) to deal with errors in the data represented by the signal. A CRC indicates whether data in a portion of the signal termed a CRC checking span is valid. Associated with the convolution encoding process is data interleaving. Cellular interference tends to occur in bursts instead of being uniformly spread over time. The purpose of data interleaving is to shuffle the data symbols prior to transmission so that when they are subsequently deinterleaved at the receiver, any bursts of errors introduced in the transmission channel will tend to be distributed over time instead of occurring in contiguous bursts. The intent is to improve the performance of the deconvolution process (an example of which is the Viterbi algorithm) that is well understood in the art to perform best when errors are more or less uniformly distributed over time instead of occurring in sets of contiguous symbols. However, the deconvolution process diminishes rather than improves the demodulation performance when errors occur in contiguous bursts in the pre-deconvolved data, as it makes it more likely that the trellis path decoding will forsake the expected traceback path in favor of a competing traceback path and thus cause the receiver to completely corrupt the decoded signal.

Each vocoded frame carries 20 mS of speech. The speech data is convolutionally encoded (1402), interleaved (1403) and interspersed across 40 mS (i.e. 8 GSM frames) (1404). The GSM standard is specific as to which GSM frames a vocoded frame begins and ends at and therefore the receiver can predict the interleaving pattern with certainty.

Contiguous bursts of errors in the deconvolved data can be produced by attacking the pre-deinterleaved symbol sequence at seemingly disparate but in fact deliberate places that are matched to the interleaving process (1405). The attack introduces errors into the post-interleaved symbol sequence at the locations that are related by the interleaving process such that when they are subsequently deinterleaved by the receiver, the errors occur in contiguous bursts (1406). Selection of particular interleaved candidate symbol sets is not generally important and therefore this technique lends itself to randomization of the attack within any given frame, which further disguises the attacking signal. Moreover, not every frame of the beacon's signal need be attacked. Instead merely successfully attacking a single frame within the total CRC checking span (1407) is generally sufficient to force the intended CRC error. Because this is the case, frames can be randomly selected for attack. In the former instance, this leads to a further reduction of on-time and therefore required power and in the latter instance, further reduces the conspicuousness of the attack. The choice of specific attack waveform can be as simple as a tone snippet applied on a per symbol basis, since the GMSK waveform is sensitive to frequency shifts.

Beacon Framing and Protocol Attacks

In GSM, the signals transmitted by beacons and wireless devices are divided into frames and the information contained in the signals is contained in sets of the frames. For example messages are typically collectively coded and CRC'd across 4 frames. Therefore it is only necessary to attack one of the frames of a message at random using the surgical attack techniques described previously to cause the entire message to be dropped due to a CRC failure. Certain messages are necessary for the wireless device to gain access to or otherwise subsequently interact with the wireless telephony system, and a wireless device can consequently be suppressed by attacking frames belonging to these messages.

The GSM beacon waveform operates on a single 200 kHz channel that does not frequency hop. As described previously, the beacon's signal is divided into frames that are in turn divided into 8 slots. A slot is approximately 577 uS (713) and a frame in turn is approximately 4.6 mS (714). 51 frames are grouped together to form what is known in the standard as the 51-multiframe that has the specific structure shown in (715). The beacon operates on slot 0 of each frame, with any other types of channels that are in use operating on the remaining slots. The standard dictates that unused slots within all frames will carry dummy bursts so that the beacon is guaranteed to be transmitting in every slot of every frame. This makes it easier for the wireless device to monitor the beacon.

The remaining description is concerned with slot 0. The first two frames of the slot carry the frequency correction channel (FCCH) and the synchronization channel (SCH) (716). The information carried in the FCCH channel permits the wireless device to correct any frequency error it may have relative to the base station. The information carried in the SCH channel permits the wireless device to determine the precise timing of the frame and its slots. The beacon repeats the FCCH and SCH frames every 10 frames within the 51-multiframe. The next 4 frames in the 51-multiframe carry the Broadcast Control Channel (BCCH) (717) which carries the system information for the beacon as well as the parameters which the wireless device must use to access the beacon. The remaining channels are grouped into blocks of 4 frames each and constitute collectively what is known as the common control channels (CCCH). Depending on how the beacon is configured, these channels are subdivided into sets of paging and/or access grant channels (718).

Because the beacon's signal is highly structured, once the timing is known, only a small part of the beacon need be attacked in order to effectively neutralize it as an access point. For example the BCCH (which carries the compulsory system information messages 2, 3 and 4) only occurs for 4 frames (on slot 0) out of each 51 multiframe and only one of those four frames need be attacked as described previously. Because the 51 multiframe repeats 4 times per second, this suggests that only four frames (more aptly 4 TSCs each lasting 50 uS) need be attacked for a total of 200 uS out of every second translating to a duty cycle of $1/5000^{th}$. Similar arguments apply to attacking other channels such as the paging channels (proactive idle mode) or the SDCCH channels (reactive idle mode). The surgical neutralizing system may even elect to generate a tone that interferes with the FCCH such that the wireless device becomes mistuned and thereby unable to demodulate any messages received from the beacon.

Figure 15:
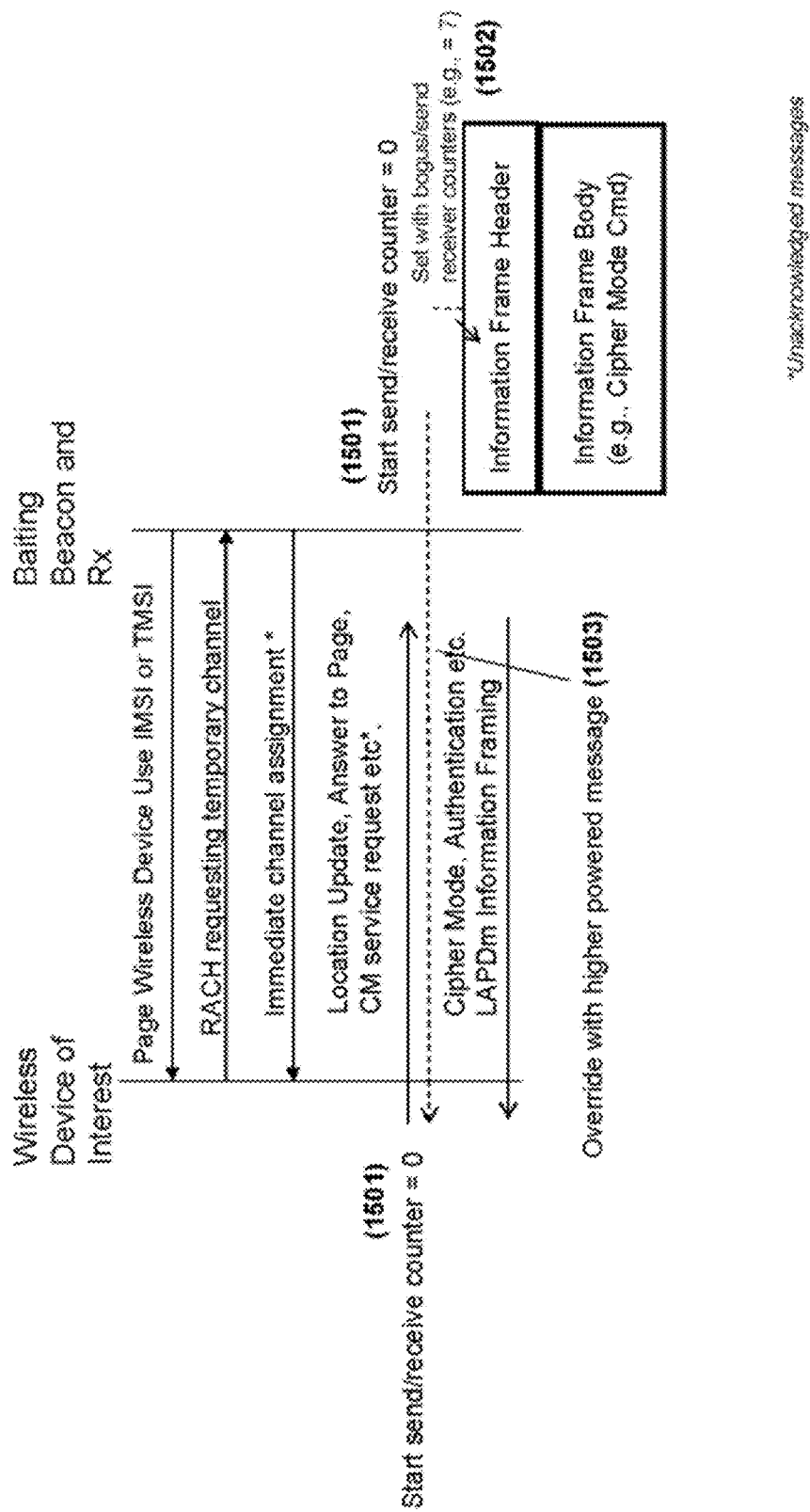
FIG. 15 shows a method of corrupting a message that is part of the GSM call set up protocol.

Another avenue of attack, given that the timing and structure of the beacon is definitively known, is to override one (or more) of the messages that are traded between the network and the wireless device as part of the call setup procedure. The principle is illustrated in FIG. 15. The SDCCH signaling is encapsulated in the Link Access Protocol (modified) protocol as specified in ETSI 44.006. In the header of information messages there are two counts designated as the send and receive count. When the SDCCH is established, the send and receive counters are zeroed in the information message frames (1501). By formulating an information message (such as a Channel Release message) and modifying the counts such that they are out of step (1502) with what is expected by the wireless device, and generating the message at a higher power (1503)), the wireless device will drop the call as cited in ETSI 44.006 Section 8.7.4. An important subtlety is that the surgical neutralizing system be able to modify the counts before the true cipher mode command is issued so that wireless device is able to recognize the message. The attack forces the wireless device to drop the call immediately because the values of the send/receive counters indicate that the wireless device is now hopelessly out of phase with the tower.

Operational Modes

Figure 16:
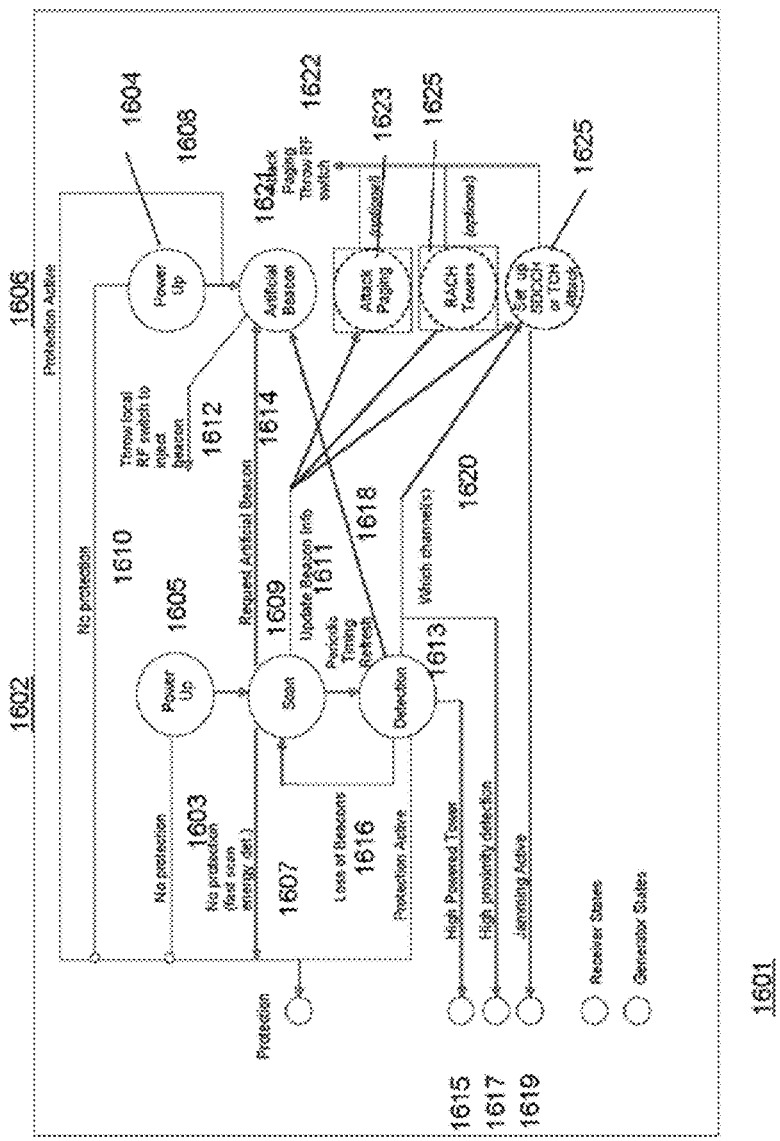
FIG. 16 presents an overview of the relationships between the states of the receiver and generator.

The operational modes and the relationships between the receiver and generator are shown at (1601) in FIG. 16. Receiver states are shown at (1602) and generator states at (1606).

Overview— upon powering up (1604, 1605), the surgical neutralizing system alerts the operator with a no protection alarm and enters into an initial scan mode (1609) that searches RF environment looking for beacons. Initially, the scan is a fast scan (1607), which merely looks for signaling metrics (such as energy or GMSK modulation characteristics) that may indicate the presence of a beacon. For example the GMSK waveform has several characteristics that can be exploited to rapidly identify a beacon and therefore discount false alarms, without the need to dwell on it and perform a conventional demodulation, and thus rapidly decreasing the beacon scan time. One such technique is to exploit the Gaussian trajectory of the keying in the phase between symbol transitions. By phase discriminating a GMSK waveform it will demonstrate a strong baud rate characteristic indicating the presence of GMSK.

Once an environment of beacons has been established, the receiver reports the beacon list including the power level and differential timing of the beacon to the generator (1611). The information contained in any particular entry of the beacon list is a complete clone of all of the system information messages including but not limited to messages 1, 2, 2bis, 2ter, 2quater, 3, 4 and 13. (reference ETSI 44.018).

The scan process also saves the neighbor lists present in all beacons reported above so that it now has a fast refresh list that it can use when it periodically updates the beacon list. Having completed the initial scan, the protection alarm ends and the receiver enters detection mode (1613). In this mode, the receiver continues to scan the neighbor beacons in the background (1615) while searching in the foreground for signals that indicate wireless devices that are in close proximity to the convoy (1617). When such signals are found, the receiver determines the hopping sequence for the traffic between the beacon and the close wireless devices.

The states entered by the generator depend on the activity of the receiver. If the receiver detects one or more beacons, it requests an artificial beacon (1614) from the generator. The receiver then provides timing information (1618) to the generator which relates the timings of the beacons in the environment to the timing of the artificial beacon. The generator then uses timing information (1618) in generating attack signals. As shown at (1622), in generating the attack signals, the generator leaves a window which permits the receiver to continue to listen to the environment.

The attack signals depend of course on the kind of attack; attack signals which attack the beacon's paging signals are generated at (1623); attack signals which attack the random access channel used for call set up are generated at (1625); signals for surgical attacks on the SDCCH or TCH are shown at (1625); in this state, the surgical neutralizing system is surgically jamming a specific wireless device.

Details of the Initial Scan Mode

When no beacons are detectable, the surgical neutralizing system ends the protection alarm. However a difficulty arises when in convoy mode because of the difficulty in predicting when a beacon is likely to pop up while driving down the road. It may take a second or two for a preferred embodiment of the surgical neutralizing system to analyze a beacon once the beacon has been detected. The surgical neutralizing system addresses this problem by breaking the detection process into two parts: a fast scan mode that looks for energy and acquires only the synchronization channel (SCH—which is broadcast every 50 mS) and another that presumes that the detected energy is a beacon and camps on the detected energy while performing analysis in the background to extract beacon information. The surgical neutralizing system also deals with the problem by signaling an alarm any time it detects uncharacterized energy over some threshold in the scanned bands and only ends the alarm when all such signals have been either characterized or discounted as threats.

Details of Detection Mode

Once a stable set of scanning channels has been identified, the surgical neutralizing system enters the detection mode. The surgical neutralizing system remains in this mode until it can no longer detect any beacons and reverts to the initial scan mode.

If the surgical neutralizing system detects that the convoy has stopped moving for an appreciable period of time (e.g., 10 seconds) as indicated by either the GPS receiver or an accelerometer and no reverse channel signaling is detected in this time period, the surgical neutralizing system enters static mode (301). Here either of two strategies can be employed. The first is set up artificial beacons to bait wireless devices that are in the operational area into monitoring the artificial beacons. This prevents all incoming calls, as the wireless devices are enticed away from listening to the live beacons and therefore cannot detect incoming pages.

The other technique simply camps on the reverse SDCCHs of all of the towers (eliminating the need to keep scanning forward channels) looking for any activity. The surgical neutralizing system then surgically picks off the reverse SDCCH channels described above as they are detected (worst case a few per second with typical being maybe every few minutes or more derived from the fact that the surgical neutralizing system is only concerned about high proximity wireless devices). This translates into enormous power savings. This also gives the surgical neutralizing system subtle but important advantages as it relates to collateral interference and required interference power. Specifically it addresses the problem of wireless devices driving past the now stalled convoy where the subscriber is connected and actively talking. In this case the wireless devices are not affected because they are not in the act of either placing or receiving a call. It also allows the transmitter power to be adjusted. For example, when the convoy is moving it will increase the transmitted power to project the signal ahead of the convoy. When static, the power can be reduced for the same reason.

In the case of wide area static operations, it is not enough to suppress just wireless devices in close proximity but also necessary to suppress communications in a wider area. This is achieved by decreasing the reverse channel energy sensitivity thresholds so that the surgical neutralizing system is now sensitive to wireless devices that are active in that wider area. The surgical neutralizing system then attacks all of the forward channels associated with reverse channel energy where it is found using the techniques described for active mode until it is satisfied that the active wireless devices are now off the air. For purposes of power savings, the surgical neutralizing system then enters into the proactive idle mode so as to prevent any subsequent access to the network by attacking the paging/access grant channels on all of the beacons detected in the operational area. If the number of beacons in an operational area is low, then a baiting approach in which an artificial beacon is generated to prevent the wireless devices from monitoring the live network will also work.

When the convoy is moving again, the challenge becomes timely detection of new beacons and new energy in the reverse link. The surgical neutralizing system uses the neighbor list broadcast in each beacon to rapidly determine where to search for new beacon activity. However the surgical neutralizing system recognizes that a neighbor list only enumerates the beacons that are being used by the same service provider. It does not adequately address the case of entering an area where there is a new or additional service provider whose beacons are presumably not on the neighbor list of the other previously established service provider(s). The surgical neutralizing system addresses this by employing the fast scan methodology to identify beacons that are not on the existing neighbor list and raising a protection alert until the beacon can be scrutinized (e.g., on the order of a second). In the meantime there is enough information from the fast scan to, as a minimum, perform reverse channel scanning for active mode wireless devices, thus mitigating the exposure risk.

The surgical neutralizing system addresses active mode detection by scanning the reverse link looking for new energy that is not associated with a known SDCCH. It detects the high proximity signals by searching for SACCH signaling that occurs every 26 frames and then camps on the forward channel to discern the hopping channel sequence. The receiver then passes the hopping channel sequence to the generator, which subsequently attacks the forward hopping channels. A specific description is provided under the heading of Example Implementation.

Co-Spectral Signals

The spectral allocation used by GSM is not unique to this standard and can just as easily shared by multiple service providers using other standards such as CDMA, CDMA-2000 or UMTS (W-CDMA). Therefore the surgical neutralizing system must also be capable of expressly separating GSM signaling from other signals that can potentially be found in the same spectral bands.

GSM signals have very specific signatures that can be uniquely identified using fairly standard techniques such as demodulation or correlation. The greater difficulty is preventing signals belonging to other standards from producing onerous false alarms when scanning for energy. The surgical neutralizing system raises an alarm when these classes of signals are detected and then removes the sections of spectrum that they occupy from foreground GSM processing.

Signals belonging to the various standards are easily identified using simple autocorrelation techniques. Furthermore they operate in fixed spectral sub-bands so once identified they can easily be discounted on both the forward and reverse links. Any persistent signals detected on the forward link that are not characterized as GSM can be treated in the same fashion as signals belonging to other standards. Therefore the surgical neutralizing system augments the fast beacon scanning algorithm with a search for persistent non-GSM energy.

Example Implementation

The following presents a presently-preferred embodiment of the surgical neutralizing system. While other implementations are possible, the preferred embodiment is characterized by efficient use of a modest bandwidth receiver that is capable of being rapidly tuned over the spectral bands of interest. The use of such a receiver significantly reduces the cost, size, and power requirements of the surgical neutralizing system as compared with sophisticated wideband implementations of techniques for neutralizing wireless devices.

Receiver Subsystem Design and Operation

Figure 17:
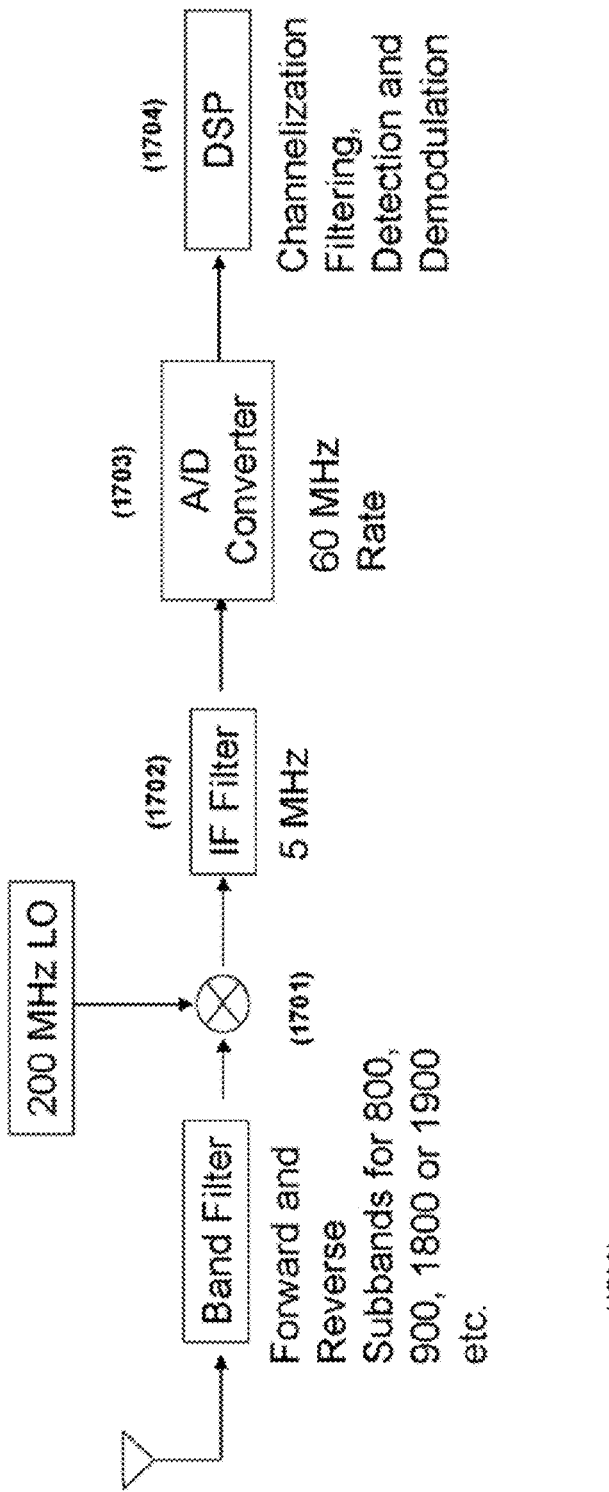
FIG. 17 is a detailed block diagram of the receiver in the preferred embodiment.

The surgical neutralizing system uses a modest receiver having an effective bandwidth of 5 MHz that is tunable across the forward and reverse links as shown at 1700 in FIG. 17. Receiver 1700 consists of an RF tuner (1701) that can variably tune any portion of either link to an intermediate frequency (IF), using what is known in the art as superheterodyning. The IF tune is followed by a band limiting filter (1702) that limits the output to 5 MHz, which in turn is followed by another conversion to baseband where the signal is subsequently sampled for digital processing (1703). This baseband conversion can be achieved by what is known in the art as undersampling where the output of the IF section is sampled directly. Undersampling eliminates the need for a second superheterodyne stage. This technique however is not central to the surgical neutralizing system. In summary, receiver (1700) is able to extract on demand 5 MHz sections anywhere in either the forward or reverse link. RF tuner 1701 is also capable of tuning to such a section within 100 uS.

Following digitization, the signal is passed through a digital channelization filter (1704) and then processed by a digital signal processor (collectively referred to as baseband processing). The design is repeated for each band of interest (e.g., 800, 900, 1800 or 1900 MHz). In the descriptions that follow it is useful to refer to FIG. 5.

The receiver of the preferred embodiment is able to perform the following functions in a timely manner:

Forward Link

Recover the artificial beacon whether looped back from the generator and/or from other external systems.

Detect the presence of a new beacon anywhere in the forward link within 100 mS of entering the new beacon's coverage area and report the timing of the new beacon relative to the artificial beacon.

Monitor a new beacon until the structure of the SDCCH channels can be determined.

Monitor subsections of the forward link spectrum looking for frequency hopping activity.

Reverse Link

Monitor the reverse SDCCH channels associated with all currently detected beacons looking for control signaling involving wireless devices that are in high proximity to the convoy.

Monitor the SACCH channels associated with all currently detected beacons and detect high proximity wireless devices within 500 mS of the wireless device entering the convoy's operational area.

Monitor the RACH associated with each detected beacon.

Figure 18:
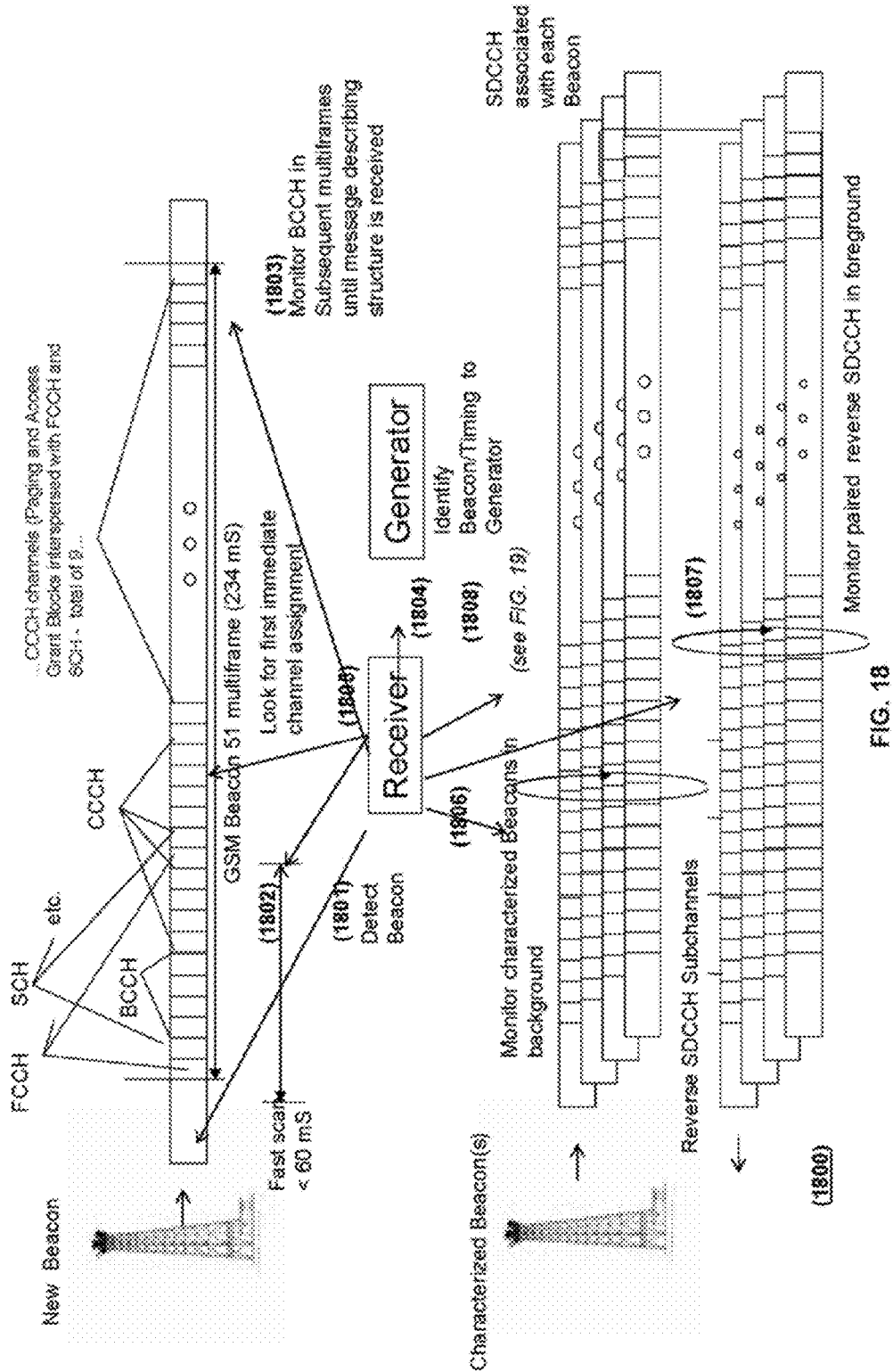
FIG. 18 presents a detail of the receiver's operation.

FIG. 18 shows the operation of receiver (1700) at (1800). Upon detecting a beacon (1801), receiver 1700 immediately reports the timing to the generator (1802) (fast scans it) and then extracts the structure of the paging channels from the system information messages that are regularly broadcast by beacon (1803) on the BCCH. It also indicates to the generator the frequency at which the artificial beacon should be placed so that it does not interfere with an existing legitimate beacon (1804). The receiver then listens to the paging channels on the beacon until such time that the first immediate channel assignment (identifying the structure of the SDCCH) (1805) is detected on any of the paging channels and then adds the detected information to an SDCCH scan list. Subsequently, the receiver infrequently revisits (resynchronizes to) the beacon (perhaps only every few seconds as scheduling permits) to determine whether the beacon has been lost and if so, the associated SDCCHs are discarded from the aforementioned list. As described previously, no race condition exists between waiting for an immediate channel assignment and a call setup because the call setup requires an immediate channel assignment. Therefore the surgical neutralizing system can dwell on a beacon indefinitely without fear that call will slip through while doing so. However, the need to dwell on a beacon for an extended period of time may cause scheduling difficulties with respect to all of the other real-time monitoring that is required of the receiver. The surgical neutralizing system deals with this problem as described below under the heading of Combined Subsystem Operation and Scheduling.

Because beacons broadcast constantly, it is relatively easy for the receiver to scan the band for energy without regard to the beacon timing. Using a 5 MHz receiver with a dwell time of 100 uS, the surgical neutralizing system can scan the entire forward link (worst case 75 MHz) looking for energy in 1.5 mS (1806). Once energy is detected, the surgical neutralizing system need dwell for no more than 50 mS before it can expect to see an FCCH/SCH combination. The combination has a duration of 10 mS. Therefore a new beacon can be unambiguously detected (not to be confused with characterized) in as little as 60 mS (1802). Because beacons broadcast constantly and can be rapidly detected, scanning for beacons can easily be performed in a background mode (i.e., be preempted) while the more pressing problems of beacon monitoring and forward channel hopping analysis as well as SDCCH/SACCH detection can proceed in the foreground.

While scanning on the forward link, the receiver must simultaneously detect both SDCCH (1807) and SACCH (1808) signaling on the reverse link. In the former case the receiver is looking for energy at very specific places in time on a specific time slot on a specific frequency channel that is expressly paired with a detected beacon. The purpose is to detect the control signaling that presages any call setup with the intent of reacting to this event before the wireless device can enter traffic mode. In the latter case the wireless device has already entered traffic mode and is frequency hopping in DTX mode.

An SDCCH can have as many as 8 sub-channels. Each subchannel has one block consisting of 4 frames on every 51 multi-frame. As a minimum, there will be at least 4 messages (1 on each 51 multi-frame) exchanged between the wireless device and the network before the alert message comes through, for a minimum setup time of approximately one second. This dictates that the surgical neutralizing system must visit every one of up to 8 subchannels at least once per second. While this timing is fixed by the network, the fact that a message occupies 4 frames gives the surgical neutralizing system some leeway in scheduling of the detection. This can be used for example to schedule SDCCH scans when there are multiple beacons that have SDCCHs that overlap in time.

Figure 19:
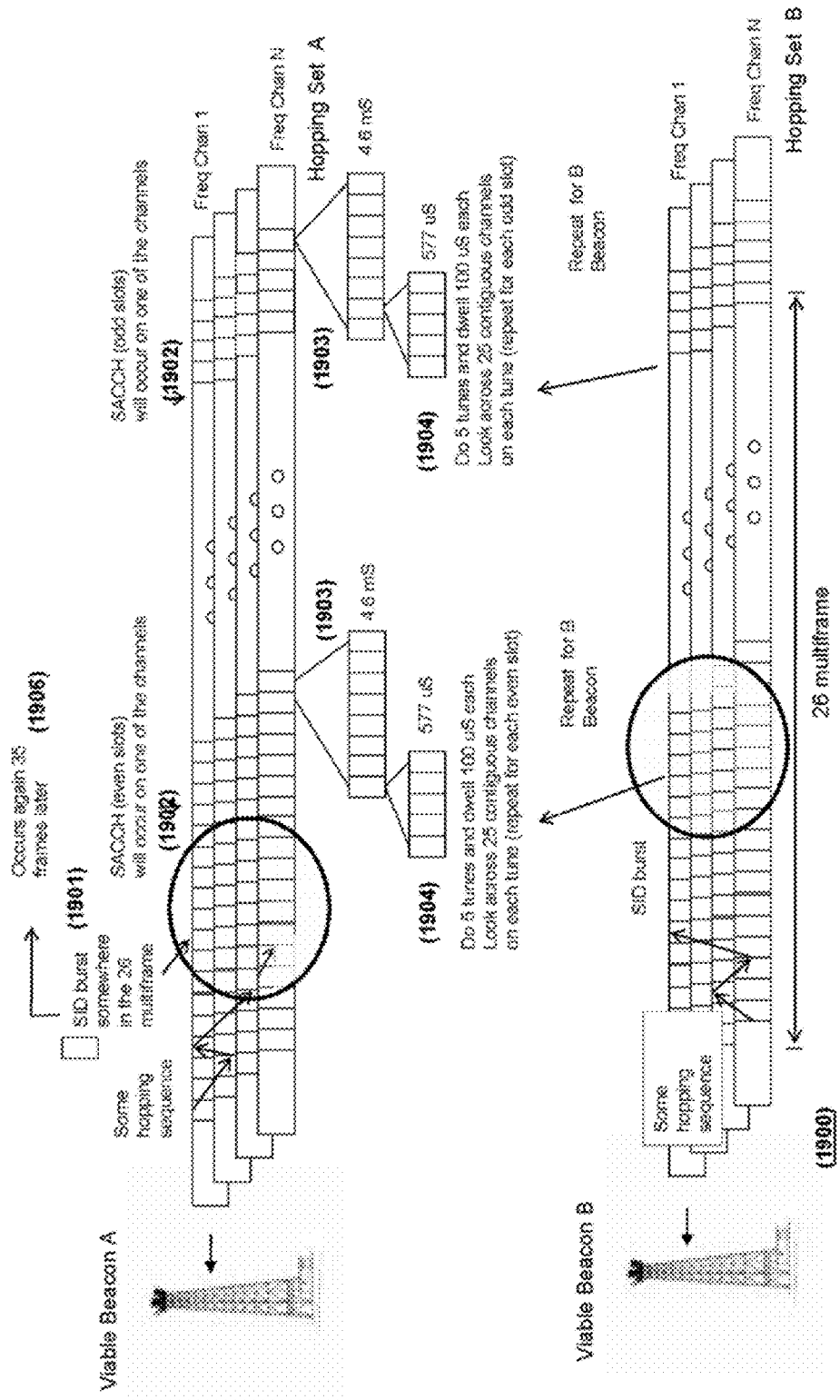
FIG. 19 presents details of how the receiver uses SACCH slots for a wireless device to detect the wireless device's hopping sequence.

The SACCH detection process on the reverse channels is shown at (1900) in FIG. 19. The purpose of SACCH detection is to address the expected (and worst case) scenario in which a wireless device is in active mode in close proximity and the forward and reverse links are operating in DTX mode. The operation in DTX mode indicates that neither side of the link is speaking or otherwise signaling. The immediate difficulty is the ability of the receiver to not only detect the presence of a wireless device in close proximity, but to ascertain the hopping sequence for the wireless device. To determine the hopping sequence, the receiver must, as previously described, form an activity histogram and pass the histogram to the generator in a timely fashion so that the generator can attack enough channels in the hopping set to render the forward link between the network and the wireless device unusable while the receiver ferrets out the wireless device's hopping sequence.

In the DTX case, the wireless device is presumably frequency hopping across as yet undiscovered channels but will only burst what is defined in the standard as SIDs (silence indicator) across 4 contiguous frames every 35 frames (approximately every 160 mS) (1901). While the occurrence of SID bursts is periodic and will necessarily line up on specific frame boundaries, its phase within the 26 multiframe is unpredictable. However the surgical neutralizing system takes advantage of the fact that the slow associated control channel (SACCH) is signaling at least once every 26 frames (1902) (approximately 120 mS) regardless of whether the wireless device is in DTX mode and such signaling is perfectly predictable based on the network (beacon) timing gleaned in any forward link scan. Therefore the DTX detection issue can be resolved by relying instead on the compulsory SACCH transmissions.

The receiver solves the SACCH detection problem by scheduling a one frame scan at the predicted time (1903). However since it is not possible to know with certainty on which beacon the wireless device is operating, and since the timing between beacons can be arbitrary, it is necessary to perform the scheduled scan for every associated beacon that is currently detected in the operational area. Refinements of the SACCH scanning technique can reduce the scan requirements. For example, the receiver may ignore the SACCH signaling associated with beacons other than the strongest beacon and beacons whose signals are above a certain threshold in relation to the strongest beacon.

While the SACCH timing is perfectly predictable, the slot and channel on which the wireless device is hopping is not. A GSM burst lasts for 577 uS and will be in one (yet to be determined) of the 8 slots of the 4.6 mS frame being scanned. Since the receiver of the preferred embodiment can tune within 100 uS, it can look for energy at least 5 times per slot (1904). (5 dwells). Since each dwell can search 5 MHz (i.e., the bandwidth of the receiver), the receiver can, by implication, scan a single slot across 25 MHz (i.e., five 5 MHz dwells). By extension, the receiver can sustain a scan on single frame (all eight slots) across 25 MHz. This therefore implies that the receiver can scan the entire worst case 75 MHz reverse link in approximately 360 mS (every ⅓ second or 3 times per second) (1905). This number represents the time the surgical neutralizing system requires to detect a wireless device. The derivation of the number further makes clear that the time to detect the wireless device is directly related to the receiver bandwidth and tuning speed. Increasing either decreases the time required to detect the wireless device.

There are several problems with this scheme as presented. They are enumerated below with a description of how they are addressed by the surgical neutralizing system.

Frequency Hopping Coverage—

Because of the paucity of SACCH frames it can take several seconds to collect enough frames to form a coverage histogram for most or all of the hopping channels and/or converge to a hopping set solution. For example there are approximately 8 SACCH frames per second and frequency hopping can operate across as many as 64 channels. The SID information on the TCH is also available for detection, but has an unpredictable phase.

Solutions to the problem posed by the paucity of SACCH information include searching for SID information directly on the reverse channel and camping on the forward channels waiting for the wireless device to come out of DTX while collecting the same SID/SACCH information. The following observations apply to either approach:

The GSM standard dictates that the maximum frequency hopping span cannot exceed 25 MHz.

The forward and reverse links use the same frequency hopping channels and time slots (albeit delayed by three slots).

Once the SID frames have been detected (i.e., their phase in the multiframe), they have a perfectly predictable periodicity.

A priori knowledge of the beacon's HSN and the hopping set dramatically limits the total search space.

Reverse SACCH/SID Detection

In reverse SID detection, it is presumed that the wireless device is not likely to come out of DTX. Consequently, the receiver must rely strictly on SACCH and SID detection to fill in the hopping set histogram. The receiver takes advantage of the fact that there are a combination of at least 32 frames of SACCH and SID over a period of one second. Because this is so, the receiver can immediately dwell on the part of the spectrum where the original SACCH was detected for a period of 160 mS (the SID periodicity) (1906) to determine the timing of the SID and then use this to subsequently schedule scanning on both the SACCHs and SIDs as to discern the hopping set. From this may be seen that that the total time to suppress the wireless device in the preferred embodiment will be on the order of 1360 mS after initial detection. One benefit of this detection scheme is that having the receiver remain on the reverse link requires less sensitivity in the receiver, since any wireless device that is a threat to the convoy must be in close proximity to the receiver. It also requires less intense scheduling than the forward link solution described below. However it has the potential drawback that the hopping set may not be found quickly enough to suppress the forward link before the wireless device comes out of DTX and can detonate the device.

Forward SACCH/SID/Activity

The forward SACCH/SID/Activity solution performs the same SACCH and SID detection but does it on the forward link. It is also presumes that forward channel is operating in a DTX mode prior to the onset of detonation signaling. Therefore it has the added burden of allocating sufficient resources to perform an intense scan of the forward channels so as to rapidly formulate the histogram as soon as the forward link comes out of DTX. However, one benefit is that this can be used to minimize collateral interference by not molesting cell devices that remain in DTX, as they are not able to act as detonators in that mode.

The surgical neutralizing system must also deal with the conflict on the forward link that arises because the receiver is attempting to formulate and update the activity histogram of the signal while the generator is actively attempting to suppress the same signal. The problem is solved by using surgical generation techniques to attack only the TSC. The TSC comprises only 10% of the signal burst in the time slot. This leaves 90% of the burst in the time slot open to detection by the receiver, and this is more than adequate. Because the receiver and generator are synchronized by the artificial beacon, the receiver is able to determine the part of the burst that contains the TSC and avoid that part of it.

In either approach, once the first SACCH is detected, the receiver scans 25 MHz centered around the channel in which the detection occurs, as the standard limits hopping to no more than a 25 MHz span. As the activity histogram fills in, the receiver dynamically re-centers itself around the mode of the histogram to better refine the search. This technique is further refined when the surgical neutralizing system has determined the hopping set a priori. In that case, only the channels in the hopping set are scanned.

If either link is not in DTX or other subscribers are active (and presumably using the same hopping set), the problem is simpler, since in that case, the receiver will have already identified the hopping set.

Nothing precludes using either strategy or even a combination of both. The forward and reverse time slots are offset by three slots, which makes it possible for the receiver to flip back and forth between them if resources and scheduling permits. Flipping back and forth essentially doubles the number of frames that can be detected, and that should halve the time it takes the receiver to converge to a hopping set solution.

Wireless Devices Operating on Hopping Sets that Straddles a 25 MHz Dwell.

In this case the wireless device detection is not guaranteed because it is possible that it is hopping out of phase with the dwell. A simple example is when the wireless device happens to hop into one 25 MHz dwell band while the receiver is dwelling on another and then hops back into the current dwell band when the receiver moves on to the next dwell band. The receiver solves this problem by staggering the center frequency the 25 MHz dwell bands on each sweep through the band (2009). Staggering the center frequency increases the worst case time to detect a wireless device in the preferred embodiment to 360×2=720 mS.

Sector Blinding—

Figure 20:
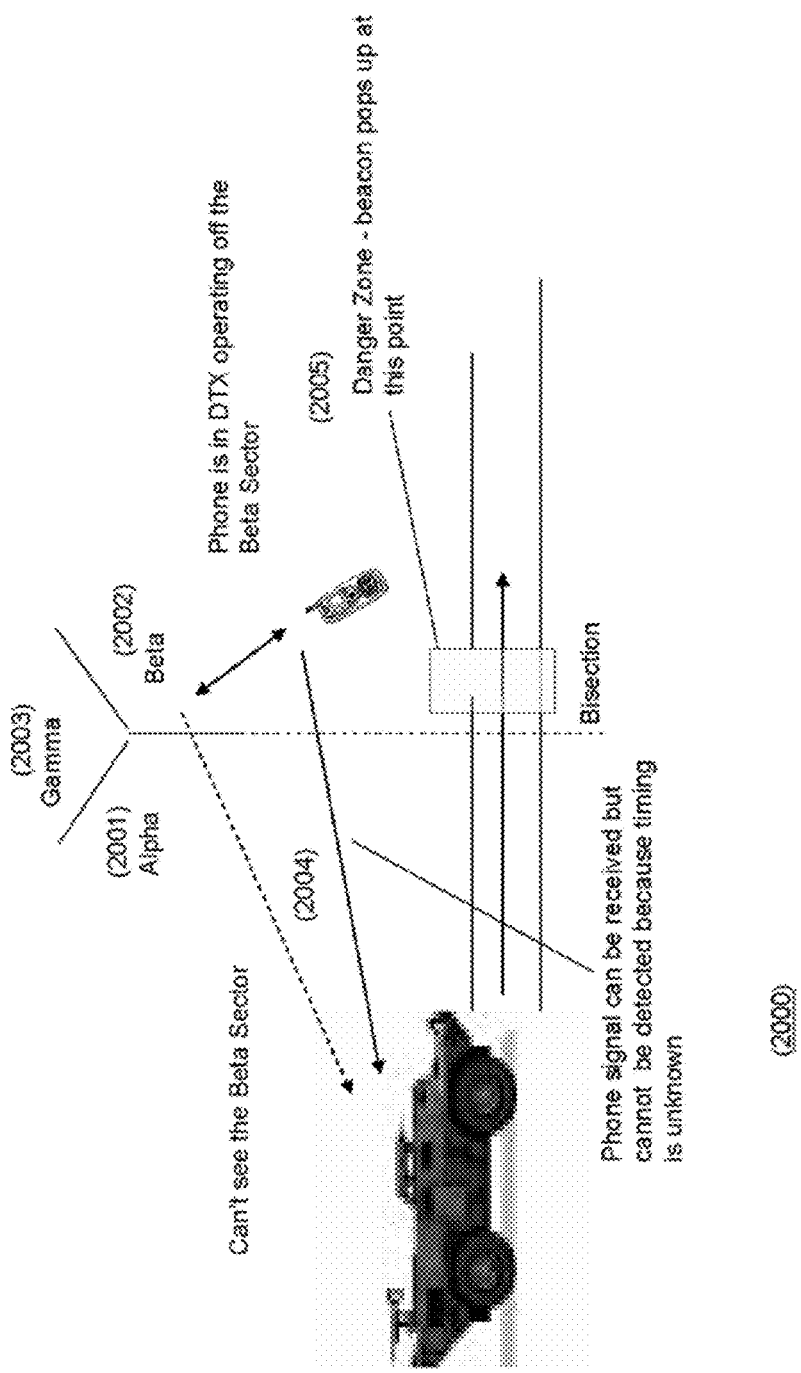
FIG. 20 presents a worst-case problem of wireless device neutralization.

The worst case for detecting a wireless device is shown at 2000 in FIG. 20. It shows a very common tower configuration having three sectors denoted alpha beta and gamma (2001, 2002 and 2003) where the boundary between the alpha and beta sectors bisects a highway that passes by the tower in close proximity. As the convoy moves down the highway from left to right in the diagram it has detected the beacon operating off of the alpha sector but is blinded to the beacon operating off of the beta sector (2004). Meanwhile the wireless device is operating off of the beta sector just to the right of the bisection (2005). The wireless device is in high proximity to the tower (making a forward link attack difficult to mount and a reverse link attack futile) and it is already active and operating in DTX mode waiting for a detonation signal to come down on the forward link.

A direct solution to this problem would be to apply heroic receivers that can constantly and simultaneously sample the entire 75 MHz band and can therefore detect energy anywhere at any time (i.e., without regard to any beacon timing). This would as a minimum quadruple the cost of the surgical neutralizing system due to the amount of signal processing resources that would be required to sift the data and double it yet again because another receiver would have to deployed on the forward link to operate in parallel with the receiver operating on the reverse link, rather than time duplexing a single receiver.

The solution to the problem shown in FIG. 20 takes the following into account:

Exposure Time—The amount of time the convoy will be exposed will be equal to the amount of time it takes for the receiver to detect (and thereafter time) the beacon as it crosses from the alpha into the beta sector plus the amount of time it takes to detect the first SACCH that is timed to that newly detected beacon on the beta sector. The receiver of the preferred embodiment will detect and time a new beacon within 100 mS and the maximum SACCH detection time is 120 mS thereafter for a total of 220 mS. At a maximum speed of 100 feet per second this corresponds to approximately 20 feet of exposure.

Common Timing—The problem is often mitigated by the custom of using the same timing for all of the sectors on a tower so there is a strong probability that the receiver will pick up the SACCH signaling of the wireless device even though it cannot detect the beta sector beacon New Beacon Power Spiking—A new beacon will appear with a dramatic power spike as the convoy crosses from the alpha to beta sectors.

Service Provider Subbands—Service providers typically operate within some fixed sub-band that cannot exceed 25 MHz. This means that it is very unlikely that a service provider will for example have a beacon on one end of the entire band and hopping channels on the band's other end.

DTX to Activity Time—As per above there is a 220 mS window of opportunity for the user to send the signaling. Any time it takes for the network to come out of DTX must be included within this window.

High Proximity—The convoy will be in higher proximity to the wireless device than the tower when the wireless device is detected so the power levels output by the surgical neutralizing system will be able to overcome that of the tower.

The surgical neutralizing system operates by first noting the timing of the newly detected beacon and if it matches that of another active beacon, then the presumption is that this wireless device was already picked up as a matter of course and hence no additional action need be taken. If the new beacon timing is unique and the signal power is immediately large, the surgical neutralizing system will enter a panic mode that diverts all available resources to attack the forward channel on 25 MHz surrounding the beacon to give the receiver time to form a hopping histogram (a few seconds) on the reverse link. If no SACCH is detected within 120 mS it is presumed that there is no active signaling and the panic attack is ended immediately. In the preferred embodiment, this approach reduces the exposure time to no more than $\frac{1}{10}^{th}$ of a second or about 10 feet.

Refinements of the surgical neutralizing system include:

Increasing Power Detection—The surgical neutralizing system can take advantage of the fact that the signal power dissipates as the inverse of the square of the distance from the transmitter. This means that the detected power coming from the wireless device will increase non-linearly as the convoy approaches it. The surgical neutralizing system therefore can use this fact to reduce false alarms by noting whether detected energy is rapidly increasing in power. This can be further refined by using the accelerometer or the GPS receiver to adjusting the thresholds for the effect based on the speed of the convoy. For example a static convoy would increase the detection threshold while a moving convoy might decrease it.

Doppler Detection—The surgical neutralizing system can using Doppler information to detect when it is approaching a wireless device. The purpose is to use this information to minimize false alarms. All beacons provide a tone burst on what is termed the frequency correction channel or FCCH. The purpose is to calibrate the wireless device carrier frequency tuning. By detecting the FCCH the surgical neutralizing system can predict the precise frequency expected by a wireless device operating off of that beacon and hence can detect a frequency shift (Doppler effect) associated with the convoy moving relative to the wireless device. For example at the carrier frequencies commonly expected by this surgical neutralizing system, Doppler shifts of a few hundred Hz can be created depending on the velocity of the convoy relative to the wireless device.

Transmitter Subsystem Design and Operation

Figure 21:
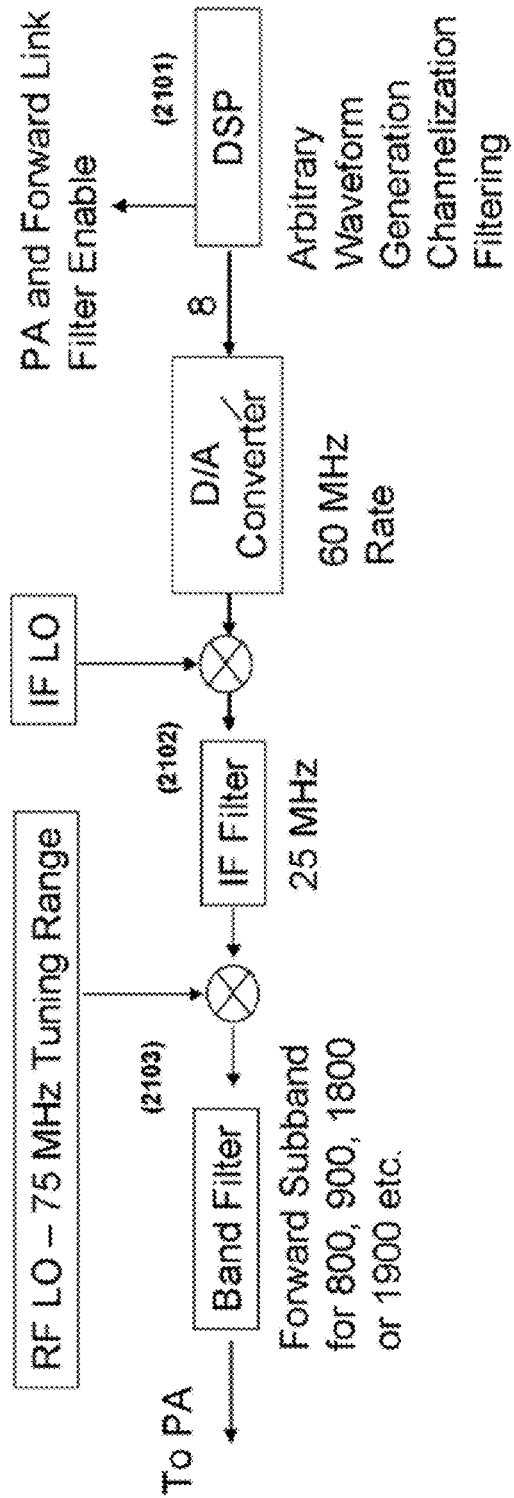
FIG. 21 is a detailed block diagram of a generator.

The combination of the generator and the RF circuitry used to switch and amplify the signal is collectively referred to as the transmitter. The preferred embodiment is shown previously in FIG. 5 and the details of the generation subsystem are shown in FIG. 21. The transmitter consists of a baseband generator (2101), IF (2102) RF (2103) upconverters, a power amplifier and the necessary RF coupling circuitry to combine signals from multiple transmitters for transmission at the antenna as well as to receive signals simultaneously from the same antenna for distribution to the receiver. The transmitter hardware is repeated for every band of operation (e.g., 800, 900, 1800 or 1900 MHz).

The power amplifier receives a signal from the generator that controls whether the power amplifier is on or off. The power amplifier is capable of reaching full power within 1 uS of the application of the control signal and will return to zero power within 1 uS of the end of the control signal. This same signal is used to switch off the forward link receive signal path so as to protect the receiver circuitry. When this switch is in the off position the receiver is essentially blinded to the RF environment. The receiver must thus be able to adequate detection in a timely fashion while being periodically blanked—refer to Combined Subsystem Operation and Scheduling.

The surgical neutralizing system's power amplifier is likely to be the single largest item in the system's power consumption budget. It is crucial to the system's power consumption that it is able to rapidly turn the amplifier on and off. As described previously this feature of the amplifier enables the surgical neutralizing system to realize power savings of a factor of 1000 or more over conventional suppression systems. Because the system generally requires high power over relatively short periods of time, the surgical neutralizing system also employs a discharge circuit (typically consisting of a diode and capacitor) to smooth Out the power consumption.

The transmitter also controls the switch for injecting the artificial beacon into the receiver signal path. The transmitter injects the beacon on demand on some channel when requested by the receiver and responds to the request when it can schedule a hole in the generation tasking. Once the receiver detects the beacon (and thereby recovers the timing) it will direct the generator to cease generating the beacon.

The generator consists of a Digital Signal Processor (DSP) (2101) capable of creating 8 independent arbitrary waveforms, each up to 5 MHz wide (e.g., W-CDMA), that are tunable across 25 MHz and implicitly locked to any beacon timing via the previously described artificial beacon loopback method. Timing for each individual beacon is known to within 1 uS as it is seen in the air. Nothing in the surgical neutralizing system precludes adding more waveform generators if they are needed, as the waveforms produced by the additional generators are combined digitally with the waveforms produced by the existing waveforms.

The generator applies the waveform attack strategies described previously under the heading of specific attack techniques. A preferred embodiment of the surgical neutralizing system employs three types of waveforms in arbitrary combinations—a GSM TSC override waveform operating on from 1 to 6 frequency contiguous channels having between a 200 kHz and 1.2 MHz of bandwidth; a tone snippet waveform that lasts from 1 to N GMSK symbols as defined programmatically that allows individually selected GMSK symbols to be attacked; and a medium band white noise signal such as CDMA. When attacking non-hopped signals such as would be seen on the paging channels (proactive idle mode) or SDCCHs (reactive idle mode), a focused single channel GSM TSC attack is used. A multiple channel GSM TSC attack is used when attacking active mode hoppers. If and when the hopping sequence is determined, the attack can switch to tone snippets which can perform either a stealing bit attack or a convolutional encoder attack by targeting specific bits in the GMSK burst. While the surgical neutralizing system can generate wider-band signals (as noted above) and hence suppress wider swaths of bandwidth, this comes at the price of significantly decreased power efficiency, as the suppression may not necessarily be well tailored to the hopping channels—for example spread across parts of spectrum that are not used by the signal under attack. Furthermore, since the energy is now spread across many more channels, the power applied to any given channel is now diluted and hence additional power must be applied to the signal as a whole in order to ensure that a hop on any given channel is suppressed. Therefore the surgical neutralizing system uses the hopping histogram to tailor the number of channels employed by a waveform generator. The tailoring allows the system to more efficiently allocate the number of waveform generators as well as the number of channels that waveforms are generated for.

The TSC and tone snippet attacks are used when the signal timing is known. In the rare case when the signal timing is not known (e.g., there are no signals detected by the receiver), then multiple CDMA noise like signals are used to sweep the entire band simultaneously at low power levels. This finds its primary use in addressing the case where the surgical neutralizing system may be in position such that it is in a fade and cannot detect a weak beacon whereas the wireless device is in a position where it is not in a fade and hence can detect the beacon.

Each signal generator can be independently turned on or off within 1 uS, which allows the signal generators to operate in a highly surgical fashion. Each signal generator can also enable the aforementioned power amplifier control signal. Therefore the control signal is the 'wired-or' of all 8 signals such that if any of the signals is on, the power amplifier remains on.

Multiple threats may require the generator to cover more than 25 MHz at a time—for example two different wireless devices operating on either side of the 75 MHz band. This necessitates that the generator be multiplexed between the two wireless devices. The generator, like the receiver can be tuned between 25 MHz swaths of bands within 100 uS. Therefore it has the agility to attack one signal and return to attack the other. If multiple subscribers are operating on different time slots in the same band then any given waveform generator simply extends the generation to cover those time slots.

Only in rare cases would the generator not be able to provide coverage—for example if the TSCs of the signals under attack on either end of the band overlap. This is expected to be unlikely in general, because the two signals in question would not be operated by the same service provider and would therefore likely not be synchronized. Since the TSC attack only occupies 50 uS out of each 4.6 mS frame (approximately 1%), then the probability of overlap in the active case is 0.1%. Should this case arise, the generator can resort to attacking every other frame while increasing the bandwidth of the attack. These two remedies cancel each other with respect to the random active mode attack, as the net frame corruption rate remains the same. The most notable drawback is the necessary increase in peak power to compensate for the increase in spectral spreading. In the case of the reactive idle mode attack, the likelihood of collision is even smaller, as not only do the TSCs have to line up, but the frames in which they are occurring must also be coincident. Even in this highly unlikely case, the generator can resort again to attacking every other frame such an attack is sufficient to keep the signaling from consummating the call setup.

Combined Subsystem Operation and Scheduling

The foregoing descriptions do not expressly address the need to account for scheduling of the receiver and how this may be affected by ongoing operations of the generator. The following describes how the surgical neutralizing system coordinates all of the individual requirements particularly as it relates to scheduling including how potential conflicts are resolved.

Figure 22:
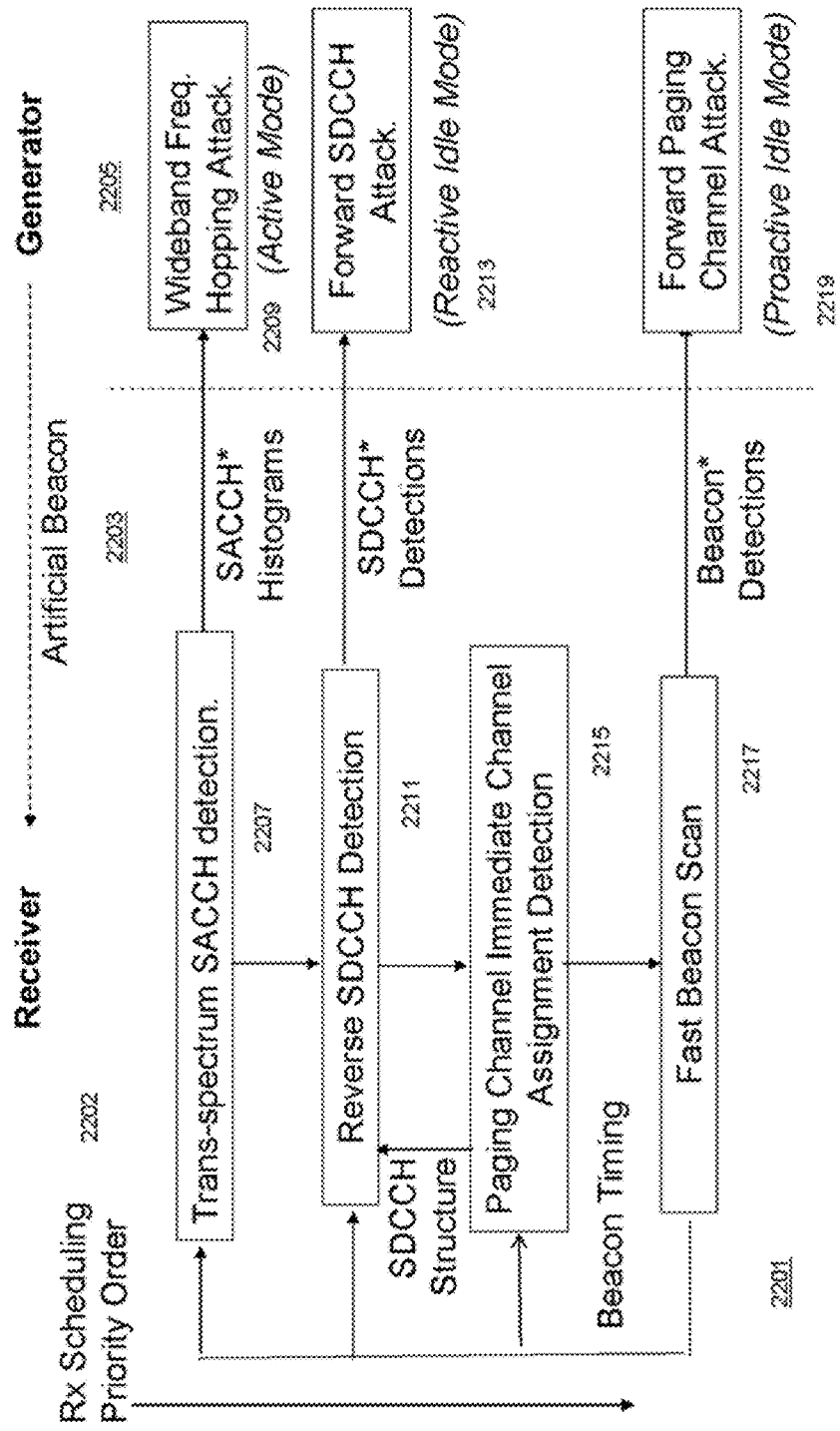
FIG. 22 is a diagram of scheduling in the preferred embodiment of the surgical neutralization system.

FIG. 22 shows the control flow (2201) between the receiver and the generator. The receiver acts as an event pump. The only assumption that the receiver makes concerning the generator is that the generator will be active on some known portion of the signal. In some modes of operation, the receiver will consequently avoid making measurements during that portion of the signal. Otherwise the receiver makes measurements with the understanding that it may be blanked by the generator from time to time while receiving signals on the forward link. The generator on the other hand must regularly schedule holes in the generation whenever it is active for sustained periods of time.

The priority (2202) for receiver resources (2203) is listed below with highest first.

Trans-spectrum SACCH detection (2207)—Schedules a SACCH detection on the reverse channels every 26 frames for every currently detected beacon across 25 MHz. Round robin scheduling on sets of 25 MHz to cover up to 75 MHz-refined based on any hopping set information.

Reverse SDCCH detection (2211)—Detect signaling on all reverse SDCCHs where the timing has been established.

Paging Channel Immediate Channel Assignment Message Detection (2215)—Monitor all paging channels on the forward link of a newly detected beacon until the first immediate channel assignment message is detected.

Fast Beacon Scan (2217)—operates by default (in the background) when none of the foregoing processes are in progress.

The surgical neutralizing system takes into account the fact that there may be conflicts when one or more beacons are scheduled for SDCCH structure detection (2207) at the same time that reverse SACCH detection (2211) is scheduled on the reverse channel. The surgical neutralizing system solves this problem by giving reverse SACCH detection (2211) precedence over the paging channel immediate channel assignment detection (2215) and instead directs the generator to attack the paging channel(s) (2219)—in essence attacking what it cannot schedule for detection. At worst this potentially delays the detection of a candidate immediate channel assignment message on some beacon under scrutiny while ensuring that the message cannot slip through to the wireless device.

The surgical neutralizing system also addresses the case where SDCCH structure detection is pending across multiple beacons by extending the principle of attacking what cannot be detected and listening in a round-robin fashion on each of the candidate frequency channels as scheduling permits. This same principle extends to the common (and worst case) scenario when one or more newly identified beacons have identical timing such as might be seen on multiple sectors operating on the same tower. In this case, the receiver of the preferred embodiment may not be capable of monitoring all of the paging channels simultaneously if the channel separation of the paging channels is more than 5 MHz. In this case, too the surgical neutralizing system resorts to attacking what it cannot schedule for detection.

Upon detection of a threatening signal, the receiver creates an event message that includes (but is not limited to) the following information and sends it to the generator:

Type: SDCCH or TCH (i.e., an idle mode call set up or active traffic)

Governing Beacon—which beacon the threat is operating off of.

Hopping Information (as it becomes known) including:
Hopping channel set, hopping sequence number (HSN), mobile allocation index offset (MAIO), current detection histogram.

The receiver will continue to issue these events and update the information listed above as it evolves (typically every second). If the threat subsides the messages simply stop coming and the generator will remove the threat from its attack list.

The generator for its part reacts to the energy detection reports and decides how best to deploy resources to attack the signals reported therein. The reaction is based on whether the unit is operating in convoy or static mode, which in turn is governed by whether the convoy is on the move or has remained stationary for an appreciable period of time as detected either by the GPS receiver or the accelerometer. In static mode, the generator operates in proactive or reactive idle mode and in convoy mode, the generator operates in active mode. Thus, when the receiver is performing trans-spectrum SACCH detection (2207) in convoy mode, the generator is performing a wideband frequency hopping attack (2209) based on the SACCH histograms. When the receiver is performing reverse SDCCH detection (2211) in static mode, the generator is performing a forward SDCCH attack (2213) based on the detected SDCCH channels and when the receiver.

The only constraint on the generators is that they must be sensitive to the needs of the receiver to gain regular access to the forward channels in a timely fashion to perform such tasks as new beacon or SDCCH structure detection. Therefore the generators must regularly schedule holes whenever transmitting. The surgical neutralizing system can achieve this because the receiver expressly provides the timing of all detected beacons relative to the artificial timing beacon. The generators can be set up to use the artificial beacon and the timing information to cease jamming at times when the receiver is performing a forward channel scan. For example, the SACCH frames do not contain any signaling information which can be used in the wireless device to cause an explosive device to detonate. The receiver can, however, use the SACCH frames to determine the wireless device's hopping sequence. Consequently, in a preferred embodiment, the generator is set up so that it does not jam the SACCH frames.

It is thus the waveform timing of detected signals as opposed to any receiver design constraints, requirements, or even implementation, that moderates the allocation of resources such as access to the forward channels. This vastly simplifies the interaction between receiver and generator and also affords the generator complete latitude in deciding how best to attack tile signal. Any generation in progress takes precedence because the generator must be presumed to be actively neutralizing an immediate threat. For example the generator may elect to defer opening a hole for the receiver to a point in time where the threat is diminished or is perhaps easier to schedule.

An immediate objection to this design choice is that the generator may be able to completely starve the receiver in some modes of operation. For example a "detected" beacon cannot be subsequently "characterized" in a timely fashion because its timing is such that it coincides or otherwise overlaps with the timing of another beacon that is under attack. However in these circumstances the generator falls back on the principle of attacking what cannot be characterized until such time that it can safely schedule access to the forward channel.

Using the DTX Mode Behavior of a Wireless Device to Determine Whether a Wireless Device is a Suspect Wireless Device Overview The basis of the techniques is to determine whether there is a live subscriber or a threatening device associated with an individual wireless device. In the terminology used in the following discussion, a wireless device that is clearly associated with a live subscriber will often be termed in the following an ordinary wireless device; wireless devices that are not clearly associated with a live subscriber are often termed suspect wireless devices. The techniques take advantage of the discontinuous transmission (DTX) mode that is supported by the vast majority of wireless devices and networks that are currently in service world-wide. The purpose of DTX is primarily to improve battery life of the wireless device by limiting transmission when it detects that a subscriber is not talking (which is on average ½ the time). In the absence of an audible input at the microphone, a wireless device will fall back to a very distinct transmission pattern that is designed to keep the communications link open while utilizing a minimum of power. It is also critical to note that the signal patterns produced by a wireless device while it is DTX mode cannot be hidden by encryption.

The central premise of the techniques is that a device that is hooked to a headset and set to auto-answer is not hooked to a voice input device such as a microphone, receives no audible inputs, and hence operates strictly in DTX mode. Extending this principle, the same "silence" signaling pattern propagates all the way back to what is often termed in the following the controlling wireless device or other telephone. The controlling telephone is the telephone which has been used to arm the wireless device that is to activate the explosive device and which will send the tone that will trigger the explosive device. Thus, the pattern may be used to locate the perpetrator who is operating the controlling telephone.

In the case of a wireless device that is not in traffic mode, the technique uses a baiting beacon to inventory the wireless devices and then performs the additional step of calling the device and analyzing the signaling patterns of the wireless device to determine whether a live subscriber has answered the wireless device. In the case of wireless devices which are in the traffic state, the invention analyzes signals produced in the traffic state by individual wireless devices to determine if the wireless device that is in the traffic state is indeed operating in DTX mode.

In many practical cases, a wireless device will be in DTX mode simply because its user is not presently talking. However, techniques disclosed herein can be employed to provoke a subscriber into speaking and hence further enhance the ability of this method to distinguish between suspect wireless devices and those being used by normal users. The techniques are further usable not only with signaling on the air interface between the base station and the wireless device, but also with signaling on internal paths in the cellular wireless system. They can therefore be used to create an alert that a suspect device is thought to be armed in some specific area.

Figure 23:
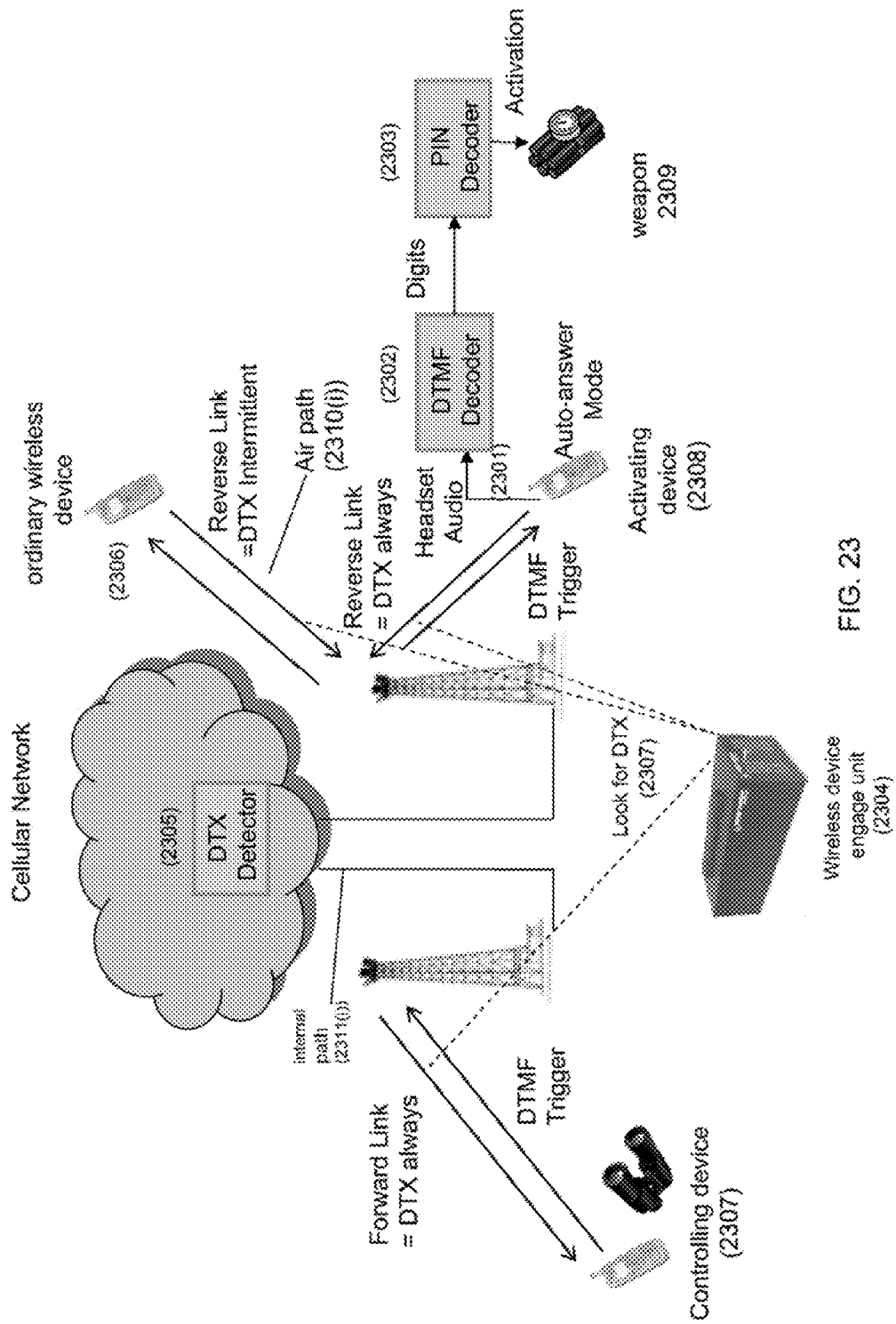
FIG. 23 provides a Threatening Device Signaling Overview.

FIG. 23 shows an example technique for using a wireless device 2308 as an activating device for a weapon 2309 such as an explosive device. Wireless device 2308 features a headset jack and is set to auto-answer all incoming calls (2301). The audible signal produced by the headset jack is routed to a readily obtainable DTMF detector integrated circuit (2302) that decodes the incoming tone signaling into a sequence of digits that is read by another easily obtainable digital logic integrated circuit that is programmed to be sensitive to a particular sequence of numbers (2303). This sequence of numbers is used as a type of PIN wherein all but the last digit arms the device and the remaining digit triggers it. The perpetrator, typically operating in close proximity, and very likely operating on yet another wireless device (controlling device 2307), calls the threatening wireless device in advance and enters the arming sequence of digits but refrains from entering the triggering digit until the right moment to effect precisely timed detonation.

The important feature of this setup is that the microphone normally associated with the headset is unused and hence no audible voice is presented to the wireless device acting as the trigger. This causes the wireless device to sense there is no voice and therefore operate in the reduced power DTX mode.

A wireless device engage unit (2304) or alternately a network sensor (2305) is used to determine if a phone is signaling in the DTX mode. The wireless device engage unit can listen to and modify signals on the air path 2310 between a wireless device and its beacon and the DTX detector can listen to and modify signals on internal paths 2311 that are internal to the cellular system. There are two primary modes of operation. In the first mode of operation, wireless device engage unit 2304 is employed to interrogate all of the wireless devices in some operational area. Each phone is called in turn (2306-2308) or possibly in parallel as hardware resources permit. The wireless device engage unit then senses the signaling received from the phone with the expectation that if the phone is a wireless device 2306 that is being used in the usual fashion, the user will answer the phone with an audible greeting. If voice activity is detected the wireless engage device might then simply offer up an audible canned apology and hang up. If the called device demonstrates no activity after some modest period of time (e.g., 5 seconds) and indeed does not hang up as would be expected from an ordinary user then the wireless device is now highly suspect. Extending the hang up principle further, if for some reason the device is producing non-DTX signaling then leaving the call connected for extended periods would also be indicative of a suspect device, as an ordinary user would very likely end the call only after a few seconds due to a lack of response from the wireless device engage unit 2304 or perhaps because a canned apology response was provided by unit 2304. If the call remained connected for more than some specified period of time (e.g., 10 seconds), it would be another strong indication that the wireless device is either a controlling device 2307 or an activating device 2308, rather than an ordinary wireless device 2306, since an ordinary user would have disconnected the call. In the following, a wireless device which may be either an activating device 2308 or a controlling device 2307 is termed a suspect wireless device.

In the second mode of operation, activating device 2308 has already entered the traffic state where the arming digits may or may not have been sent to the phone. In this case the wireless engage unit searches the traffic channels in air path 2310 searching for traffic channels that remain in a persistent DTX signaling state. This includes not only analyzing reverse (or uplink) traffic channels (i.e., from the wireless device to the network) but also analyzing forward (or downlink) traffic channels (i.e., from the network to the wireless device). The technique contemplates incorporating a warning device into wireless engage unit that works in a manner similar to a radar detector. The device will generate a warning to the user that increases in intensity and frequency the longer a wireless device remains in DTX. The technique further contemplates attacking the signaling from the network to the wireless device(s) 2308 to cause silence on the forward link while simultaneously scanning the associated reverse links looking for non-DTX activity. The purpose is to provoke a very typical audible response from a user (e.g., "Hello? I cannot hear you") when the forward link goes silent. The attack is further refined such that it does not cause the cause the call to drop (e.g., in GSM, the SACCH remains unmolested) nor alert the. Of course, all of the forward links in air path 2310 can be attacked on simultaneously, rather than targeting traffic involving specific wireless devices. However the preferred embodiment will attack each wireless device individually so that ordinary users can continue unimpeded while the system focuses only on suspect wireless devices.

If there are sufficient resources available, nothing precludes operating in both modes and in both directions (forward and reverse) simultaneously.

All modern digital cellular standards include a DTX mode. While the specific signaling patterns will vary depending on the cellular standard, the general techniques described in the foregoing applicable to all standards. The standard-specific techniques described in the following are therefore to be regarded as exemplary only.

GSM

Figure 24:
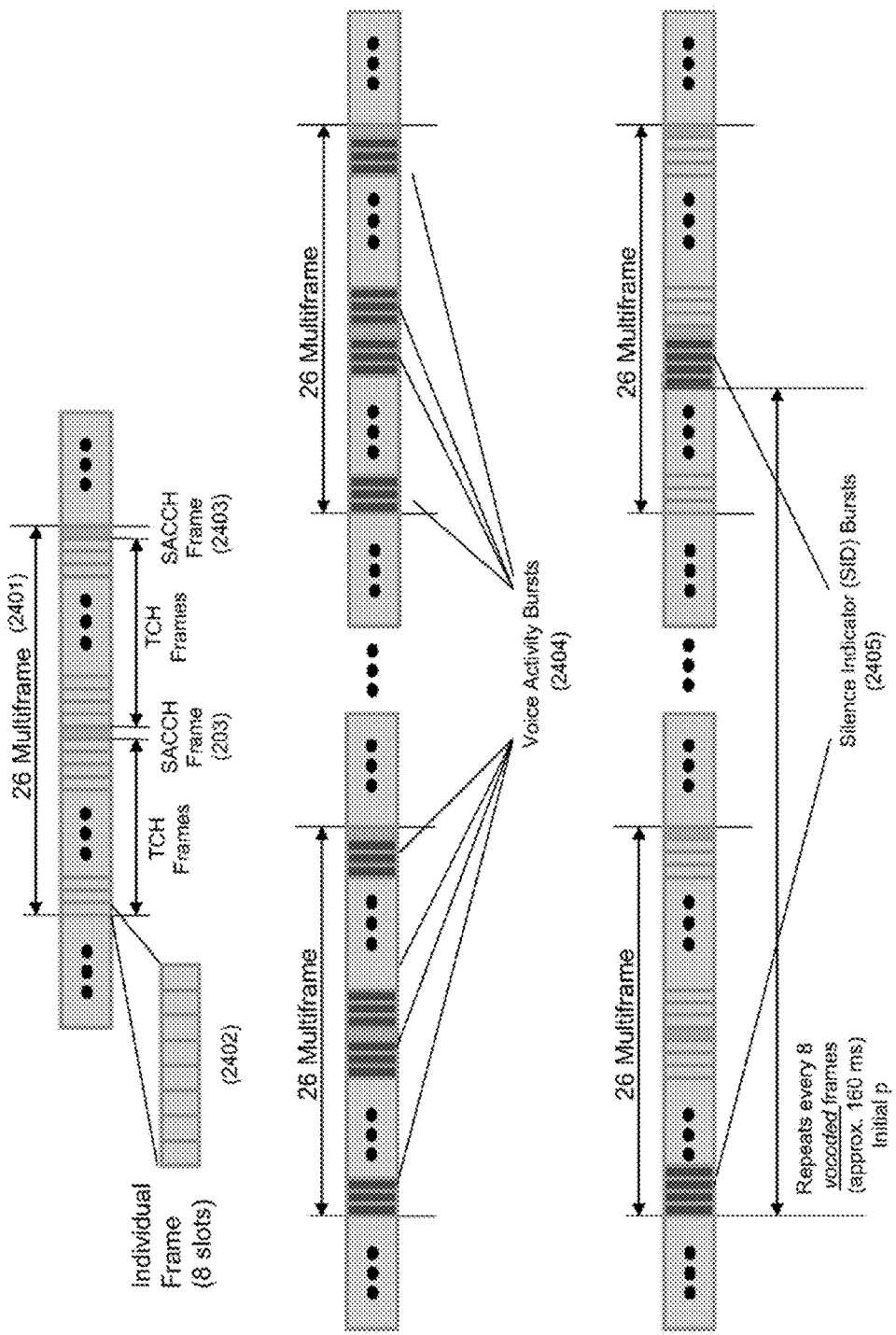
FIG. 24 provides a GSM DTX overview.

FIG. 24 shows the GSM traffic channel (TCH) structure for full rate signaling with the understanding that nothing disclosed herein precludes applying the methods to half rate signaling. The TCH is based what is known as the 26 multi-frame (2401)—the timing of which is expressly derived from the serving cell beacon. Within each frame there are eight slots (2402). Each slot carries coded voice for a different call. The coded voice is encoded in GSM bursts. Frames 12 and 25

(2403) carry the Slow Associated Control Channel signaling (SACCH) which does not carry any coded voice but instead reports the strength of the signal received from the serving cell and the surrounding neighbors and is primarily used by the network for mobile assisted handover. The SACCH frames always contain data and must always be present to keep the link open. The remaining frames carry the coded voice and are normally filled with GSM bursts when a user is speaking. The data for a call, regardless of frame, is uniformly encrypted which precludes decoding the data to determine the content therein (e.g., decodinge the actual coded voice and detect silence directly). However it is the pattern of signaling and not the content thereof that is of importance to the techniques. Further still a GSM wireless device in traffic mode will hop to a new frequency channel on each frame. The frequency channels that a call hops to belong to a set of the frequency channels that are assigned to the call. The set of frequency channels may cover a wide swath of spectrum. Due to encryption, it is not possible in general to have a priori knowledge of the hopping sequence for a call; however, as described in the following, the sequence can be derived without decrypting the information which specifies the hopping sequence.

When a user is speaking, all of the frames belonging to the call are populated with GSM bursts that convey the coded voice (2404). When the user pauses speaking, the wireless device enters DTX mode (2404) and begins to send GSM bursts that contain silence indicator (SID) frames regularly but infrequently (every 8 voice coded frames—not to be confused with signaling frames—or about every 160 mS) (2405). Such GSM bursts are termed in the following SID bursts. While the repetition phase of the SID bursts in the 26 multiframe is random based on when the DTX started in time, their occurrence is precisely periodic. As described in PCT/US2007/063493, it is possible to detect the SACCH signaling of the wireless device and converge to its unique hopping sequence. Once converged, the method then searches for the voice coded activity in non SACCH frames or more specifically looks for the DTX pattern (or lack thereof). A simple counter can be used that detects periods of inactivity (e.g., number of seconds since last activity) and if this exceeds a threshold the wireless device is considered to be suspect.

A logical extension to this technique is to surgically attack the associated downlink channels as described in PCT/US2007/063493 so as to elicit a response by a legitimate subscriber and thereby rapidly determine whether the wireless device is in fact suspect. This is possible because the GSM standard dictates that the same hopping sequence derived for the uplink link signaling is applied to the downlink link as well. Further still as described in the referenced PCT application, the attack refrains from suppressing the SACCH frames so that the link remains open but silent. Once a suspect phone is identified, it becomes possible to search the downlink signaling links coming off of nearby towers looking for a similar pattern of extended silence (DTX signaling) using the same technique of converging to the hopping sequence on each phone and when the pat tern is found, attaching the channel to force the cellular system to drop the call.

Because the suspect wireless device is in uninterrupted DTX mode, the silence that is conveyed through the network to the controlling phone belonging to the perpetrator and will appear on the controlling phone's downlink link. That in turn gives the controlling phone's downlink link a signature. The signature identifies the downlink link, and once the downlink link is identified, its hopping sequence can be determined. The downlink and uplink links use the same hopping sequence and that sequence can be provided to direction finding or other locating instruments and used by them to traced the call back to perpetrator.

As described above, the DTX information is propagated through the network to the endpoints of the call. It therefore now becomes possible to use this same method to identify when there are extended periods of silence on a particular link. Regardless of whether there is a wireless device engage unit in proximity to a specific device, it becomes possible to scan the downlink links either in the air or on the network directly to determine if a suspect device has just been armed in some area and therefore take preventive action by declaring a general alert, having the network disconnect the call, or by sending out a team to investigate.

CDMA 2000

Figure 25:
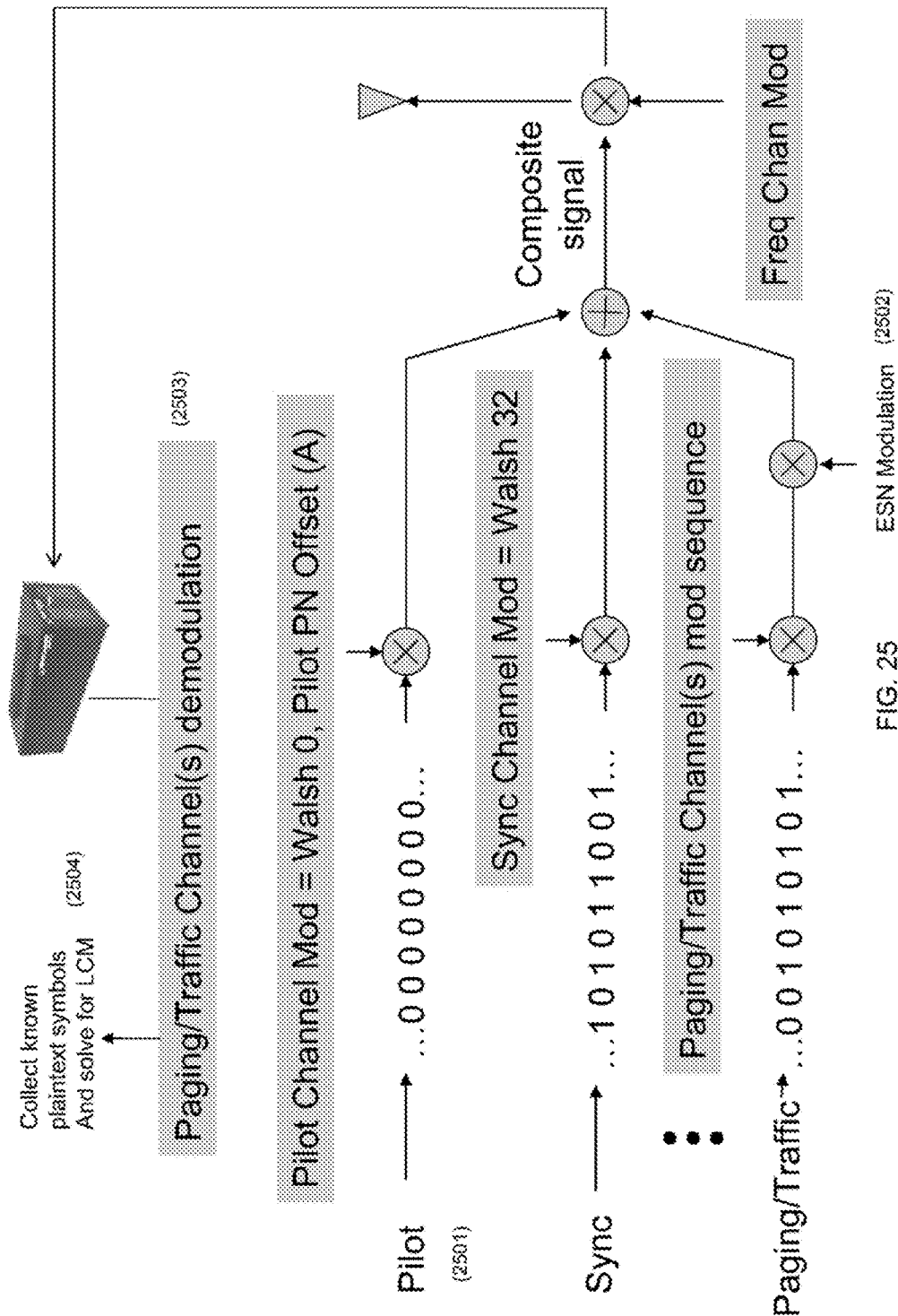
FIG. 25 provides a CDMA Forward Channel Signal Structure.

FIG. 25 shows the structure of the CDMA forward channel signaling. It consists of a pilot channel (2501) on which is superimposed some number of code channels. Within each code channel is a sequence of Walsh symbols that are used to convey the information. Each Walsh symbol is modulated (pseudo-randomly flipped) (2502) as a function of the long code mask (LCM) supplied by the network at call set up. The LCM can either represent the electronic serial number (ESN), along with some other fixed bit fields, of the device to which it is communicating or it can be a random value.

Figure 26:
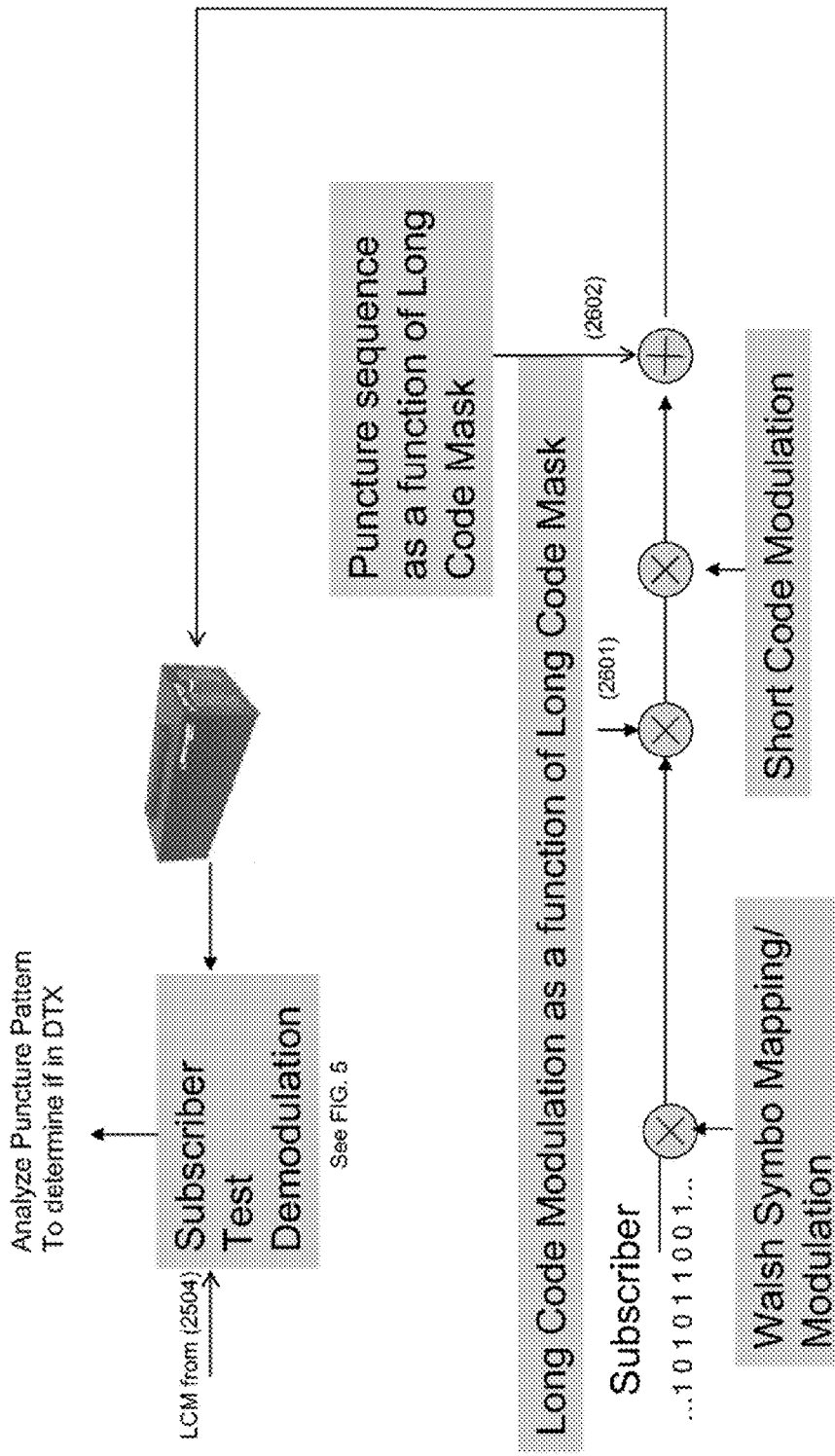
FIG. 26 depicts CDMA Reverse Channel Signaling with DTX.

FIG. 26 shows a reverse channel associated with each forward channel. The reverse channel is also coded on a chip basis and the encoding is also a also function of the LCM assigned to the wireless device (2601). However it is at best difficult to blindly determine which subscribers are active by simply attempting to blindly decode the reverse channels due to an astronomical ($2^{42}$) LCM search space. Instead the invention notes that for any given subscriber, the same LCM is used for both the forward and reverse links. This makes it is possible to determine which of the subscribers (signaling on the reverse link), is operating locally by applying all of the LCMs (worst case <64) detected on the forward link and performing a test detection for each.

The process of discovering the LCM on a forward link is as follows. The coding of the forward signal is such that certain Walsh symbols at specific times in any given forward code channel will almost always be in a known state (e.g., MM bits) (2503). This makes it possible using a plain-text matrix elimination (2504) to determine the LCM being used to modulate the signal. Armed with this information it is now possible to return to the reverse channel and look for the associated signaling by performing spot correlation based on the individual LCMs.

Figure 27:
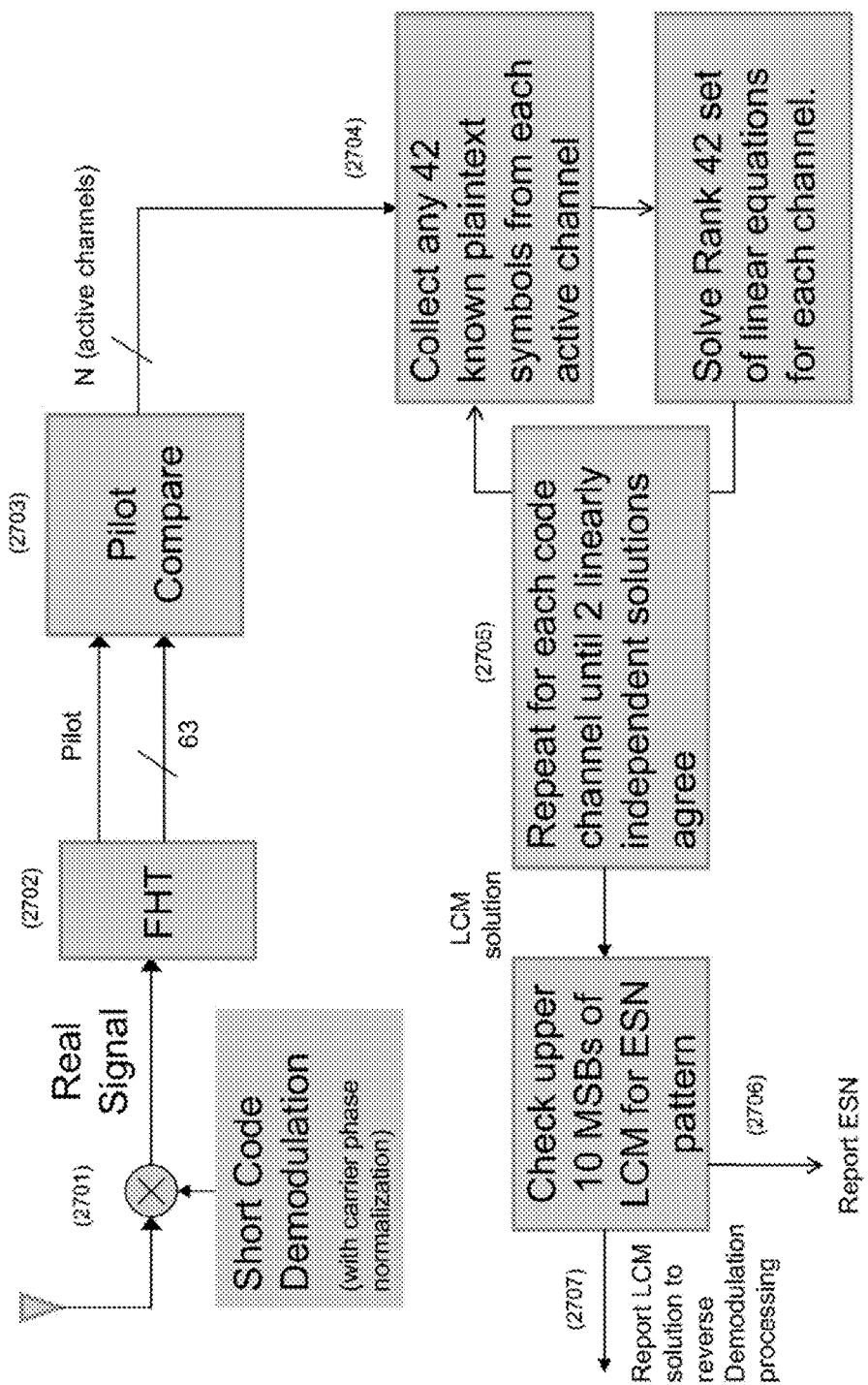
FIG. 27 shows a method used to detect long code masks (LCMs) on reverse channels.

The solution of each LCM is shown in FIG. 27. The received forward signal is demodulated (stripped of the short codes and carrier normalized) and the code channels are then despread (2701) simultaneously and separated using a Fast Hadamard Transform (FHT) creating a symbol stream for all 64 code channels simultaneously (2702). Code channel 0 is reserved for the pilot. Therefore it is possible to detect which other code channels are active (i.e., must he searched for the LCM) by comparing the signal levels symbols of the code channel to that of the pilot (2703). The method then collects any set of 42 known plain text symbols and solves forms a Rank 42 matrix (presumes linearity due to correlation properties of the long code) and solves for the LCM using classical Gaussian elimination (2704) as expressed below:

$$A\underline{x}=\underline{y}$$

where the rows of matrix A represent the long code state at the time the symbol was collected, the vector $\underline{y}$ contains the observed symbols and $\underline{x}$ is the sought after solution vector, the entries of which represent the bits that constitute the LCM.

Checks must be performed for matrix ranks below 42 (linear dependence) that can occur from symbol errors or possible (yet unlikely) correlation in the long codes. The most direct way to do this is to detect any row in the matrix where there is linear dependence and then substitute this with a new symbol and associated long code state. However the check for linear independence is such that it is typically more economical to just repeat the process for any set of 42 symbols (e.g., just collect 42 more) and then declare a solution once any two sets of symbols agree.

The technique also does not require that the actual state of the symbols be known. It is instead sufficient that they simply be consistent. For example if it is known that in each 20 mS frame one of the bits will always be in the same state then it is a matter of collecting this bit from 42 frames and performing the above described solution of linear equations. The only drawback is that the result will be ambiguous in that there are two possible solutions—either the LCM or the bit flip thereof. However this is no more than a minor inconvenience with respect to the LCM because the reverse channel processing can simply try either mask on the reverse channel when looking for phones. Furthermore when checking for ESNs the solution can be disambiguated if the upper 10 bits or bit flip thereof match the fixed bits associated with an ESN mask.

The fact that the actual state of the symbols need not be known is also important when dealing with the frame offsets employed by CDMA. Heretofore the discussion has ignored the fact that CDMA frame offsets are in general unknown and hence it becomes difficult to say where in time the plain text bit of interest actually occurs. Since the frame can have one of 16 possible offsets, all 16 must be tried implying a compute factor increase of 16. The compute factor increase does not occur because the technique can pick any symbol from each frame regardless of offset in the hope that it will be consistent from frame to frame and possibly reduce the time to find a solution. This is not unreasonable, since it is to be expected that in a conversation, the channel will be silent half the time and hence revert to a consistent signaling pattern on a per frame basis. If the selected point (symbol) in the frame is not consistent then the time to acquire the LCM is lengthened because it is necessary to search for other consistent symbols but no incorrect solution will be reported. It takes 2 matching LCMs to declare a solution and the long code autocorrelation properties are such that the probability of 2 matching LCMs occurring in practice is very low (e.g., akin to the chance of a false CRC). Should a false match occur, the error would be corrected soon after by the monitoring process described below.

The technique continues to check the solution of the LCM of every active channel every few seconds so as to discover when the LCM changes. Again when it gets two solutions that agree it reports the new LCM (2705).

The method also anticipates using the LCM solution of any given code channel to monitor the symbols in the code channel and to determine the code channel's frame offset. Knowing the frame offset may prove to be of benefit for further processing of the information in the channel by other entities such as those interested in voice processing. For example it becomes possible to look for certain frame structure aspects by performing a pattern match on the 16 hypothesized frame offsets.

Figure 28:
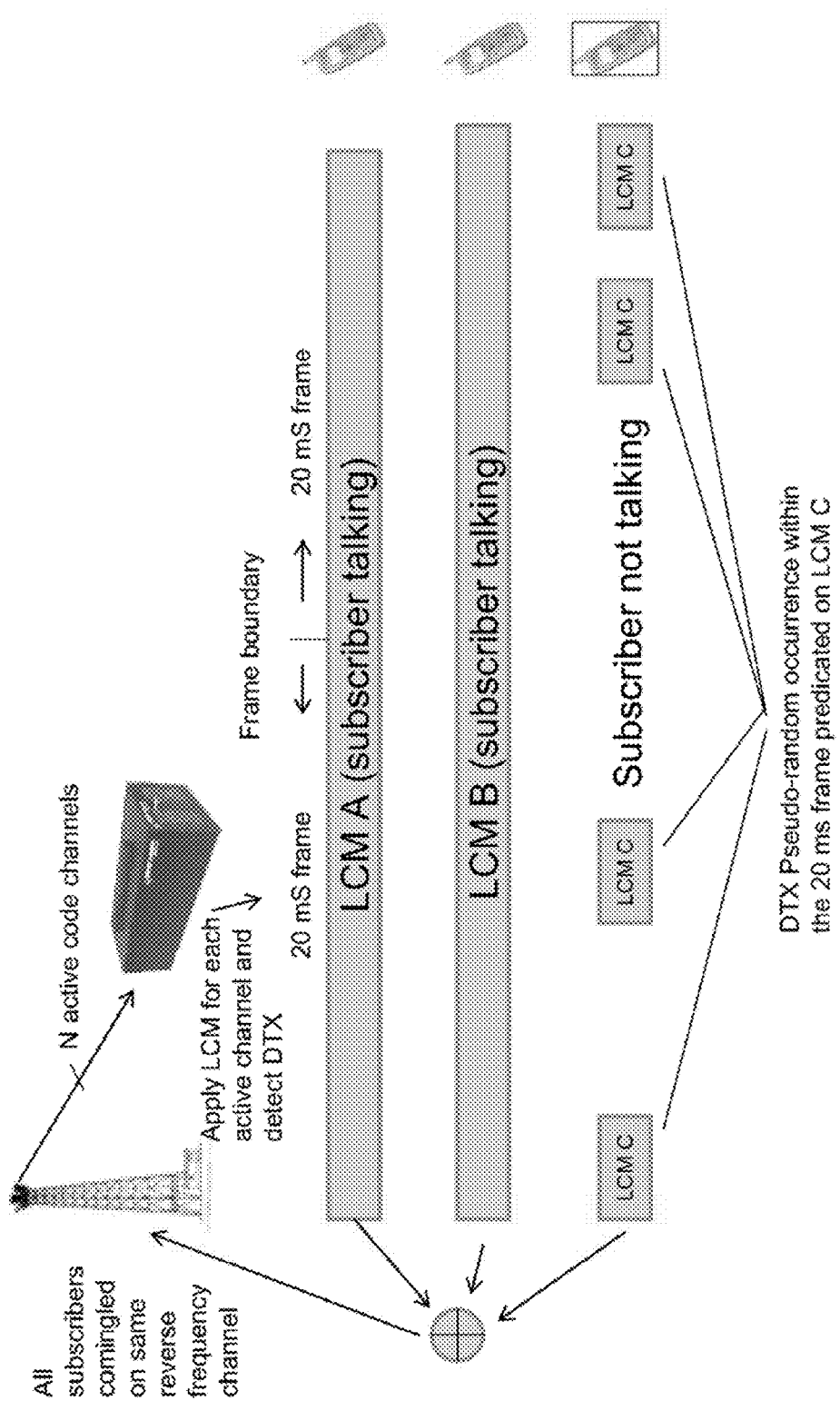
FIG. 28 shows a method of using LCM to analyze puncture sequencing to correlate reverse channel signaling for separating devices.

Armed with the one or more LCMs, the technique then searches for DTX mode on the reverse channels. Specifically, the CDMA DTX on the reverse link expresses itself as a reduced burst, termed herein a puncture, within the CDMA frame. However, the pattern of such punctures is again a function of the LCM. As shown in FIG. 28, the position of the non-punctured bursts will vary pseudo randomly in the frame and without the benefit of the LCM, it is impossible to separate one device from another and therefore truly determine whether a given device is in fact in DTX mode. Knowledge of the LCMs enables the receiver to correlate the reverse link signaling against each of the active code channels to detect not only if a reverse link is associated with a phone that is signaling in proximity but also to analyzing the phone's puncture sequence to determine whether it is in DTX.

The remaining techniques for determining whether a CDMA wireless device is a threat are similar to those described for GSM. Specifically once a phone in the traffic state has been identified it is possible to send a canned apology or attack the phone to provoke a subscriber response so as to filter out the ordinary phones. However, unlike GSM, the coding of the forward DTX to the user does not exhibit a pattern that is clearly distinct from the pattern of the voice signaling. This requires a change in tactics to find the perpetrator. Since the LCM mask is presumably known, it is consequently possible to demodulate and decode each of the forward channels and then search for silence coding directly. However a simpler technique that does not require direct full demodulation and decoding might be to search for symbol repetition patterns that are symptomatic of a reduction in the channel's data rate.

Proximity Alerts

Since the individual wireless devices can be individually identified and tracked, the techniques can include the additional step of noting the signal level for each of the individual suspect wireless devices. If the wireless device engage unit is mobile, it can then determine when it is has come upon and subsequently passed a suspect device by noting the rise and fall in the energy levels and from this note the position of highest proximity to the suspect device. It can then either record the position for further action or perhaps report it immediately via other communication means such as a cell phone text message for immediate additional action by authorities. This can include reporting identifiers for the call (either the hopping sequence or the LCM of the device) in real time to service providers so that they can shut down the call.

Interacting with a Suspect Wireless Device Using DTMF Digits

The method anticipates the additional step of sending DTMF digits to provoke a suspicious wireless device up to and including effecting detonation. This can include engaging wireless devices in idle mode or overriding the signaling of a call in progress or a combination of attacking a phone that has a call in progress such that it disconnects and then subsequently engaging it when it reverts to idle mode. In the case of a call in progress this is made possible by the previously described techniques that can time the network signaling with a high degree of precision and subsequently separate the individual subscribers. For GSM phones this would be separating the subscribers by frequency hopping detection and CDMA this would be LCM detection, respectively of the suspicious wireless device thus allowing the method to temporarily override the signaling on the downlink/forward channel and insert DTMF-either in the form of a command or directly vocoded. The method also notes that in the case of GSM, the additional step of overcoming the encryption of the DTMF must be performed. The method can either be supplied with the encryption key (Kc) or it can collect the information necessary to determine the encryption key, (e.g., SACCH signaling), and use the encryption key thus produced.

Preferred Embodiment

A transceiver that may be used to implement baiting beacons and interference signals is the ComHouse Wireless Network Subscriber Test (NST), which may be purchased from ComHouse Wireless LP, 221 Chelmsford St., Chelmsford, Mass. 01824. The unit is a software defined radio capable of testing both wireless devices and base stations using the GSM and CDMA standards. NST can interrogate wireless devices by acting as a beacon and can scan cellular environments so as to identify and analyze beacons, and can generate multiple simultaneous signals which can be used as interference signals. The interference signals may be customized to surgically attack or manipulate cellular signals with sub-microsecond precision. The unit can also make and receive outgoing and incoming phone calls. Another version of the NST consists of separate software modules which implement its receiving and signal generation functions and which may be incorporated into other software radio systems.

CONCLUSION

The foregoing Detailed Description has disclosed to those skilled in the relevant technologies how to carry out and use the inventive techniques disclosed herein and has further disclosed the best modes presently known to the inventor of implementing the inventive techniques. As will be immediately apparent to those skilled in the relevant technologies, the inventive techniques have general applicability to cellular telephone signaling environments, including GSM and CDMA standards for which examples are given in the Detailed Description. As is clear from the discussion of the application of the techniques to GSM and CDMA herein, the manner in which a given inventive technique is applied will, however, depend upon the particular character of the signaling environment to which they are applied. For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

The invention claimed is:

1. A method of a surgical neutralizing system, including a receiver and signal generator, determining whether a cellular telephone which is in an idle state is configured to operate as an activator whereby it can respond to a telephone call but has been disabled from transmitting voice signals, the method performed by the surgical neutralizing system comprising the steps of:
    establishing a baiting beacon with which the cellular telephone will register, and upon registration, automatically performing the steps of placing a telephone call to the cellular telephone by the baiting beacon;
    if the telephone call is answered and the cellular telephone transmits voice signals, determining therefrom that the cellular telephone is not configured as an activator; and
    if the telephone call is answered and the cellular telephone does not transmit voice signals, determining therefrom that the cellular telephone is configured as an activator.

2. The method set forth in claim 1 wherein:
    in the step of determining that the cellular telephone is configured as an activator, the determination is made after waiting a period of time that is without transmission of voice signals by the cellular telephone.

3. The method set forth in claim 1 wherein:
    in the step of determining that the cellular telephone is configured as an activator, the determination is made when the telephone call remains connected longer than would be expected for a cellular telephone that is not a suspect cellular telephone.

4. The method set forth in claim 1 further comprising the step performed after the telephone call has been answered of:
    responding with a pre-recorded apology, the determination being made after responding with the pre-recorded apology.

5. A method of determining whether a cellular telephone which is in a traffic state of a call in a cellular telephone system is a cellular telephone configured to operate as an activator, whereby it can respond to the call but has been disabled from transmitting encoded voice and the method comprising the steps performed in a signal analyzer of:
    observing the DTX signaling state of the cellular telephone's reverse (uplink) traffic channel;
    if the reverse (uplink) traffic channel is in a persistent DTX signaling state, determining that the cellular telephone is a cellular telephone configured to operate as an activator; and
    providing a warning indication, including at least one of an audible, a visible, a mechanical, or an electronic indication.

6. A method of determining whether a cellular telephone, which is in a traffic state of a call in a cellular telephone system, is a cellular telephone configured to operate as an activator that can respond to the call but has been disabled from transmitting encoded voice, the method comprising the steps performed in a signal analyzer of:
    observing the DTX signaling state of the cellular telephone's reverse (uplink) traffic channel; and
    if the reverse (uplink) traffic channel is in a persistent DTX signaling state, determining that the cellular telephone is configured as an activator; and
    further comprising the steps performed when a cellular telephone is determined to be configured as an activator of:
    attacking the signaling on the forward (downlink) traffic channel to cause silence on the forward (downlink) traffic channel;
    observing whether the caused silence on the forward (downlink) traffic channel is followed by non-DTX activity on the reverse (uplink) traffic channel; and
    if non-DTX activity is observed, determining that the cellular telephone is not configured as an activator.

7. The method set forth in claim 6 wherein: in the step of attacking the signaling on the forward (downlink) traffic channel, the attack does not cause the call to drop.

8. The method set forth in claim 5 further comprising the steps performed when the cellular telephone is determined to be configured as an activator of:
    analyzing forward (downlink) traffic channels of calls to find another cellular telephone whose forward (downlink) channel has a persistent DTX signaling state in which the signals making up the persistent DTX signaling state correspond to the signals making up the persistent DTX signaling state of the reverse (uplink) channels of the cellular telephone configured as an activator; and
    using the signals making up the signaling state of the other cellular telephone's reverse (uplink) channel to trace the call back to the other cellular telephone.

9. The method set forth in claim 5 wherein:
    in the step of observing the DTX signaling state, the signaling state is obtained from air path signals exchanged between a base station of the cellular telephone system and the cellular telephone and/or from signals exchanged via an internal path of the cellular telephone system.

10. A method of determining whether a cellular telephone, which is in a traffic state of a call in a cellular telephone system, is a cellular telephone configured to operate as an activator that can respond to the call but has been disabled from transmitting encoded voice, the method comprising the steps performed in a signal analyzer of:

observing the DTX signaling state of the cellular telephone's reverse (uplink) traffic channel; and if the reverse (uplink) traffic channel is in a persistent DTX signaling state, determining that the cellular telephone is configured to operate as an activator cellular telephone, wherein the cellular telephone system operates according to a GSM standard; and the step of observing the DTX signaling state includes the steps of:

determining a current hopping sequence for the reverse link;

and using the current hopping sequence to observe a pattern indicating a lack of non-slow associated control channel (SACCH) signaling in the reverse link.

11. A method of determining whether a cellular telephone which is in a traffic state of a call in a cellular telephone system is a cellular telephone configured as an activator, whereby it can respond to the call but has been disabled from transmitting encoded voice, the method comprising the steps performed in a signal analyzer of:

observing the DTX signaling state of the cellular telephone's reverse (uplink) traffic channel; and if the reverse (uplink) traffic channel is in a persistent DTX signaling state, determining that the cellular telephone is configured as an activator, wherein the cellular telephone system operates according to a CDMA standard; and the step of observing the DTX signaling state includes the steps of:

determining a long code mask (LCM) for the reverse link: and using the LCM to observe a pattern of punctures in the reverse link consistent with a lack of voice activity.

12. A method of determining whether a call in a cellular telephone system between a first cellular telephone and a second telephone is a call involving a cellular telephone configured to operate as an activator of another cellular telephone, wherein the cellular telephone configured to operate as an activator is configured to respond to a telephone call but has been disabled from transmitting encoded voice, the method comprising the steps performed in a signal analyzer of:

observing the DTX signaling state of the reverse (uplink) traffic channel of the first cellular telephone and of the forward (downlink) traffic channel for the second telephone; and if the observed traffic channels have corresponding persistent DTX signaling states, determining that the call involves one of the first and second cellular telephones operating as an activator of the other of first and second cellular telephone.

13. The method set forth in claim 12 wherein:

in the step of observing the DTX signaling state, the signaling state is obtained from signals exchanged via an internal path in the cellular telephone system between a base station of the cellular telephone system and the first cellular telephone and/or the second telephone.

14. The method set forth in claim 12 wherein the cellular telephone system operates according to a GSM standard; and the step of observing the DTX signaling state includes the steps of:

determining a current hopping sequence for the forward link and the reverse link; and using the current hopping sequence to observe a pattern of a lack of voice activity in the reverse link and a corresponding pattern of silence in the forward link.

15. The method set forth in claim 12, wherein the cellular telephone system operates according to a CDMA standard; and the step of observing the DTX signaling state includes the steps of:

determining a long code mask (LCM) for the forward link and the associated reverse link; and using the LCM to observe a pattern of punctures in the reverse link and a corresponding pattern of silence in the forward link.

\* \* \* \* \*